(12) United States Patent
Kitagawa et al.

(10) Patent No.: US 11,047,776 B2
(45) Date of Patent: Jun. 29, 2021

(54) LIQUID SENDING METHOD USING SAMPLE PROCESSING CHIP AND LIQUID SENDING DEVICE FOR SAMPLE PROCESSING CHIP

(71) Applicant: SYSMEX CORPORATION, Kobe (JP)

(72) Inventors: Nobuhiro Kitagawa, Kobe (JP); Yoshinobu Miura, Kobe (JP); Michitaka Notoya, Kobe (JP); Shuji Yamashita, Kobe (JP); Nobuyasu Hori, Kobe (JP)

(73) Assignee: Sysmex Corporation, Hyogo (JP)

( * ) Notice: Subject to any disclaimer, the term of this patent is extended or adjusted under 35 U.S.C. 154(b) by 298 days.

(21) Appl. No.: 15/904,972

(22) Filed: Feb. 26, 2018

(65) Prior Publication Data

US 2018/0246020 A1 Aug. 30, 2018

(30) Foreign Application Priority Data

Feb. 27, 2017 (JP) .............................. JP2017-035552

(51) Int. Cl.
*G01N 1/38* (2006.01)
*B01L 3/02* (2006.01)
*B01L 3/00* (2006.01)

(52) U.S. Cl.
CPC .............. *G01N 1/38* (2013.01); *B01L 3/0293* (2013.01); *B01L 3/502784* (2013.01);
(Continued)

(58) Field of Classification Search
CPC .............. G01N 1/38; G01N 2001/386; G01N 35/1009; B01L 3/0293; B01L 2200/0673; B01L 2400/0487; B01L 3/502784
See application file for complete search history.

(56) References Cited

U.S. PATENT DOCUMENTS

| 4,481,130 A | * | 11/1984 | Robertson .............. C10G 33/00 516/154 |
| 9,121,047 B2 | | 9/2015 | Schultz et al. |

(Continued)

FOREIGN PATENT DOCUMENTS

| EP | 3216518 | 9/2017 |
| JP | 2005-181095 A | 7/2005 |

(Continued)

OTHER PUBLICATIONS

Japanese Office Action dated Dec. 22, 2020 in a counterpart Japanese patent application No. 2017-035552.

(Continued)

*Primary Examiner* — Xin Y Zhong

(74) *Attorney, Agent, or Firm* — Brinks Gilson & Lione

(57) ABSTRACT

Disclosed is a liquid sending method using a sample processing chip having a flow path into which a plurality of liquids flow, and the method includes: sending, into the flow path, a first liquid held in a liquid holding portion provided in the sample processing chip by applying pressure to the liquid holding portion; sending, into the flow path, a second liquid in a storage portion provided in a liquid sending device connected to the sample processing chip, through an injection hole provided in the sample processing chip, by applying pressure to the storage portion; and forming, in the flow path, a fluid containing the first liquid having been sent from the liquid holding portion, and the second liquid having been sent through the injection hole.

19 Claims, 19 Drawing Sheets

(52) U.S. Cl.
CPC ............. *B01L 2200/0673* (2013.01); *B01L 2400/0487* (2013.01); *G01N 2001/386* (2013.01)

(56) References Cited

U.S. PATENT DOCUMENTS

| | | |
|---|---|---|
| 9,126,160 B2 | 9/2015 | Ness et al. |
| 2005/0136685 A1 | 6/2005 | Takenaka et al. |
| 2006/0275179 A1 | 12/2006 | Viovy et al. |
| 2011/0092373 A1* | 4/2011 | Colston, Jr. ........... B01F 3/0807 506/2 |
| 2014/0065631 A1 | 3/2014 | Froehlich et al. |

FOREIGN PATENT DOCUMENTS

| | | |
|---|---|---|
| JP | 2007-511744 A | 5/2007 |
| JP | 2007-292714 A | 11/2007 |
| JP | 2009-250961 A | 10/2009 |
| JP | 2010-133843 A | 6/2010 |
| JP | 2010-142233 A | 7/2010 |
| JP | 2014-77806 A | 5/2014 |
| WO | WO 2016/193758 | 12/2016 |

OTHER PUBLICATIONS

Japanese Office Action dated Apr. 6, 2021 in a counterpart Japanese patent application No. 2017-035552.

* cited by examiner

LIQUID SENDING METHOD USING SAMPLE PROCESSING CHIP AND LIQUID SENDING DEVICE FOR SAMPLE PROCESSING CHIP

CROSS REFERENCE TO RELATED APPLICATIONS

This application claims priority from prior Japanese Patent Application No. 2017-035552, filed on Feb. 27, 2017, entitled "LIQUID SENDING METHOD USING SAMPLE PROCESSING CHIP AND LIQUID SENDING DEVICE FOR SAMPLE PROCESSING CHIP", the entire content of which is incorporated herein by reference.

FIELD OF THE INVENTION

The present invention relates to a technique for sending various kinds of liquids to a sample processing chip in order to perform sample processing by using the cartridge-type sample processing chip (for example, see US Patent Publication No. 9126160).

BACKGROUND

In US Patent Publication No. 9126160, a technique for sending various kinds of liquids in order to perform sample processing by using a cartridge 900 that is a sample processing chip having a plurality of chambers 901 as shown in FIG. 38, is disclosed. To each of the plurality of chambers 901, a plunger 902 that moves upward and downward in the chamber 901 to send liquid into the chamber 901 and send out liquid from the chamber 901, and a capillary connector 904 for connecting a capillary 903 (regarded as a capillary using capillary phenomenon) that connects between an external device (not shown) and the chamber 901, are attached. The chambers 901 are connected to each other through a fluid channel (not shown) formed in the cartridge 900.

Into each chamber 901, liquid can be manually injected by a user. Other than this, according to US Patent Publication No. 9126160, various kinds of liquids are moved from an external device into the chambers 901 through the capillaries 903 and the capillary connectors 904.

In the technique described in US Patent Publication No. 9126160, it is difficult to increase a flow rate by sending liquid through the capillary 903 using capillary phenomenon, and therefore it takes time to send a desired amount of liquid. In a case where various kinds of liquids are injected in advance in all the chambers 901, an operation of injecting the liquids into the chambers is bothersome.

An amount of liquid used in the sample processing chip also varies according to a kind of the liquid. Therefore, when liquid is injected into the sample processing chip, it is required that a desired amount of liquid can be sent expeditiously while the operation is inhibited from becoming bothersome.

The present invention is directed to sending a desired amount of liquid expeditiously while inhibiting an operation from becoming bothersome when the liquid is injected into a sample processing chip.

SUMMARY OF THE INVENTION

The scope of the present invention is defined solely by the appended claims, and is not affected to any degree by the statements within this summary.

A liquid sending method using a sample processing chip according to a first aspect of the present invention is a liquid sending method using a sample processing chip (100) having a flow path (110) into which a plurality of liquids flow, and the method includes: sending, into the flow path (110), a first liquid (10) held in a liquid holding portion (120) provided in the sample processing chip (100) by applying pressure to the liquid holding portion (120); sending, into the flow path (110), a second liquid (20) in a storage portion (600) provided in a liquid sending device (500) connected to the sample processing chip (100), through an injection hole (130) provided in the sample processing chip (100), by applying pressure to the storage portion (600); and forming, in the flow path (110), a fluid containing the first liquid (10) having been sent from the liquid holding portion (120), and the second liquid (20) having been sent through the injection hole (130).

In the liquid sending method using the sample processing chip according to the first aspect, in the above-described structure, the second liquid (20) used for sample processing is stored in the storage portion (600) provided in the liquid sending device (500), and can be sent from the storage portion (600) through the injection hole (130) of the sample processing chip (100) into the flow path (110) by pressure being applied to the storage portion (600). Thus, the second liquid (20), among the first liquid (10) and the second liquid (20), need not be manually injected into the sample processing chip (100). Therefore, when liquid is injected into the sample processing chip (100), an operation can be inhibited from becoming bothersome. Unlike in the case of sending of liquid by using a capillary, the second liquid (20) is sent by pressure being applied to the storage portion (600) provided in the liquid sending device (500), and, therefore, liquid can be easily sent expeditiously even at a relatively high flow rate by using a pressure source such as a pump. Consequently, when liquid is injected into the sample processing chip (100), a desired amount of liquid can be sent expeditiously while an operation is inhibited from becoming bothersome.

In the liquid sending method using the sample processing chip according to the first aspect, the first liquid (10) preferably contains a sample (11) derived from an organism. In this configuration, the sample (11) derived from an organism can be sent directly into the flow path (110) from the liquid holding portion (120) provided in the sample processing chip (100) without sending the sample (11) through, for example, a liquid sending tube of the liquid sending device (500). As a result, even when the liquid sending process using the same liquid sending device (500) is repeated for a plurality of different sample processing chips (100), contamination of the sample (11) can be prevented.

In the liquid sending method using the sample processing chip according to the first aspect, the first liquid (10) preferably contains a component (12) corresponding to a test item of sample testing using the sample processing chip (100). In this configuration, the component (12) corresponding to the test item of the sample testing can be sent directly into the flow path (110) from the liquid holding portion (120) provided in the sample processing chip (100) without sending the component (12) through, for example, a liquid sending tube of the liquid sending device (500). As a result, even when the liquid sending process by the same liquid sending device (500) is repeated for a plurality of sample processing chips (100) for performing sample testing of different test items, contamination of the component (12) corresponding to the test item can be prevented.

In the liquid sending method using the sample processing chip according to the first aspect, a plurality of kinds of the first liquids (10) held in a plurality of the liquid holding portions (120) are preferably sent into the flow path (110) by applying pressure to the liquid holding portions (120), respectively. In this configuration, a plurality of kinds of the first liquids (10) can be sent in parallel. As a result, a desired amount of liquid can be sent expeditiously.

In the liquid sending method using the sample processing chip according to the first aspect, the first liquid (10) is preferably sent into the flow path (110) by applying pressure to the liquid holding portion (120) into which the first liquid (10) is injected by an injector (700). In this configuration, as in a case where liquid is injected into a well plate or the like, an operator is allowed to easily inject the first liquid (10) into the liquid holding portion (120) by using the injector (700) such as a pipette. Therefore, convenience is enhanced for an operator.

In the liquid sending method using the sample processing chip according to the first aspect, a plurality of kinds of the second liquids (20) stored in a plurality of the storage portions (600), respectively, are preferably sent through the common injection hole (130) into the flow path (110). In this configuration, the sample processing chip (100) need not be provided with a plurality of injection holes (130) corresponding to the plurality of kinds of the second liquids (20), and the sample processing chip (100) can be made simple and compact. The liquid sending device (500) need not have multiple liquid sending tubes corresponding to the plurality of injection holes (130), and the structure of the liquid sending device (500) can be thus simplified. That is, even when a plurality of kinds of the second liquids (20) are used, a structure for sending liquid can be simplified.

In this case, the plurality of kinds of the second liquids (20) are preferably sent through the injection hole (130) into the flow path (110) by the liquid sending device (500) switching a valve (507) provided between the injection hole (130) and the plurality of the storage portions (600), respectively. In this configuration, the plurality of kinds of the second liquids (20) can be each sent easily into the flow path (110) by switching of the valve (507) without, for example, changing connection of a liquid sending tube in the liquid sending device (500) or moving the storage portion (600) in order to select the second liquid (20) to be sent.

In the liquid sending method using the sample processing chip according to the first aspect, a fluid, in an emulsion state, including the second liquid (20) as a dispersion medium and the first liquid (10) as a dispersoid is preferably formed in the flow path (110) by controlling pressure to be applied to the liquid holding portion (120) that holds the first liquid (10), and pressure to be applied to the storage portion (600) that stores the second liquid (20). The emulsion represents a dispersive solution in which dispersoids are dispersed in a dispersion medium. The dispersive represents a state where dispersoids float or are suspended in a dispersion medium. The dispersoids are not mixed with the dispersion medium. That is, the dispersion medium and the dispersoids do not form a uniform phase by the mixture thereof. The dispersoids are separated from each other by the dispersion medium, and surrounded by the dispersion medium. Therefore, in the emulsion state, droplets of the dispersoids are formed in the dispersion medium. Forming of a fluid in the emulsion state is referred to as "emulsification". In the above-described configuration, a fluid, in an emulsion state, in which the droplets (50) of the first liquid (10) are dispersed in the second liquid (20) can be formed in the flow path (110). Thus, for example, a component in a sample is divided and contained in the droplet (50) in one unit portions, whereby sample processing for each one unit component can be performed in the sample processing chip (100). The second liquid (20) is preferably sent at a relatively high flow rate in order to form the droplets (50) of the first liquid (10). Therefore, the present invention in which the second liquid (20) can be sent into the sample processing chip (100) from the storage portion (600) of the liquid sending device (500), is suitable to a case where a process of forming a fluid in the emulsion state is performed. A component for each unit portion represents, for example, one nucleic acid molecule that is set as a unit when a component in a sample is the nucleic acid. For example, in a case where nucleic acid amplification for each droplet (50) is performed as the sample processing, a nucleic acid amplification product derived from only one molecule can be produced in the droplet (50).

In this case, a fluid, in an emulsion state, including the second liquid (20) and the first liquid (10) is preferably formed in the flow path (110) that includes a first channel (111a) and a second channel (111b) that intersect each other, by sending the first liquid (10) and the second liquid (20) into the first channel (111a) and the second channel (111b), respectively. In this configuration, by applying a shearing force due to flow of the second liquid (20), to the first liquid (10), at the intersection portion at which the first channel (111a) and the second channel (111b) intersect each other, the multiple droplets (50) of the first liquid (10) can be efficiently generated continuously in the second liquid (20), and an emulsion state can be efficiently formed.

In the structure in which the droplets (50) of the first liquid (10) are formed in the second liquid (20) in the flow path (110), the first liquid (10) preferably contains a sample (11) derived from an organism, and the second liquid (20) is oil (21). In this configuration, the sample (11) derived from an organism generally forms an aqueous phase and is likely to form an interface between the oil (21) and the sample (11). Therefore, an emulsion state in which the droplets (50) of the first liquid (10) are dispersed in the oil (21), can be easily formed.

In the liquid sending method using the sample processing chip according to the first aspect, preferably, the first liquid (10) that is a fluid in an emulsion state is sent into the flow path (110) by pressure being applied to the liquid holding portion (120), the second liquid (20) for demulsifying the first liquid (10) is sent through the injection hole (130) into the flow path (110) by pressure being applied to the storage portion (600), and the first liquid (10) and the second liquid (20) are mixed in the flow path (110). The demulsifying (demulsification) means that an emulsion state in which dispersoids are in a dispersion medium, is broken (canceled) to perform phase separation. That is, demulsification represents forming of multiple separated phases from a state where dispersoids are dispersed in a dispersion medium. In this configuration, the droplets (50) contained in the first liquid (10) can be broken in the sample processing chip (100) by the demulsification. The second liquid (20) is preferably sent at a relatively high flow rate as compared to the first liquid (10) to accelerate mixture with the first liquid (10) such that the multiple droplets (50) are efficiently broken. Therefore, the present invention in which the second liquid (20) can be sent into the sample processing chip (100) from the storage portion (600) of the liquid sending device (500), is suitable to a case where a process (that is, demulsification) of breaking the droplets (50) is performed.

In this case, the first liquid (10) is preferably a fluid, in an emulsion state, which contains, in the oil (21), a dispersoid including: a sample (11) derived from an organism; and a carrier (13) that binds to the sample (11). In this configuration, the sample processing is performed for each one unit component, and a component in the droplet (50) is taken out, by demulsification, from the first liquid (10) in which a component carried by the carrier (13) is in a state of the droplet (50), and processing can be collectively performed in the flow path (110).

In the configuration in which the second liquid (20) for the demulsification is sent into the flow path (110), preferably a third liquid (30) held in any of the plurality of the liquid holding portions (120) provided in the sample processing chip (100) is sent into the flow path (110) by pressure being applied to the liquid holding portion (120), and the first liquid (10) that is demulsified by mixture with the second liquid (20), and the third liquid (30) that contains a labelling substance (31) for detecting a sample (11) contained in the first liquid (10) are mixed in the flow path (110). In this configuration, a process of labeling, with the labelling substance (31), the component in the sample (11) that has been subjected to the sample processing for each one unit component can be performed in the flow path (110). The labelling substance (31) is different depending on a target component. Therefore, contamination of the labelling substance (31) in the case of liquid sending for a plurality of the sample processing chips (100) being performed by the same liquid sending device (500) can be prevented since not the storage portion (600) of the liquid sending device (500) but the liquid holding portion (120) of the sample processing chip (100) is caused to hold the third liquid (30).

In the liquid sending method using the sample processing chip according to the first aspect, the fluid in the flow path (110) is preferably collected through a discharge outlet (150) provided in the sample processing chip (100). In this configuration, a specimen can be easily collected after sample processing through the discharge outlet (150) from the sample processing chip (100).

In the liquid sending method using the sample processing chip according to the first aspect, preferably a fourth liquid (40) stored in the storage portion (600) is sent through the injection hole (130) into the flow path (110) by pressure being applied to the storage portion (600) so as to be disposed in the flow path (110), and, after the fourth liquid (40) has been disposed in the flow path (110) or in parallel with disposing of the fourth liquid (40) in the flow path (110), the first liquid (10) is put into a state where the first liquid (10) can be injected into the liquid holding portion (120). In this configuration, when the first liquid (10) is injected into the liquid holding portion (120), the fourth liquid (40) can inhibit the first liquid (10) from moving into the flow path (110). As a result, for example, also in a case where it takes time to send the first liquid (10) after the first liquid (10) has been held in the liquid holding portion (120) due to convenience of an operator who performs sample processing, the first liquid (10) can be held in the liquid holding portion (120).

In this case, the second liquid (20) stored in the storage portion (600) is preferably used as the fourth liquid (40). In this configuration, the second liquid (20) used for the sample processing can be used also as the fourth liquid (40), whereby the dedicated fourth liquid (40) need not be prepared separately from the second liquid (20). A structure of the liquid sending device (500) for sending the fourth liquid (40) and a structure for sending the second liquid (20) can be the same, whereby the structure for sending liquid can be simplified.

In the structure in which the fourth liquid (40) is disposed in the flow path (110), the flow path (110) is preferably filled with the fourth liquid (40) in a range, of the flow path (110), including at least a connection portion (140) for connection to the liquid holding portion (120) that holds the first liquid (10). In this configuration, the fourth liquid (40) that is filled in the connection portion (140), in the flow path (110), for connection to the liquid holding portion (120), can effectively inhibit the first liquid (10) from moving toward the flow path (110).

In the liquid sending method using the sample processing chip according to the first aspect, the second liquid (20) is preferably sent through the injection hole (130) from the storage portion (600) into the flow path (110) at a flow rate higher than a flow rate of the first liquid (10). In this configuration, the second liquid (20) can be sent, at a flow rate higher than that of the first liquid (10), from the liquid sending device (500). Limitation of an installation space or the like of the storage portion (600) provided in the liquid sending device (500) is less than limitation of an installation space or the like of the liquid holding portion (120) of the sample processing chip (100), and the size of the storage portion (600) can be easily increased. Therefore, an amount of the second liquid (20) to be sent is easily allowed to be sufficiently assured even when an amount of the second liquid (20) to be used is large.

In the liquid sending method using the sample processing chip according to the first aspect, the second liquid (20) in the storage portion (600) is preferably sent into a plurality of the flow paths (110) through a plurality of the injection holes (130) provided in the plurality of the flow paths (110), respectively, of the sample processing chip (100) by pressure being applied to the storage portion (600). In this configuration, unlike in the case of, for example, the second liquid (20) being injected into liquid holding portions, for the second liquid (20), provided in a plurality of the flow paths (110), respectively, the second liquid (20) can be collectively sent into the plurality of the flow paths (110) simply by the second liquid (20) being stored in the storage portion (600) of the liquid sending device (500), whereby an operation of storing the second liquid (20) can be simplified. The second liquid (20) can be sent into a plurality of the flow paths (110) from the storage portion (600) in parallel, whereby liquid can be sent expeditiously even in a case where the sample processing chip (100) includes a plurality of the flow paths (110).

A liquid sending device, for a sample processing chip, according to a second aspect of the present invention is a liquid sending device (500) that sends liquid into a sample processing chip (100) having a flow path (110) into which a plurality of liquids flow, and the liquid sending device (500) includes: a first liquid sending mechanism (510) configured to send, into the flow path (110) of the sample processing chip (100), a first liquid (10) held in a liquid holding portion (120) provided in the sample processing chip (100) by applying pressure to the liquid holding portion (120); and a second liquid sending mechanism (520) configured to send a second liquid (20) in a storage portion (600), into the flow path (110), through an injection hole (130) provided in the sample processing chip (100) by applying pressure to the storage portion (600) that stores the second liquid (20), and, in the liquid sending device (500), a fluid containing the first liquid (10) and the second liquid (20) is formed in the flow path (110) by liquid sending performed by the first liquid sending mechanism (510) and the second liquid sending mechanism (520).

In the liquid sending device, for the sample processing chip, according to the second aspect, in the above-described structure, the second liquid (20) used for sample processing is stored in the storage portion (600), and can be sent from the storage portion (600) through the injection hole (130) of the sample processing chip (100) into the flow path (110) by pressure being applied to the storage portion (600) by the second liquid sending mechanism (520). Thus, the second liquid (20), among the first liquid (10) and the second liquid (20), need not be manually injected into the sample processing chip (100). Therefore, when liquid is injected into the sample processing chip (100), an operation can be inhibited from becoming bothersome. Unlike in the case of sending of liquid by using a capillary, the second liquid (20) is sent from the liquid sending device (500) by pressure being applied to the storage portion (600) by the second liquid sending mechanism (520), and, therefore, liquid can be easily sent expeditiously even at a relatively high flow rate by using a pressure source such as a pump. Consequently, when liquid is injected into the sample processing chip (100), a desired amount of liquid can be sent expeditiously while an operation is inhibited from becoming bothersome.

In the liquid sending device, for the sample processing chip, according to the second aspect, preferably, the first liquid sending mechanism (510) includes a first pressure source (511) for applying pressure to the liquid holding portion (120), and the second liquid sending mechanism (520) includes a second pressure source (521) for applying pressure to the storage portion (600). In this configuration, sending of the first liquid (10) held in the liquid holding portion (120) and sending of the second liquid (20) stored in the storage portion (600) can be separately performed by the first pressure source (511) and the second pressure source (521), respectively. As a result, pressure for sending liquid or liquid sending start time can be freely controlled, whereby a degree of freedom for liquid sending process is enhanced.

In the liquid sending device, for the sample processing chip, according to the second aspect, preferably, the first liquid sending mechanism (510) includes a pressure path (512) that connects between the first pressure source (511) and the liquid holding portion (120), and the second liquid sending mechanism (520) includes a liquid sending tube (522) that connects between the storage portion (600) and the injection hole (130). In this configuration, the first liquid (10) and the second liquid (20) can be sent through separate paths, respectively. This also allows a degree of freedom for liquid sending process to be enhanced.

In the liquid sending device, for the sample processing chip, according to the second aspect, preferably, the storage portion (600) includes a liquid container (610) in which the second liquid (20) is stored, and the liquid sending device (500) further includes a container setting portion (505) in which the liquid container (610) is set. In this configuration, the second liquid (20) can be directly sent from the liquid container (610) that is set in the container setting portion (505) of the liquid sending device (500). Therefore, for example, as compared to a case where the second liquid (20) is transferred into a storage portion such as a liquid chamber in the liquid sending device (500), the liquid container (610) can be used as the storage portion (600) as it is, and convenience is thus enhanced for an operator.

In the liquid sending device, for the sample processing chip, according to the second aspect, preferably, the storage portion (600) includes a liquid container (610) in which the second liquid (20) is stored, and the liquid sending device (500) further includes an external connection portion (506) that connects between: an external liquid container (610) which is provided as the liquid container (610); and the second liquid sending mechanism (520). In this configuration, since the storage portion (600) for the second liquid (20) can be disposed outside the device, the liquid sending device (500) can be made compact as compared to a case where the storage portion (600) is disposed inside the device. For example, as compared to a case where the second liquid (20) is transferred into a storage portion such as a liquid chamber in the liquid sending device (500), the liquid container (610) can be used as the storage portion (600) as it is, and convenience is thus enhanced for an operator.

In the liquid sending device, for the sample processing chip, according to the second aspect, the first liquid sending mechanism (510) preferably sends, into the flow path (110), the first liquid (10) containing a sample (11) derived from an organism by controlling pressure to be applied to the liquid holding portion (120) that holds the first liquid (10) containing the sample (11) derived from the organism. In this configuration, the sample (11) derived from an organism can be sent directly into the flow path (110) from the liquid holding portion (120) provided in the sample processing chip (100) without taking, into the device, the sample (11) derived from the organism. As a result, even when liquid sending process is repeated for a plurality of different sample processing chips (100), contamination of the sample (11) can be prevented.

In the liquid sending device, for the sample processing chip, according to the second aspect, the first liquid sending mechanism (510) preferably sends, into the flow path (110), the first liquid (10) containing a component (12) corresponding to a test item of sample (11) testing using the sample processing chip (100) by controlling pressure to be applied to the liquid holding portion (120) that holds the first liquid (10) containing the component (12) corresponding to the test item of sample (11) testing using the sample processing chip (100). In this configuration, the component (12) corresponding to the test item of the sample testing can be sent directly into the flow path (110) from the liquid holding portion (120) provided in the sample processing chip (100) without taking the component (12) into the device. As a result, even when liquid sending process is repeated for a plurality of the sample processing chips (100) that perform sample testing of different test items, contamination of the component (12) corresponding to the test item can be prevented.

In the liquid sending device, for the sample processing chip, according to the second aspect, the first liquid sending mechanism (510) preferably sends a plurality of kinds of the first liquids (10) into the flow path (110) by controlling pressure to be applied to the plurality of kinds of the first liquids (10) held in a plurality of the liquid holding portions (120), respectively. In this configuration, by different pressures being applied, a plurality of kinds of the first liquids (10) can be sent at different flow rates, respectively, or sending of a plurality of kinds of the first liquids (10) can be started at different times, respectively. As a result, the plurality of kinds of the first liquids (10) can be freely sent into the sample processing chip (100), whereby liquid sending can be performed so as to be appropriate to various sample processing assays.

In the liquid sending device, for the sample processing chip, according to the second aspect, the first liquid sending mechanism (510) preferably sends the first liquid (10) into the flow path (110) by applying pressure to the liquid holding portion (120) into which the first liquid (10) is injected by an injector (700). In this configuration, similarly to injection of liquid to a well plate or the like, an operator is allowed to easily inject the first liquid (10) through the opening (121) of the liquid holding portion (120) by using the injector (700) such as a pipette, whereby convenience is enhanced for an operator.

In the liquid sending device, for the sample processing chip, according to the second aspect, the second liquid sending mechanism (520) preferably sends a plurality of kinds of the second liquids (20) stored in a plurality of the storage portions (600), respectively, through the common injection hole (130), into the flow path (110). In this configuration, a plurality of liquid sending tubes need not be provided so as to correspond to a plurality of the injection holes (130), and the structure of the device can be thus simplified. That is, even when a plurality of kinds of the second liquids (20) are used, the structure for sending liquid can be simplified.

In this case, preferably, the second liquid sending mechanism (520) includes a valve (507) that switches connection of the storage portions (600) to the common injection hole (130), and each of the plurality of kinds of the second liquids (20) is sent through the common injection hole (130) into the flow path (110) by switching the valve (507). In this configuration, each of the plurality of kinds of the second liquids (20) can be easily sent into the flow path (110) by switching between the valves (507) without, for example, changing connection of the liquid sending tube in the liquid sending device (500) or moving the storage portion (600) for selecting the second liquid (20) to be sent.

In the liquid sending device, for the sample processing chip, according to the second aspect, preferably, pressure to be applied to the liquid holding portion (120) that holds the first liquid (10) is controlled by the first liquid sending mechanism (510), and pressure to be applied to the storage portion (600) that stores the second liquid (20) is controlled by the second liquid sending mechanism (520), such that a fluid, in an emulsion state, including the second liquid (20) as a dispersion medium and the first liquid (10) as a dispersoid is formed in the flow path (110). In this configuration, for the sample processing chip (100) in which sample processing for each one unit component can be performed by a component in a sample being divided and contained in the minute droplet (50) in one unit portions, the fluid, in an emulsion state, in which the droplets (50) of the first liquid (10) are dispersed in the second liquid (20), can be formed in the flow path (110). The second liquid (20) is preferably sent at a relatively high flow rate in order to form the droplets (50) of the first liquid (10). Therefore, the present invention, in which the second liquid (20) can be sent from the storage portion (600) into the sample processing chip (100) by the second liquid sending mechanism (520), is suitable to a case where a process of forming a fluid in an emulsion state is performed.

In this case, the first liquid sending mechanism (510) and the second liquid sending mechanism (520) preferably send the first liquid (10) and the second liquid (20) into a first channel (111a) and a second channel (111b), respectively, which are provided in the flow path (110) and intersect each other, to form a fluid, in an emulsion state, which includes the second liquid (20) and the first liquid (10). In this configuration, by applying a shearing force due to flow of the second liquid (20), to the first liquid (10), at the intersection portion at which the first channel (111a) and the second channel (111b) intersect each other, the multiple droplets (50) of the first liquid (10) can be efficiently generated continuously, and an emulsion state can be efficiently formed.

In the structure in which the droplets (50) of the first liquid (10) are formed in the second liquid (20) in the flow path (110), preferably, the first liquid sending mechanism (510) sends, into the flow path (110), the first liquid (10) containing a sample (11) derived from an organism, by applying pressure to the liquid holding portion (120), and the second liquid sending mechanism (520) sends, into the flow path (110), the second liquid (20) that is oil, by applying pressure to the storage portion (600). In this configuration, the sample (11) derived from an organism generally forms an aqueous phase and is likely to form an interface between the oil and the sample. Therefore, an emulsion state in which the droplets (50) of the first liquid (10) are dispersed in the oil, can be easily formed.

In the liquid sending device, for the sample processing chip, according to the second aspect, preferably, the first liquid sending mechanism (510) applies pressure to the liquid holding portion (120) that holds the first liquid (10) that is a fluid in an emulsion state, to send the first liquid (10) into the flow path (110), the second liquid sending mechanism (520) applies pressure to the storage portion (600) that stores the second liquid (20) for demulsifying the first liquid (10), to send the second liquid (20) through the injection hole (130) into the flow path (110), and a mixture of the first liquid (10) and the second liquid (20) is formed in the flow path (110) by liquid sending performed by the first liquid sending mechanism (510) and the second liquid sending mechanism (520). In this configuration, the droplets (50) contained in the first liquid (10) can be broken in the sample processing chip (100) by the demulsification. The second liquid (20) is preferably sent at a relatively high flow rate as compared to the first liquid (10) to accelerate mixture with the first liquid (10) such that the multiple droplets (50) are efficiently broken. Therefore, the present invention in which the second liquid (20) can be sent into the sample processing chip (100) from the storage portion (600) by the second liquid sending mechanism (520), is suitable to a case where a process (that is, demulsification) of breaking the droplets (50) is performed.

In this case, the first liquid sending mechanism (510) preferably sends, into the flow path (110), the first liquid (10) that is a fluid in an emulsion state, the fluid containing, in oil, a dispersoid including: a sample (11) derived from an organism; and a carrier (13) that binds to the sample (11). In this configuration, the sample processing is performed for each one unit component, and a component in the droplet (50) is taken out, by demulsification, from the first liquid (10) in which a component carried by the carrier (13) is in a state of the droplet (50), and processing can be collectively performed in the flow path (110).

In the structure in which the second liquid (20) for the demulsification is sent into the flow path (110), preferably, the first liquid sending mechanism (510) sends, into the flow path (110), a third liquid (30) held in any of a plurality of the liquid holding portions (120) provided in the sample processing chip (100) by applying pressure to the liquid holding portion (120), and the first liquid (10) having been demulsified by mixture with the second liquid (20) and the third liquid (30) that contains a labelling substance (31) for detecting a sample (11) contained in the first liquid (10) are mixed, in the flow path (110), by liquid sending performed by the first liquid sending mechanism (510) and the second liquid sending mechanism (520). In this configuration, a process of labeling, with the labelling substance (31), a component in the sample (11) having been subjected to the sample processing for each one unit component can be performed in the flow path (110). The labelling substance

(31) is different depending on a target component. Therefore, the third liquid (30) is sent into the flow path (110) from the liquid holding portion (120) of the sample processing chip (100) without taking the labelling substance (31) into the device, thereby preventing contamination of the labelling substance (31) in the case of liquid sending being performed for a plurality of the sample processing chips (100).

In the liquid sending device, for the sample processing chip, according to the second aspect, preferably, a third liquid sending mechanism (530) configured to collect the fluid formed in the flow path (110), through a discharge outlet (150) provided in the sample processing chip (100), is further provided. In this configuration, a specimen can be easily collected after sample processing through the discharge outlet (150) from the sample processing chip (100).

In the liquid sending device, for the sample processing chip, according to the second aspect, preferably, a fourth liquid sending mechanism (540) configured to send a fourth liquid (40) stored in the storage portion (600), through the injection hole (130), into the flow path (110) by applying pressure to the storage portion (600), is further provided, and the fourth liquid sending mechanism (540) allows the fourth liquid (40) to be disposed in the flow path (110) of the sample processing chip (100) in which the first liquid (10) is not held in the liquid holding portion (120). In this configuration, when the first liquid (10) is injected into the liquid holding portion (120), the fourth liquid (40) can inhibit the first liquid (10) from moving into the flow path (110). As a result, for example, also in a case where it takes time to send the first liquid (10) after the first liquid (10) has been held in the liquid holding portion (120) due to convenience of an operator who performs sample processing, the first liquid (10) can be held in the liquid holding portion (120).

In this case, preferably, the fourth liquid sending mechanism (540) is structured by the second liquid sending mechanism (520), and the second liquid (20) stored in the storage portion (600) is sent as the fourth liquid (40) into the flow path (110). In this configuration, the second liquid (20) used for the sample processing can be used also as the fourth liquid (40), whereby the dedicated fourth liquid (40) need not be prepared separately from the second liquid (20). A structure of the fourth liquid sending mechanism (540) for sending the fourth liquid (40) and a structure of the second liquid sending mechanism (520) can be the same, whereby the structure of the device can be simplified.

In the structure in which the fourth liquid (40) is disposed in the flow path (110), the fourth liquid sending mechanism (540) preferably fills the flow path (110) with the fourth liquid (40) in a range, of the flow path (110), which includes at least a connection portion (140) for connection to the liquid holding portion (120) that holds the first liquid (10). In this configuration, the fourth liquid (40) that is filled in the connection portion (140), in the flow path (110), for connection to the liquid holding portion (120), can effectively inhibit the first liquid (10) from moving toward the flow path (110).

In the liquid sending device, for the sample processing chip, according to the second aspect, preferably, a setting portion (550) in which the sample processing chip (100) is set; and a lid (580) provided so as to correspond to the setting portion (550), are further provided, and, in the liquid sending device (500), the lid (580) includes a connector (400) that fluidly connects between: the first liquid sending mechanism (510) and the second liquid sending mechanism (520); and the liquid holding portion (120) and the injection hole (130), respectively, of the sample processing chip (100). In this configuration, the sample processing chip (100) is set in the device, and the liquid sending device (500) and the sample processing chip (100) can be easily connected assuredly to each other by the connector (400) of the lid (580). When the sample processing chip (100) is set in the device, for example, the pressure path and the liquid sending tube for liquid sending can be inhibited from being unnecessarily long, and response in the liquid sending process is made fast, thereby enhancing controllability.

In this case, preferably, the lid (580) is structured to be openable and closable relative to the setting portion (550), and the connector (400) is connected to each of the liquid holding portion (120) and the injection hole (130) by the lid (580) being closed relative to the setting portion (550). In this configuration, simply by the sample processing chip (100) being set in the setting portion (550) and the lid (580) being closed, the liquid sending device (500) and the sample processing chip (100) can be easily connected to each other. Therefore, convenience is enhanced for an operator.

In the liquid sending device, for the sample processing chip, according to the second aspect, the second liquid sending mechanism (520) preferably sends the second liquid (20) into the flow path (110) at a flow rate higher than a flow rate of the first liquid (10) sent by the first liquid sending mechanism (510). In this configuration, the second liquid (20) can be sent, at a flow rate higher than that of the first liquid (10), from the storage portion (600). Limitation of an installation space or the like of the storage portion (600) provided in the liquid sending device (500) is less than limitation of an installation space or the like of the liquid holding portion (120) of the sample processing chip (100), and the size of the storage portion (600) can be easily increased. Therefore, an amount of the second liquid (20) to be sent is easily allowed to be sufficiently assured even when an amount of the second liquid (20) to be used is large.

In the liquid sending device, for the sample processing chip, according to the second aspect, the second liquid sending mechanism (520) preferably sends the second liquid (20) in the storage portion (600), into a plurality of flow paths (110), through a plurality of the injection holes (130) provided in the plurality of the flow paths (110), respectively, of the sample processing chip (100) by applying pressure to the storage portion (600). In this configuration, unlike in the case of, for example, the second liquid (20) being injected into liquid holding portions, for the second liquid (20), provided in a plurality of the flow paths (110), respectively, the second liquid (20) can be collectively sent into the plurality of the flow paths (110) simply by the second liquid (20) being stored in the storage portion (600) of the liquid sending device (500), whereby an operation of storing the second liquid (20) can be simplified. The second liquid (20) can be sent into a plurality of the flow paths (110) from the storage portion (600) in parallel, whereby liquid can be sent expeditiously even in a case where the sample processing chip (100) includes a plurality of the flow paths (110).

A desired amount of liquid can be sent expeditiously while an operation is inhibited from becoming bothersome when liquid is injected into the sample processing chip.

DETAILED DESCRIPTION OF THE PREFERRED EMBODIMENTS

Hereinafter, an embodiment will be described with reference to the drawings.

[Outline of Liquid Sending Method]

An outline of a liquid sending method using a sample processing chip according to the present embodiment will be described with reference to FIG. 1.

A liquid sending method according to the present embodiment is a liquid sending method using a sample processing chip 100 having a flow path 110 into which a plurality of liquids flow, and, in the liquid sending method, sample processing which includes one or more processing steps for a target component in a sample that is sent into the flow path 110, is performed. Liquid is moved into the flow path 110 by supplying pressure to the liquid by a liquid sending device 500 provided separately from the sample processing chip 100, thereby performing the liquid sending.

The sample processing chip 100 is a cartridge-type sample processing chip capable of receiving a sample containing a target component. The cartridge-type sample processing chip 100 can be set in, for example, a sample processing device having the liquid sending device 500 incorporated therein. The sample processing chip 100 is a microfluidic chip having a fluid module 200 (see FIG. 6) which has a fine flow path for performing a desired processing step as described below. The flow path is a micro flow path having, for example, a cross-sectional dimension (width, height, and inner diameter) of 0.1 μm to 1000 μm.

Figure 1:
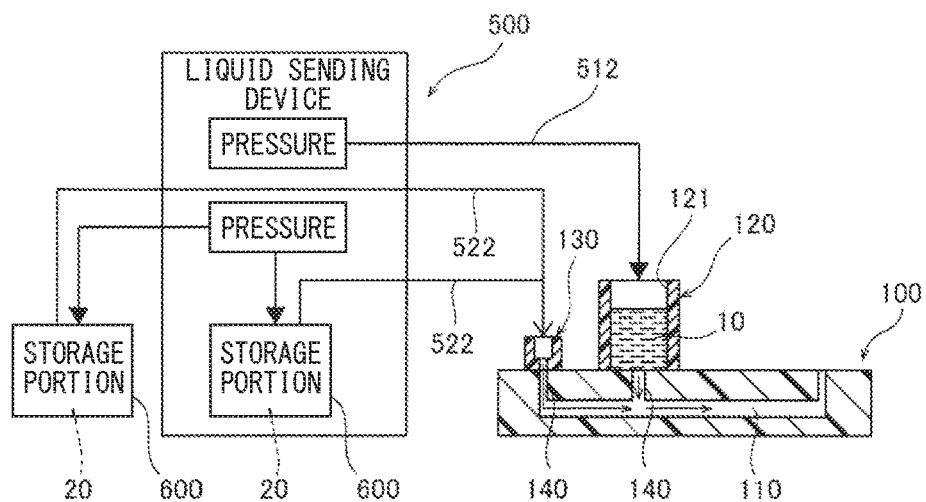
FIG. 1 illustrates an outline of a liquid sending method.

As shown in FIG. 1, the sample processing chip 100 includes the flow path 110, a liquid holding portion 120, and an injection hole 130.

The flow path 110 is provided in the sample processing chip 100, and is structured to form flow of liquid in a predetermined path. The flow path 110 may have any structure that allows liquid to flow. The flow path 110 has a shape based on a process performed in the flow path. The flow path 110 is formed so as to have a flow path width, a flow path height or flow path depth, a flow path length, and a volume based on a process performed in the flow path. The flow path 110 is formed by, for example, an elongated tubular path or channel. The channel may have a linear shape, a curved shape, a zigzag shape, or the like. The flow path 110 may have, for example, a shape in which a flow path dimension such as a flow path width or height varies, a shape in which a part or the entirety of the flow path expands in a planar manner, or a chamber shape capable of storing liquid that flows therein.

The liquid holding portion 120 is structured to have a predetermined volume for holding a first liquid 10. The liquid holding portion 120 is connected to the flow path 110 in the sample processing chip 100. The first liquid 10 can be moved into the flow path 110 through a connection portion 140 for connection between the flow path 110 and the liquid holding portion 120. The liquid holding portion 120 may be provided on the surface of the sample processing chip 100 or may be embedded in the sample processing chip 100. In a case where the first liquid 10 is supplied into the liquid holding portion 120 from the outside of the sample processing chip 100 when the sample processing chip 100 is used, the liquid holding portion 120 is formed so as to be exposed to the outside on the surface of the sample processing chip 100, and is, for example, formed into a tubular shape having an opening 121 through which liquid is injected from the outside. Injection of the first liquid 10 into the liquid holding portion 120 is performed manually by an operator, or by using an automated injection device. In a case where the sample processing chip 100 is provided in a state where the first liquid 10 is held in the liquid holding portion 120 in advance, the liquid holding portion 120 may be embedded in the sample processing chip 100.

In the liquid sending method according to the present embodiment, the first liquid 10 held in the liquid holding portion 120 is moved into the flow path 110 by pressure being applied to the liquid holding portion 120. The pressure is supplied to the liquid holding portion 120 from the liquid sending device 500 outside the sample processing chip 100. The pressure is supplied through a pressure path 512 that connects between the liquid sending device 500 and the liquid holding portion 120. The pressure for moving the first liquid 10 may be liquid pressure, or gas pressure or air pressure. That is, the first liquid 10 may be moved by pressurizing and supplying gas into the liquid holding portion 120, or the first liquid 10 may be moved by pressurizing and supplying liquid into the liquid holding portion 120. The first liquid 10 is pushed out from the liquid holding portion 120 by pressure supplied into the liquid holding portion 120, and is moved through the connection portion 140 into the flow path 110.

The injection hole 130 is a port through which a second liquid 20 is injected into the sample processing chip 100 from the liquid sending device 500 side. The injection hole 130 is opened on the surface of the sample processing chip 100 and is connected to the flow path 110. The second liquid 20 can be moved into the flow path 110 through the injection hole 130 from the liquid sending device 500 outside the sample processing chip 100. The injection hole 130 may be formed, as an opening, directly in the surface of the sample processing chip 100. The injection hole 130 may have, on the surface of the sample processing chip 100, a tubular portion suitable for connection to the liquid sending device 500 provided in the outside, and may be opened at the end of the tubular portion, as shown in FIG. 1.

The second liquid 20 is not held in the sample processing chip 100, and stored in a storage portion 600 in the liquid sending device 500. In the liquid sending method according to the present embodiment, the second liquid 20 in the storage portion 600 is moved toward the sample processing chip 100 by pressure being applied to the storage portion 600 provided in the liquid sending device 500, to send the second liquid 20 through the injection hole 130 into the flow path 110. The storage portion 600 may be provided inside the liquid sending device 500, or may be provided outside the liquid sending device 500 and connected to the liquid sending device 500. Pressure is supplied from the liquid sending device 500 into the storage portion 600. Pressure for moving the second liquid 20 may be liquid pressure, or gas pressure or air pressure. The second liquid 20 is pushed out from the storage portion 600 by pressure, and is supplied through a liquid sending tube 522 that connects between the liquid sending device 500 and the injection hole 130.

The first liquid 10 that is moved from the liquid holding portion 120 and the second liquid 20 that is moved through the injection hole 130 merge and flow in the same flow path 110. As a result, a fluid that contains the first liquid 10 sent from the liquid holding portion 120 and the second liquid 20 sent through the injection hole 130 is formed in the flow path 110. A part or the entirety of the sample processing is performed in the sample processing chip 100 according to the first liquid 10 and the second liquid 20 being sent. The sample processing includes, for example, a step of mixing, for example, a sample and a reagent, a step of causing the sample and the reagent to react with each other, a step of forming a fluid in an emulsion state, a step of demulsifying the emulsion, and a step of separating, from the sample, an unnecessary component contained in the sample and washing the sample.

As described above, the liquid sending method according to the present embodiment is implemented by performing at least (A) sending the first liquid 10 held in the liquid holding portion 120 provided in the sample processing chip 100, into the flow path 110, by applying pressure to the liquid holding portion 120, (B) sending the second liquid 20 in the storage portion 600, into the flow path 110, through the injection hole 130 provided in the sample processing chip 100 by applying pressure to the storage portion 600 provided in the liquid sending device 500 that is connected to the sample processing chip 100, and (C) forming, in the flow path 110, a fluid that contains the first liquid 10 sent from the liquid holding portion 120 and the second liquid 20 sent through the injection hole 130.

Thus, the second liquid 20 used in sample processing is stored in the storage portion 600 provided in the liquid sending device 500, and can be sent into the flow path 110 through the injection hole 130 of the sample processing chip 100 from the storage portion 600 by applying pressure to the storage portion 600. As a result, the second liquid 20, among the first liquid 10 and the second liquid 20, need not be manually injected into the sample processing chip 100, and therefore, when liquid is injected into the sample processing chip 100, an operation can be inhibited from becoming bothersome. Unlike in the case of sending of liquid by using a capillary, the second liquid 20 is sent by pressure being applied to the storage portion 600 provided in the liquid sending device 500, and, therefore, liquid can be easily sent expeditiously even at a relatively high flow rate by using a pressure source such as a pump. Consequently, when liquid is injected into the sample processing chip 100, a desired amount of liquid can be sent expeditiously while an operation is inhibited from becoming bothersome. (A) sending of the first liquid 10 may be firstly performed, or (B) sending of the second liquid 20 may be firstly performed.

(First Liquid)

A liquid used as the first liquid 10 is not particularly limited when the liquid can be used in the sample processing in the sample processing chip 100. In a case where an amount of a liquid to be supplied into the flow path 110 is less than an amount of the second liquid 20, the liquid is preferably supplied from the liquid holding portion 120 as the first liquid 10 when, in the case of the liquid sending device 500 repeatedly performing a process of sending liquid into a plurality of the sample processing chips 100, the liquid to be used is different for each sample processing chip 100.

Figure 2:
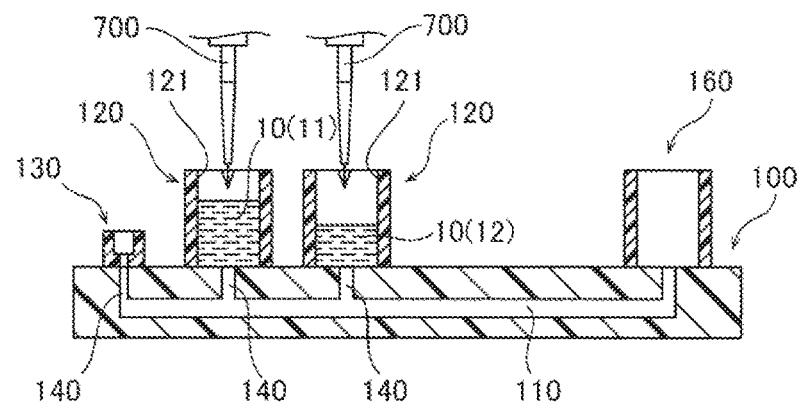
FIG. 2 illustrates an example where a first liquid is injected into a liquid holding portion.

For example, in the example shown in FIG. 2, the first liquid 10 contains a sample 11 derived from an organism. The sample 11 derived from an organism can be sent directly into the flow path 110 from the liquid holding portion 120 provided in the sample processing chip 100 without sending the sample 11 through, for example, a liquid sending tube of the liquid sending device 500. As a result, even when the liquid sending process by the same liquid sending device 500 is repeated for a plurality of different sample processing chips 100, contamination of the sample 11 can be prevented.

The sample 11 derived from an organism is, for example, liquid such as body fluid or blood (whole blood, serum or plasma) collected from a patient, or liquid obtained by subjecting collected body fluid or blood to a predetermined pretreatment. The sample includes, for example, nucleic acid such as DNA (deoxyribonucleic acid), a cell and an intracellular substance, an antigen or antibody, protein, or peptide, as a target component for sample processing. For example, in a case where the target component is nucleic acid, an extract obtained by nucleic acid being extracted from blood or the like by a predetermined pretreatment, is used as the sample 11 derived from an organism.

In the example shown in FIG. 2, the first liquid 10 contains a component 12 corresponding to a test item of sample testing using the sample processing chip 100. Thus, the component 12 corresponding to the test item of the sample testing can be sent directly into the flow path 110 from the liquid holding portion 120 provided in the sample processing chip 100 without sending the component 12 through, for example, a liquid sending tube of the liquid sending device 500. As a result, even when the liquid sending process by the same liquid sending device 500 is repeated for a plurality of the sample processing chips 100 for performing sample testing of different test items, contamination of the component 12 corresponding to the test item can be prevented.

The component 12 corresponding to a test item of sample testing is determined according to a target component contained in the sample 11 or the contents of the sample processing. The component 12 corresponding to a test item of sample testing contains, for example, a component that reacts specifically with a target component contained in the sample 11. For example, in a case where the target component contained in the sample 11 is DNA, the component 12 corresponding to the test item of the sample testing contains, for example, a polymerase or a primer for PCR amplification. In a case where the target component contained in the sample 11 is an antigen or antibody, the component 12 corresponding to the test item of the sample testing contains, for example, an antibody or antigen that specifically binds to the antigen or antibody that is the target component. The component 12 corresponding to the test item of the sample testing may contain, for example, a carrier that carries the target component contained in the sample 11, or a substance that causes the carrier and the target component to bind to each other.

In the example shown in FIG. 1, pressure is applied to the liquid holding portion 120 into which the first liquid 10 is injected by an injector 700 (see FIG. 2), whereby the first liquid 10 is sent into the flow path 110. That is, as shown in FIG. 2, before liquid is sent, the first liquid 10 is injected by the injector 700 through the opening 121 into the tubular liquid holding portion 120 having the opening 121. The injector 700 is, for example, a pipette, a syringe, or a dispenser device. Thus, as in a case where liquid is injected into a standard well plate or the like, an operator is allowed to easily inject the first liquid 10 into the liquid holding portion 120 by using the injector 700 such as a pipette. Therefore, convenience is enhanced for the operator.

In the exemplary structure shown in FIG. 2, the sample processing chip 100 includes a plurality of the liquid holding portions 120, and the plurality of the liquid holding portions 120 hold different kinds of the first liquids 10, respectively. The first liquids 10 are mixed in the flow path 110 by the liquid sending, and are subjected to predetermined sample processing. In FIG. 2, a specimen after sample processing is sent to a liquid holding portion 160 provided in the sample processing chip 100.

Figure 3:
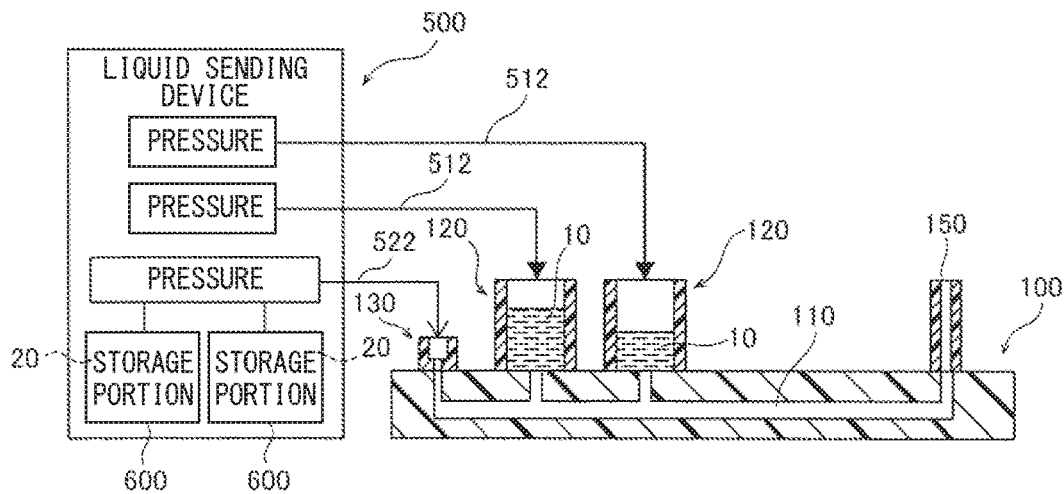
FIG. 3 illustrates an example where a second liquid is sent.

In a case where the number of the liquid holding portions 120 provided is plural, a plurality of kinds of the first liquids 10 held in the plurality of the liquid holding portions 120 are sent into the flow path 110 by applying pressure to the liquid holding portions 120, respectively, as shown in FIG. 3. Thus, a plurality of kinds of the first liquids 10 can be sent in parallel. As a result, a desired amount of liquid can be sent expeditiously. The liquid sending device 500 allows a plurality of kinds of the first liquids 10 to be sent at different flow rates by, for example, separately applying pressure to the liquid holding portions 120, respectively. The liquid sending device 500 allows sending of a plurality of kinds of the first liquids 10 to be started at different times by, for example, applying pressure to the liquid holding portions 120 at different times, respectively. Thus, a plurality of kinds of the first liquids 10 can be freely sent into the sample processing chip 100, whereby liquid can be sent so as to correspond to various sample processing assays.

The first liquids 10 in a plurality of the liquid holding portions 120 may be sent into the flow path 110 by pressure being supplied through a common pressure path 512. The same kind of the first liquid 10 may be held in the plurality of the liquid holding portions 120.

(Second Liquid)

A liquid used as the second liquid 20 is not particularly limited when the liquid can be used in the sample processing in the sample processing chip 100. In a case where an amount of a liquid to be supplied into the flow path 110 is greater than an amount of the first liquid 10, the liquid is preferably supplied from the storage portion 600 as the second liquid 20 when the liquid is used in common in the case of the liquid sending process being repeated for a plurality of the sample processing chips 100.

For example, in the step of mixing a sample and a reagent, or a step of causing the sample and the reagent to react with each other, liquid containing the sample is used as the first liquid 10, and the reagent that does not contain the sample is used as the second liquid 20. In the step of forming a fluid in an emulsion state, a liquid medium for dispersing droplets is used as the second liquid 20. In the step of demulsifying the emulsion, a reagent for demulsification is used as the second liquid 20. In the step of separating, from the sample, an unnecessary component contained in the sample and washing the sample, washing liquid or the like is used as the second liquid 20.

In the example shown in FIG. 1, the storage portion 600 has a volume greater than the liquid holding portion 120. In the example shown in FIG. 1, the second liquid 20 is sent into the flow path 110 through the injection hole 130 from the storage portion 600 at a flow rate higher than a flow rate of the first liquid 10. Thus, the second liquid 20 can be sent at a flow rate higher than that of the first liquid 10 from the liquid sending device 500. Limitation of an installation space or the like of the storage portion 600 provided in the liquid sending device 500 is less than limitation of an installation space of the liquid holding portion 120 of the sample processing chip 100, and the storage portion 600 can be easily enlarged. Therefore, even when an amount of the second liquid 20 to be used is large, a sufficient amount of the second liquid 20 to be sent can be easily assured. For example, the flow rate of the second liquid 20 is set to be not less than twice the flow rate of the first liquid 10.

A plurality of kinds of the second liquids 20 may be supplied to the sample processing chip 100. In the example shown in FIG. 3, a plurality of kinds of the second liquids 20 stored in a plurality of the storage portions 600 are each sent through the common injection hole 130 into the flow path 110. The plurality of kinds of the second liquids 20 are stored in the different storage portions 600, respectively, and, during the liquid sending, the second liquids 20 are sent through a common liquid sending tube 522 from the same injection hole 130 into the flow path 110. Thus, the sample processing chip 100 need not be provided with a plurality of the injection holes 130 corresponding to the plurality of kinds of the second liquids 20, and the sample processing chip 100 can be made simple and compact. The liquid sending device 500 need not have multiple liquid sending tubes corresponding to the plurality of the injection holes 130, and the structure of the liquid sending device 500 can be thus simplified. That is, even when a plurality of kinds of the second liquids 20 are used, a structure for sending liquid can be simplified.

In the example shown in FIG. 3, a fluid in the flow path 110 is collected through a discharge outlet 150 provided in the sample processing chip 100. Thus, a specimen or waste liquid can be easily collected after sample processing through the discharge outlet 150 from the sample processing chip 100.

Figure 4:
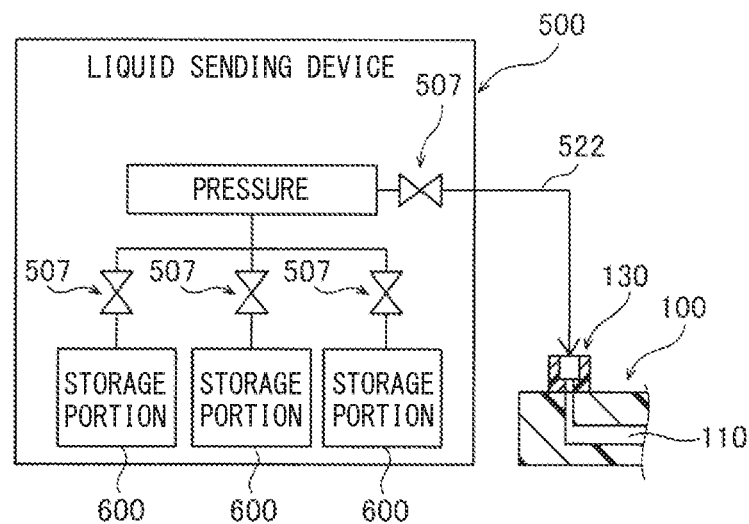
FIG. 4 illustrates an example where the second liquid to be sent is switched by opening and closing a valve.

In the example shown in FIG. 4, switching among valves 507 disposed between the injection hole 130 and a plurality of the storage portions 600, respectively, in the liquid sending device 500 is performed, whereby a plurality of kinds of the second liquids 20 are each sent through the injection hole 130 into the flow path 110. Thus, the plurality of kinds of the second liquids 20 can be each sent easily into the flow path 110 by switching of the valve 507 without, for example, changing connection of a liquid sending tube in the liquid sending device 500 or moving the storage portion 600 in order to select the second liquid 20 to be sent. In FIG. 4, the valves 507 are provided so as to correspond to the plurality of the storage portions 600, respectively. Furthermore, the liquid sending tube 522 is provided with the valve 507 for controlling starting or stopping of liquid sending. The valve 507 may be not only a simple two-way valve but also a multi-way valve that allows switching between multiple paths. For example, one four-way valve may be connected between the three storage portions 600 and a pressure source to enable switching.

A path may be switched in a manner other than a manner using the valve 507. For example, the second liquid 20 to be supplied may be changed by moving an aspiration mechanism provided so as to be movable between the plurality of the storage portions 600. The plurality of the storage portions 600 may be set so as to be movable and the storage portion 600 may be selectively positioned at a position at which the aspiration mechanism is disposed. In a case where a plurality of kinds of the second liquids 20 are used, the second liquids 20 may be send into the different injection holes 130, respectively.

Figure 5:
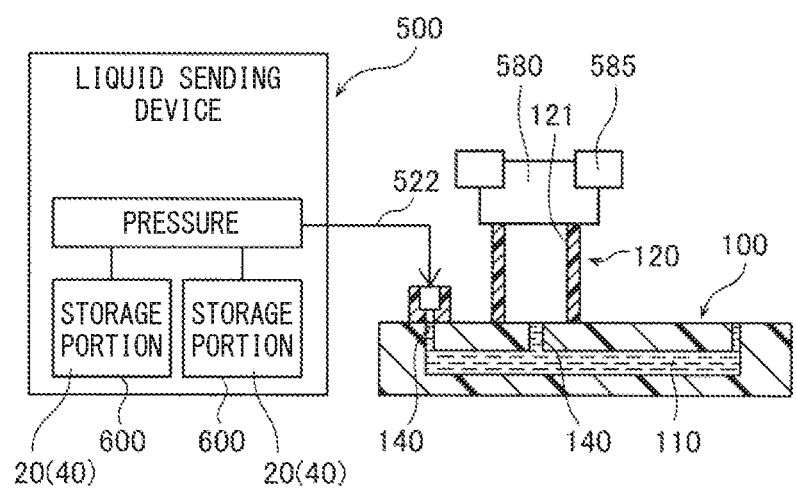
FIG. 5 illustrates an example where a fourth liquid is disposed in a flow path.

FIG. 5 illustrates an example where a fourth liquid 40 is sent in advance in order to inhibit leakage of the first liquid 10 from the liquid holding portion 120. The first liquid 10 is held in advance in the liquid holding portion 120 before sample processing using the sample processing chip 100 is started. Before liquid is sent into the flow path 110, a hollow space is formed inside the flow path 110. Therefore, in a case where, after the first liquid 10 is injected into the liquid holding portion 120, the first liquid 10 is left as it is without starting sending of the first liquid 10, the first liquid 10 may be moved naturally into the flow path 110 with elapse of time depending on the structure of the sample processing chip 100.

Therefore, in the example shown in FIG. 5, by applying pressure to the storage portion 600, the fourth liquid 40 stored in the storage portion 600 is sent through the injection hole 130 into the flow path 110 and disposed in the flow path 110. After the fourth liquid 40 has been disposed in the flow path 110 or in parallel with disposing of the fourth liquid 40 in the flow path 110, the first liquid 10 is put into a state where the first liquid 10 can be injected into the liquid holding portion 120. For example, in FIG. 5, when the fourth liquid 40 is sent, the opening 121 of the liquid holding portion 120 is covered with a lid 580. The lid 580 is fixed by a locking mechanism 585. After the fourth liquid 40 has been disposed in the flow path 110, or in parallel with disposing of the fourth liquid 40 in the flow path 110, locking of the lid 580 by the locking mechanism 585 is cancelled. Therefore, the lid 580 is opened to expose the opening 121, whereby the first liquid 10 can be injected into the liquid holding portion 120 by the injector 700 (see FIG. 2). When injection of the first liquid 10 into the liquid holding portion 120 is completed, the fourth liquid 40 has been disposed in the flow path 110. Therefore, the fourth liquid 40 in the flow path 110 inhibits the first liquid 10 from moving into the flow path 110.

Thus, when the first liquid 10 is held in the liquid holding portion 120, the fourth liquid 40 can inhibit the first liquid 10 from moving into the flow path 110. As a result, for example, also in a case where it takes time to send the first liquid 10 after the first liquid 10 has been held in the liquid holding portion 120 due to convenience of an operator who performs sample processing, the first liquid 10 can be held in the liquid holding portion 120.

The liquid sending process for disposing the fourth liquid 40 in the flow path 110 is preferably completed before injection of the first liquid 10 into the liquid holding portion 120. However, a flow path resistance is relatively high in a micro flow path having a small flow path diameter, and the first liquid 10 does not immediately move toward the flow path 110 after injection of the first liquid 10. Therefore, injection of the first liquid 10 into the liquid holding portion 120 may be started halfway through the liquid sending process for disposing the fourth liquid 40.

Preferably, in a range, of the flow path 110, which includes at least the connection portion 140 for connection to the liquid holding portion 120 in which the first liquid 10 is held, the flow path 110 is filled with the fourth liquid 40. That is, in the connection portion 140 for connection to the liquid holding portion 120 in which the first liquid 10 is held, the fourth liquid 40 is filled. Thus, the fourth liquid 40 that is filled in the connection portion 140, in the flow path 110, for connection to the liquid holding portion 120, can effectively inhibit the first liquid 10 from moving toward the flow path 110. The entirety of the flow path 110 may be filled with the fourth liquid 40.

As the fourth liquid 40, a liquid dedicated to inhibition of moving of the first liquid 10 toward the flow path 110 may be used. In this case, similarly to the second liquid 20, the storage portion 600 having the fourth liquid 40 stored therein is provided in the liquid sending device 500, or is connected to the liquid sending device 500 from the outside. In the example shown in FIG. 5, as the fourth liquid 40, the second liquid 20 stored in the storage portion 600 is used. Thus, the second liquid 20 used for the sample processing can be used also as the fourth liquid 40, whereby the dedicated fourth liquid 40 need not be prepared separately from the second liquid 20. A structure of the liquid sending device 500 for sending the fourth liquid 40 and a structure for sending the second liquid 20 can be the same, whereby the structure for sending liquid can be simplified.

[Example of Structure of Sample Processing Chip]

Figure 6:
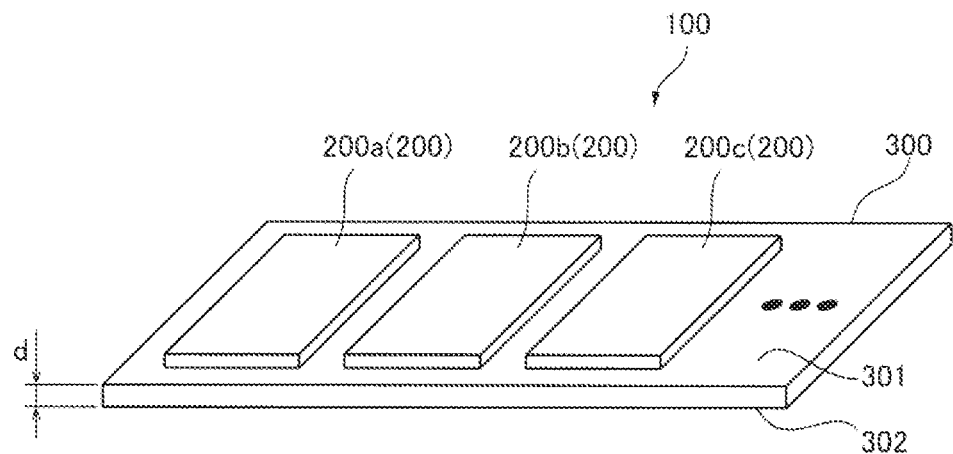
FIG. 6 is a perspective view of an exemplary structure of a sample processing chip.

FIG. 6 illustrates an exemplary structure of the sample processing chip 100 according to the present embodiment. The sample processing chip 100 includes a plurality of fluid modules 200 and a base plate 300. Each fluid module 200 has the flow path 110 formed therein. On the base plate 300, one or more fluid modules 200 are disposed. In the example shown in FIG. 6, a sample containing a target component, a reagent, and the like flow sequentially through the fluid modules 200a, 200b, and 200c. Therefore, an assay is performed so as to correspond to a combination of a plurality of kinds of fluid modules. The fluid modules 200a, 200b, and 200c are different kinds of fluid modules, respectively. That is, in the fluid modules 200a, 200b, and 200c, the different sample processing steps, respectively, are performed by liquid sending. By a combination of the fluid modules 200 disposed on the base plate 300 being changed, various assays can be performed according to the combination. There is no limitation on the number of the fluid modules 200 disposed on the base plate 300. The shape of the fluid module 200 may be different for each kind.

Figure 7:
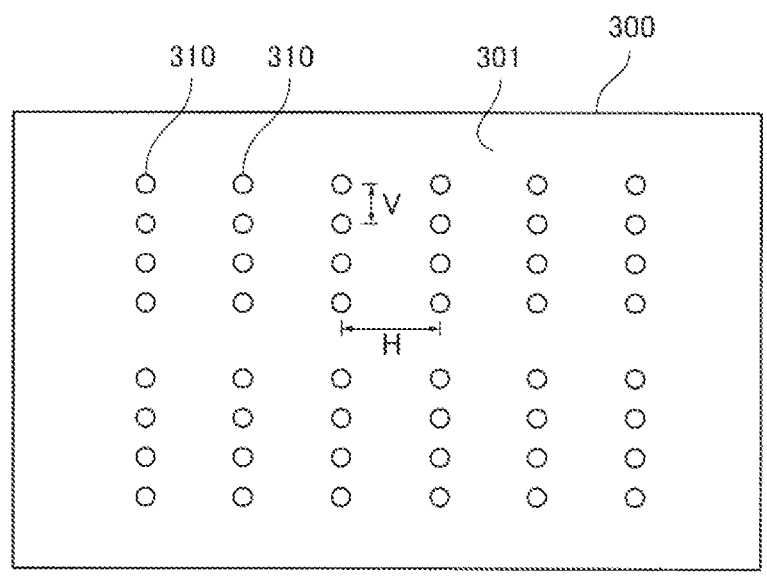
FIG. 7 is a plan view of an exemplary structure of a base plate of the sample processing chip.

FIG. 7 illustrates an exemplary structure of the base plate 300. The base plate 300 includes a plurality of base plate flow paths 310. The base plate 300 is flat-plate-shaped, and has a first surface 301 that is the main surface, and a second surface 302 (see FIG. 6). The second surface 302 is a surface opposite to the first surface 301. In FIG. 6, the upper surface of the base plate 300 in FIG. 6 is the first surface 301. However, the first surface 301 may be the lower surface. The base plate 300 is formed from glass, resin, or the like.

A thickness d of the base plate 300 is, for example, not less than 1 mm and not greater than 5 mm. Thus, the base plate 300 can be formed so as to have a sufficient thickness as compared to a flow path height (on the order of about 10 μm to 500 μm) of the flow path 110 formed in the fluid module 200. As a result, the base plate 300 is easily allowed to assuredly have a sufficient pressure-resisting ability.

The base plate flow paths 310 are, for example, disposed with a predetermined pitch. In the example shown in FIG. 7, the base plate flow paths 310 are aligned with a pitch V in the vertical direction and a pitch H in the lateral direction. In this case, the fluid modules 200 are disposed at any positions on the base plate 300 in units of pitches, and the flow path 110 can be connected to any base plate flow path 310. Therefore, even in a case where a combination of the fluid modules 200 is changed, any combination and any alignment of the fluid modules 200 on the base plate 300 can be easily formed.

The base plate flow path 310 is, for example, a through hole that penetrates through the base plate 300 in the thickness direction. The base plate flow paths 310 are connected to the flow path 110 of the fluid module 200 and are further structured as the connection portion 140, for connection to the liquid holding portion 120, for supplying the first liquid 10 into the sample processing chip 100, and as the connection portion 140, for connection to the injection hole 130, for supplying the second liquid 20 into the sample processing chip 100. For example, the fluid module 200 having the flow path 110 is disposed on one of the first surface 301 and the second surface 302, and the liquid holding portion 120 and the injection hole 130 are disposed in the other of the first surface 301 and the second surface 302. The base plate flow path 310 is provided so as to connect between: the flow path 110 of the fluid module 200; and the liquid holding portion 120 and the injection hole 130.

The fluid module 200 is formed from, for example, a resinous material. For example, each fluid module 200 is connected to the base plate 300 by solid-phase joining. As the solid-phase joining, a method of performing plasma processing on surfaces to be joined, to form OH radicals, thereby joining the surfaces by hydrogen bonds, or a method using vacuum pressure bonding or the like can be adopted, for example. The fluid module 200 may be connected to the base plate 300 by an adhesive or the like.

Figure 8:
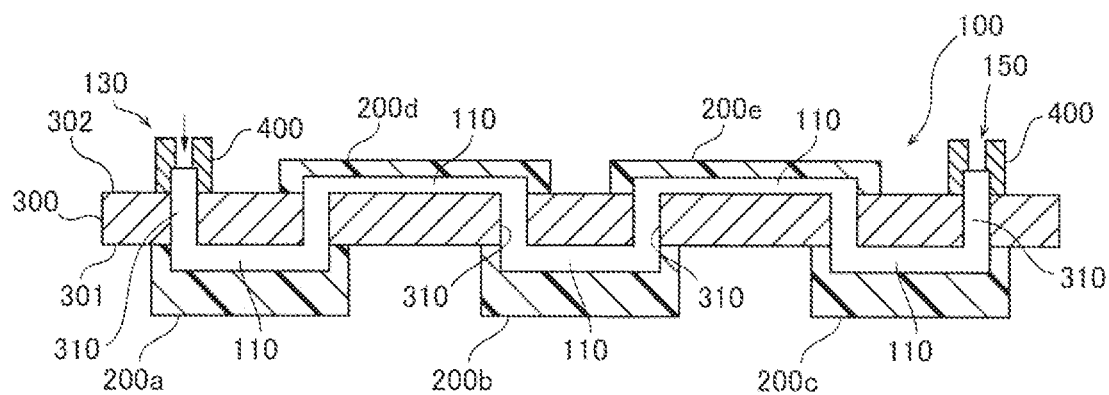
FIG. 8 is a vertical cross-sectional view schematically illustrating an example where fluid modules are disposed in the base plate.

In the exemplary structure shown in FIG. 8, the sample processing chip 100 includes fluid modules 200a, 200b, and 200c disposed on the first surface 301 of the base plate 300, and fluid modules 200d and 200e disposed on the second surface 302. The fluid modules 200 are connected to each other through the base plate flow paths 310 of the base plate 300. Thus, the sample processing chip 100 may have the fluid module 200 on each of the first surface 301 and the second surface 302.

Figure 9:
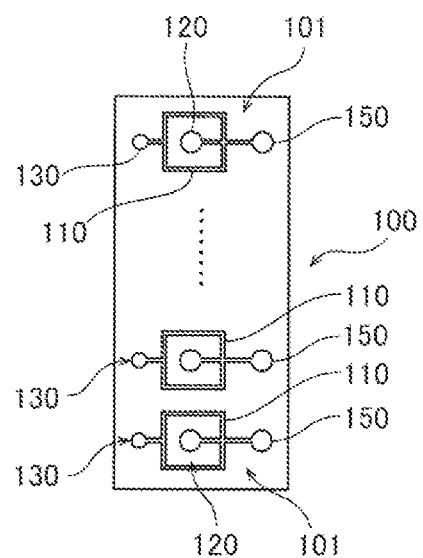
FIG. 9 is a plan view illustrating a first exemplary disposition where flow paths are disposed in the sample processing chip.

As shown in FIG. 9, in the sample processing chip 100, unit flow path structures 101 each of which is a unit structure for performing a predetermined processing step may be arranged so as to be in parallel. The unit flow path structure 101 includes the flow path 110, the liquid holding portion 120, the injection hole 130, the discharge outlet 150, and the like. In FIG. 9, substantially the same type of unit flow path structures 101 are aligned in the sample processing chip 100. The unit flow path structures 101 may be formed by the separate fluid modules 200, respectively, or a plurality of the unit flow path structures 101 may be aligned on the common fluid module 200. In the sample processing chip 100, for example, the plurality of the unit flow path structures 101 may be linearly arranged at regular intervals, or may be aligned longitudinally and laterally so as to form an array as shown in FIG. 10.

Figure 10:
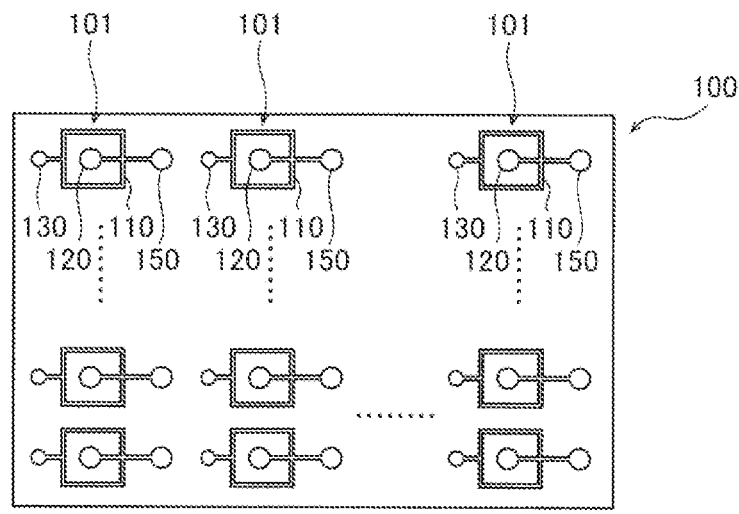
FIG. 10 is a plan view illustrating a second exemplary disposition where flow paths are disposed in the sample processing chip.

As shown in FIG. 9 and FIG. 10, in a case where a plurality of the flow paths 110 are disposed in the sample processing chip 100, the second liquid 20 in the storage portion 600 is sent into the plurality of the flow paths 110 through a plurality of the injection holes 130 provided in the plurality of the flow paths 110, respectively, of the sample processing chip 100 by applying pressure to the storage portion 600. Thus, for example, unlike in the case of the second liquid 20 being injected into liquid holding portions provided for the second liquid 20 in the plurality of the flow paths 110, respectively, the second liquid 20 can be collectively sent into the plurality of the flow paths 110 by the second liquid 20 being merely stored in the storage portion 600 of the liquid sending device 500. Therefore, an operation of storing the second liquid 20 can be simplified. Since the second liquid 20 can be sent into the plurality of the flow paths 110 from the storage portion 600 in parallel, expeditious liquid sending can be performed even when the sample processing chip 100 includes a plurality of the flow paths 110.

[Outline of Liquid Sending Device]

Next, an outline of a liquid sending device for performing the liquid sending method according to the present embodiment will be described.

The liquid sending device 500 is a liquid sending device for sending liquid into the sample processing chip 100 having the flow path 110 into which a plurality of liquids flow. The contents of the sample processing depend on the structure of the sample processing chip 100. Therefore, the liquid sending device 500 can send liquid for performing different kinds of sample processing according to a kind of the sample processing chip 100 to be used.

The liquid sending device 500 includes a first liquid sending mechanism 510 and a second liquid sending mechanism 520. The first liquid sending mechanism 510 and the second liquid sending mechanism 520 are each structured so as to include a pump that serves as a pressure source, tubing for supplying pressure, a valve for controlling sending of liquid, and the like.

The first liquid sending mechanism 510 sends the first liquid 10 held in the liquid holding portion 120 provided in the sample processing chip 100, into the flow path 110 of the sample processing chip 100. The first liquid sending mechanism 510 sends the first liquid 10 held in the liquid holding portion 120, into the flow path 110, by applying pressure to the liquid holding portion 120. In the exemplary structure shown in FIG. 11, a connector 400 is attached to the liquid holding portion 120, to connect between the first liquid sending mechanism 510 and the inside of the liquid holding portion 120. The connector 400 seals the opening 121 of the liquid holding portion 120. The first liquid sending mechanism 510 supplies pressure through the connector 400 from the opening 121 side of the liquid holding portion 120, to push the first liquid 10 toward the flow path 110. The first liquid 10 is moved into the flow path 110 through the connection portion 140 by pressure.

The second liquid sending mechanism 520 sends the second liquid 20 in the storage portion 600, through the injection hole 130 provided in the sample processing chip 100, into the flow path 110. The second liquid sending mechanism 520 sends the second liquid 20 in the storage portion 600, through the injection hole 130, into the flow path 110 by applying pressure to the storage portion 600 having the second liquid 20 stored therein. In the exemplary structure shown in FIG. 11, the connector 400 is attached to the injection hole 130, to connect between the second liquid sending mechanism 520 and the injection hole 130. The connector 400 seals the injection hole 130. The second liquid sending mechanism 520 is fluidly connected to the inside of the storage portion 600. The second liquid sending mechanism 520 supplies pressure into the storage portion 600, to move the second liquid 20 in the storage portion 600 into the injection hole 130. The second liquid 20 in the storage portion 600 is moved into the flow path 110 through the injection hole 130 by pressure.

The liquid sending device 500 allows a fluid containing the first liquid 10 and the second liquid 20 to be formed in the flow path 110 through the liquid sending by the first liquid sending mechanism 510 and the second liquid sending mechanism 520. That is, the first liquid 10 moved from the liquid holding portion 120 and the second liquid 20 moved through the injection hole 130 merge and flow in the same flow path 110. A part or the entirety of sample processing by the sample processing chip 100 is performed according to the first liquid 10 and the second liquid 20 being sent.

In the liquid sending device 500 for the sample processing chip 100 of the present embodiment, the storage portion 600 stores the second liquid 20 used for sample processing, and the second liquid sending mechanism 520 applies pressure to the storage portion 600 to send the second liquid 20 from the storage portion 600 through the injection hole 130 of the sample processing chip 100 into the flow path 110, in the above-described structure. Thus, the second liquid 20, among the first liquid 10 and the second liquid 20, need not be manually injected into the sample processing chip 100. Therefore, when liquid is injected into the sample processing chip 100, an operation can be inhibited from becoming bothersome. Unlike in the case of sending of liquid by using a capillary, the second liquid 20 is sent from the liquid sending device 500 by pressure being applied to the storage portion 600 by the second liquid sending mechanism 520, and, therefore, liquid can be easily sent expeditiously even at a relatively high flow rate by using a pressure source such as a pump. Consequently, when liquid is injected into the sample processing chip 100, a desired amount of liquid can be sent expeditiously while an operation can be inhibited from becoming bothersome.

Figure 11:
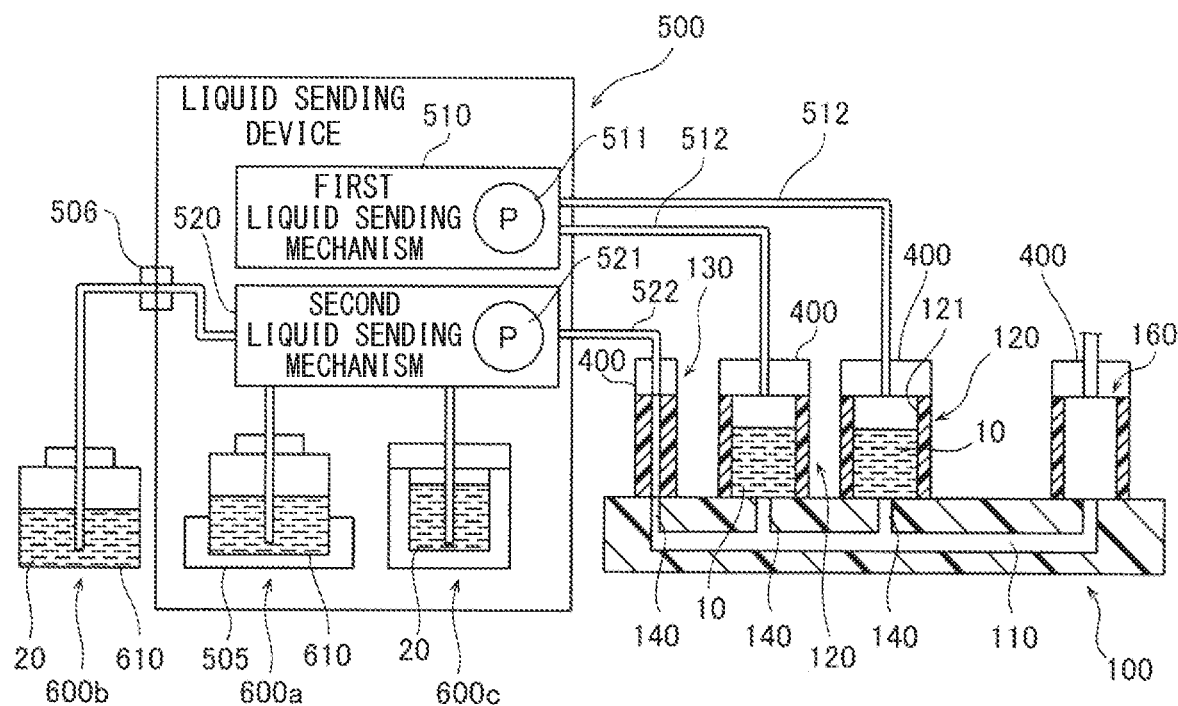
FIG. 11 illustrates an outline of a liquid sending device.

In the exemplary structure shown in FIG. 11, the first liquid sending mechanism 510 includes a first pressure source 511 for applying pressure to the liquid holding portion 120. The second liquid sending mechanism 520 includes a second pressure source 521 for applying pressure to the storage portion 600. The first liquid sending mechanism 510 and the second liquid sending mechanism 520 have separate pressure sources, respectively, and can independently apply pressure. Thus, sending of the first liquid 10 held in the liquid holding portion 120 and sending of the second liquid 20 stored in the storage portion 600 can be separately performed by the first pressure source 511 and the second pressure source 521, respectively. As a result, pressure for sending liquid and liquid sending start time can be freely controlled, whereby a degree of freedom for liquid sending process is enhanced.

As the first pressure source 511 and the second pressure source 521, for example, various kinds of pumps such as a pressure pump, a syringe pump, and a diaphragm pump can be used. As a pump used in the liquid sending device 500 for the sample processing chip 100, for example, a syringe pump having a high metering performance or high controllability of a flow rate or pressure is preferably used. Other than this, the first liquid sending mechanism 510 and the second liquid sending mechanism 520 may have a common pressure source. In this case, liquid to be sent can be switched by, for example, switching the pressure path 512.

In the exemplary structure shown in FIG. 11, the first liquid sending mechanism 510 includes the pressure path 512 that connects between the first pressure source 511 and the liquid holding portion 120. The second liquid sending mechanism 520 includes the liquid sending tube 522 that connects between the storage portion 600 and the injection hole 130. The first liquid sending mechanism 510 supplies pressure from the first pressure source 511 through the pressure path 512 to the liquid holding portion 120. The second liquid sending mechanism 520 moves the second liquid 20 from the storage portion 600 through the liquid sending tube 522 into the injection hole 130 by pressure from the second pressure source 521. Thus, the first liquid 10 and the second liquid 20 can be sent through separate paths, respectively. Therefore, unlike in the case of sending of the first liquid 10 by the first liquid sending mechanism 510 and sending of the second liquid 20 by the second liquid sending mechanism 520 being performed by, for example, switching connection to a common path, a degree of freedom for liquid sending process is enhanced.

Figure 12:
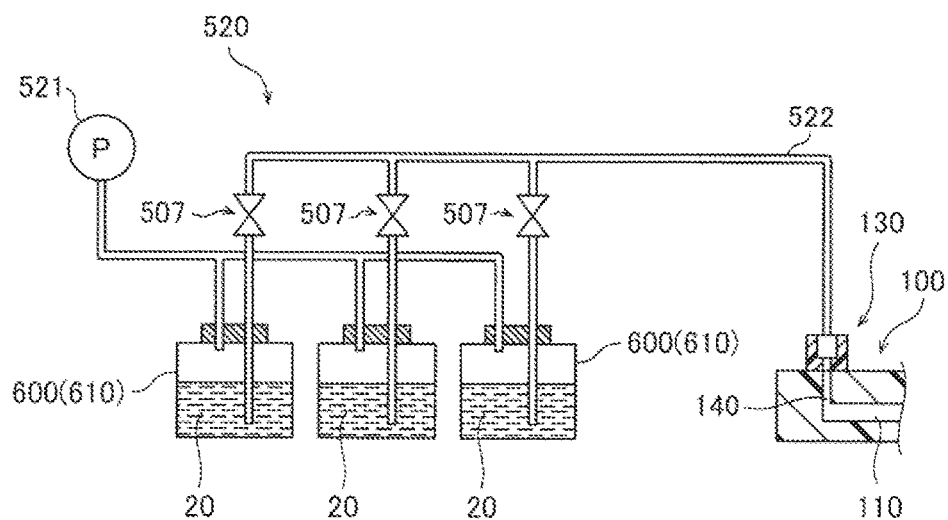
FIG. 12 illustrates an exemplary structure of a second liquid sending mechanism.

The pressure path 512 and the liquid sending tube 522 are each formed from a tubing member. Pressure can be transmitted through the pressure path 512 by using gas pressure, air pressure, or liquid pressure as a medium. For example, the first pressure source 511 sends inert gas, air, or the like into the pressure path 512, and pressurizes and supplies it into the liquid holding portion 120. The first pressure source 511 may pressurizes and supplies, into the liquid holding portion 120, a liquid medium for pressurizing the first liquid 10. The liquid sending tube 522 is formed from a tube member through which the second liquid 20 flows. Pressure to be supplied into the storage portion 600 by the second pressure source 521 may be a positive pressure or a negative pressure. For example, in FIG. 11, the second liquid 20 in the storage portion 600 is taken into a syringe by negative pressure from the second pressure source 521 such as a syringe pump, and the second liquid 20 is sent into the liquid sending tube 522 toward the injection hole 130 by positive pressure. In FIG. 12, the second liquid 20 in the storage portion 600 is pushed out by positive pressure from the second pressure source 521 such as a pressure pump, and the second liquid 20 is sent into the liquid sending tube 522 toward the injection hole 130.

As shown in FIG. 11, various structures can be adopted for the storage portion 600. The storage portion 600 may be disposed inside the liquid sending device 500 or outside the liquid sending device 500. For example, a storage portion 600a is a liquid container 610 in which the second liquid 20 is stored. The liquid sending device 500 includes a container setting portion 505 at which the liquid container 610 is set. That is, the liquid sending device 500 uses a bottle for the second liquid 20 as it is, to send the second liquid 20 into the sample processing chip 100. Thus, the second liquid 20 can be directly sent from the liquid container 610 that is set at the container setting portion 505 of the liquid sending device 500. An operator merely sets the liquid container 610 at the container setting portion 505. Therefore, for example, as compared to a case where the second liquid 20 is transferred into a storage portion such as a liquid chamber in the liquid sending device 500, the liquid container 610 can be used as the storage portion 600 as it is, and convenience is thus enhanced for an operator.

In the example shown in FIG. 11, a storage portion 600b is the liquid container 610 in which the second liquid 20 is stored, and the liquid sending device 500 includes an external connection portion 506 for connecting between the external liquid container 610 and the second liquid sending mechanism 520. The external connection portion 506 include tubing through which the second liquid 20 in the liquid container 610 is transferred into the second liquid sending mechanism 520 in the liquid sending device 500. An operator merely sets the external connection portion 506 in the liquid container 610, for connection to the second liquid sending mechanism 520. Thus, since the storage portion 600 for the second liquid 20 can be disposed outside the device, the liquid sending device 500 can be made compact as compared to a case where the storage portion 600 is disposed inside the device. For example, as compared to a case where the second liquid 20 is transferred into a storage portion such as a liquid chamber in the liquid sending device 500, the liquid container 610 can be used as the storage portion 600 as it is, and convenience is thus enhanced for an operator.

In FIG. 11, a storage portion 600c is a chamber provided in the liquid sending device 500. The second liquid 20 is transferred into the chamber from the liquid container 610, to be set in the liquid sending device 500. The storage portion 600 may have such a structure.

The first liquid sending mechanism 510 sends the first liquid 10 into the flow path 110 by controlling pressure to be applied to the liquid holding portion 120 that holds the first liquid 10 containing the sample 11 derived from an organism. Thus, the sample 11 derived from an organism can be sent directly into the flow path 110 from the liquid holding portion 120 provided in the sample processing chip 100 without taking the sample 11 into the device. As a result, even when liquid sending process is repeated for a plurality of different sample processing chips 100, contamination of the sample 11 can be prevented.

The first liquid sending mechanism 510 sends the first liquid 10 into the flow path 110 by controlling pressure to be applied to the liquid holding portion 120 that holds the first liquid 10 containing the component 12 corresponding to a test item of sample testing using the sample processing chip 100. Thus, the component 12 corresponding to the test item of the sample testing can be sent directly into the flow path 110 from the liquid holding portion 120 provided in the sample processing chip 100 without taking the component 12 into the device. As a result, even when liquid sending process is repeated for a plurality of the sample processing chips 100 that perform sample testing of different test items, contamination of the component 12 corresponding to the test item can be prevented.

In FIG. 11, the first liquid sending mechanism 510 sends a plurality of kinds of the first liquids 10 into the flow path 110 by controlling pressure to be applied to the plurality of kinds of the first liquids 10 that are stored in a plurality of the liquid holding portions 120, respectively. Thus, by different pressures being applied, a plurality of kinds of the first liquids 10 can be sent at different flow rates, respectively, or sending of a plurality of kinds of the first liquids 10 can be started at different times, respectively. As a result, the plurality of kinds of the first liquids 10 can be freely sent into the sample processing chip 100, whereby liquid sending can be performed so as to be appropriate to various sample processing assays.

The first liquid 10 is injected into the liquid holding portion 120 by the injector 700 (see FIG. 2). The first liquid sending mechanism 510 sends the first liquid 10 into the flow path 110 by applying pressure to the liquid holding portion 120 into which the first liquid 10 is injected by the injector 700. Thus, similarly to injection of liquid to a well plate or the like, an operator is allowed to easily inject the first liquid 10 through the opening 121 of the liquid holding portion 120 by using the injector 700 such as a pipette, whereby convenience is enhanced for an operator.

In the exemplary structure shown in FIG. 11, the second liquid sending mechanism 520 sends the second liquid 20 into the flow path 110 at a flow rate higher than a flow rate of the first liquid 10 that is sent by the first liquid sending mechanism 510. Thus, the second liquid 20 can be sent, at a flow rate higher than that of the first liquid 10, from the storage portion 600. Limitation of an installation space or the like of the storage portion 600 provided in the liquid sending device 500 is less than limitation of an installation space or the like of the liquid holding portion 120 of the sample processing chip 100, and the size of the storage portion 600 can be easily increased. Therefore, an amount of the second liquid 20 to be sent is easily allowed to be sufficiently assured even when an amount of the second liquid 20 to be used is large.

In the exemplary structure shown in FIG. 11, the second liquid sending mechanism 520 sends a plurality of kinds of the second liquids 20 stored in a plurality of the storage portions 600 through the common injection hole 130 into the flow path 110. The number of the storage portions 600 to be provided can be the number corresponding to the kinds of the second liquids 20 to be supplied from the liquid sending device 500 into the sample processing chip 100. Thus, a plurality of liquid sending tubes need not be provided so as to correspond to a plurality of the injection holes 130, and the structure of the device can be thus simplified. That is, even when a plurality of kinds of the second liquids 20 are used, the structure for sending liquid can be simplified.

For example, as shown in FIG. 12, the second liquid sending mechanism 520 includes the valves 507 for switching connection of the storage portions 600, respectively, to the common injection hole 130, and switching between the valves 507 is performed, whereby the plurality of kinds of the second liquids 20 can be separately sent into the flow path 110 through the common injection hole 130.

In FIG. 12, the second pressure source 521 of the second liquid sending mechanism 520 is connected to each of a plurality (three) of the storage portions 600. The three storage portions 600 contain different kinds of the second liquids 20, respectively. The three storage portions 600 are connected, through the valves 507, respectively, to the common liquid sending tube 522 that branches at one end. The other end of the liquid sending tube 522 is connected to the injection hole 130 of the sample processing chip 100. The three valves 507 that allow or prevent movement of liquids from the storage portions 600 into the liquid sending tube 522 are selectively opened, whereby the second liquid 20 to be sent into the injection hole 130 can be selected.

When the valves 507 for switching connection of the storage portions 600, respectively, to the common injection hole 130 are provided, each of the plurality of kinds of the second liquids 20 can be easily sent into the flow path 110 by switching between the valves 507 without, for example, changing connection of the liquid sending tube in the liquid sending device 500 or moving the storage portion 600 for selecting the second liquid 20 to be sent.

Figure 13:
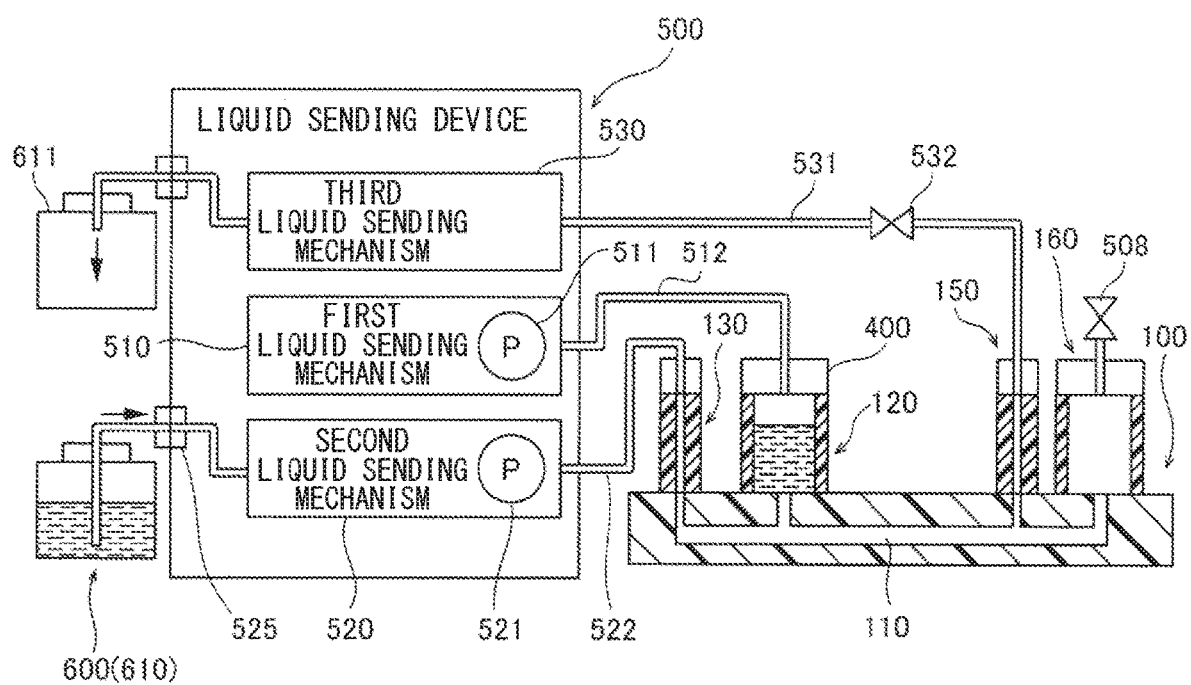
FIG. 13 illustrates an exemplary structure having a third liquid sending mechanism.

In the exemplary structure shown in FIG. 13, the liquid sending device 500 includes a third liquid sending mechanism 530 for collecting fluid formed in the flow path 110, through the discharge outlet 150 provided in the sample processing chip 100. For example, oil used in the step of forming droplets 50, washing liquid used in the step of washing a target component, or the like can be collected through the third liquid sending mechanism 530 into a collection container 611. Thus, specimen can be easily collected after sample processing from the sample processing chip 100 through the discharge outlet 150.

In FIG. 13, the third liquid sending mechanism 530 includes a valve 532 and a liquid sending tube 531 that connects between the discharge outlet 150 and the collection container 611. The sample processing chip 100 includes the liquid holding portion 160 for holding specimen having been subjected to sample processing. The liquid holding portion 160 for holding specimen having been subjected to sample processing is switched between an opened state and a sealed state by a valve 508. Fluid to be collected in the collection container 611 is sent from the flow path 110 through the discharge outlet 150 into the collection container 611 by opening the valve 532 and performing liquid sending in a state where the valve 508 is closed. The specimen having been subjected to the sample processing is sent into the liquid holding portion 160 by closing the valve 532 and opening the valve 508, and performing liquid sending. The third liquid sending mechanism 530 may not necessarily include a pressure source. Fluid can be sent from the flow path 110 into the third liquid sending mechanism 530 by pressure from the first liquid sending mechanism 510 or the second liquid sending mechanism 520.

Figure 14:
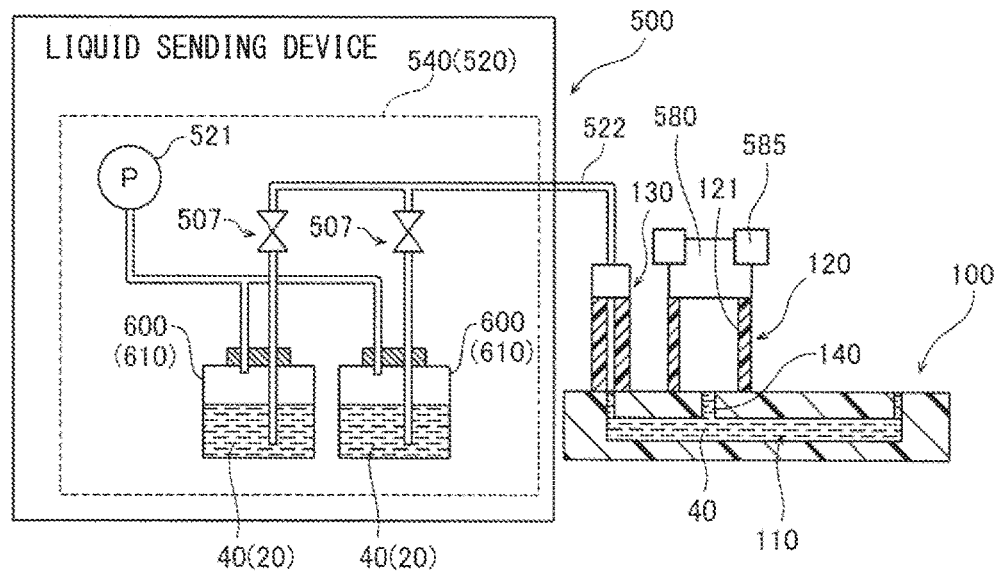
FIG. 14 illustrates an exemplary structure having a fourth liquid sending mechanism.

FIG. 14 illustrates an example of the liquid sending device 500 that allows the fourth liquid 40 to be disposed in the flow path 110. In the example shown in FIG. 14, the liquid sending device 500 includes a fourth liquid sending mechanism 540 that sends the fourth liquid 40 stored in the storage portion 600, through the injection hole 130, into the flow path 110 by applying pressure to the storage portion 600.

By the fourth liquid sending mechanism 540, the fourth liquid 40 is disposed in the flow path 110 of the sample processing chip 100 in a state where the first liquid 10 is not held in the liquid holding portion 120. For example, by the fourth liquid sending mechanism 540, the fourth liquid 40 is disposed in the flow path 110 in advance before the first liquid 10 is injected into the liquid holding portion 120. By the fourth liquid sending mechanism 540, the fourth liquid 40 may be disposed in the flow path 110 in parallel with the first liquid 10 being injected into the liquid holding portion 120. The fourth liquid 40 in the flow path 110 inhibits the first liquid 10 from moving into the flow path 110.

Thus, when the first liquid 10 is held in the liquid holding portion 120, the fourth liquid 40 can inhibit the first liquid 10 from moving into the flow path 110. As a result, for example, also in a case where it takes time to send the first liquid 10 after the first liquid 10 has been held in the liquid holding portion 120, due to convenience of an operator who performs sample processing, the first liquid 10 can be held in the liquid holding portion 120. In FIG. 14, while the fourth liquid 40 is sent by the fourth liquid sending mechanism 540, the liquid sending device 500 operates the locking mechanism 585 for the lid 580, to prohibit the first liquid 10 from being injected into the liquid holding portion 120. When the fourth liquid 40 is disposed in the flow path 110, the liquid sending device 500 cancels locking by the locking mechanism 585. As a result, the lid 580 is opened, and the first liquid 10 can be injected into the liquid holding portion 120.

In FIG. 14, the fourth liquid sending mechanism 540 is structured by the second liquid sending mechanism 520, and sends the second liquid 20 stored in the storage portion 600, as the fourth liquid 40, into the flow path 110. In other words, the second liquid sending mechanism 520 also functions as the fourth liquid sending mechanism 540. By the second liquid sending mechanism 520, not only the second liquid 20 is sent into the flow path 110 of the sample processing chip 100 when the sample processing is performed, but also the second liquid 20 stored in the storage portion 600 is used as the fourth liquid and disposed in the flow path 110 before the sample processing when the first liquid 10 is injected into the liquid holding portion 120. Thus, the second liquid 20 used in sample processing can be also used as the fourth liquid 40, whereby the dedicated fourth liquid 40 need not be prepared separately from the second liquid 20. The structure of the fourth liquid sending mechanism 540 for sending the fourth liquid 40 and the structure of the second liquid sending mechanism 520 can be the same. Therefore, the structure of the device can be simplified. The fourth liquid sending mechanism 540 and the second liquid sending mechanism 520 may be provided separately from each other.

In FIG. 14, by the fourth liquid sending mechanism 540, the flow path 110 is filled with the fourth liquid 40 in a range, of the flow path 110, including at least the connection portion 140 for connection to the liquid holding portion 120 in which the first liquid 10 is held. Thus, the fourth liquid 40 that is filled in the connection portion 140, of the flow path 110, for connection to the liquid holding portion 120, can effectively inhibit the first liquid 10 from moving toward the flow path 110. FIG. 14 illustrates an example where, by the fourth liquid sending mechanism 540, the entirety of the flow path 110 is filled with the fourth liquid 40.

(Example of Structure of Liquid Sending Device)

Figure 15:
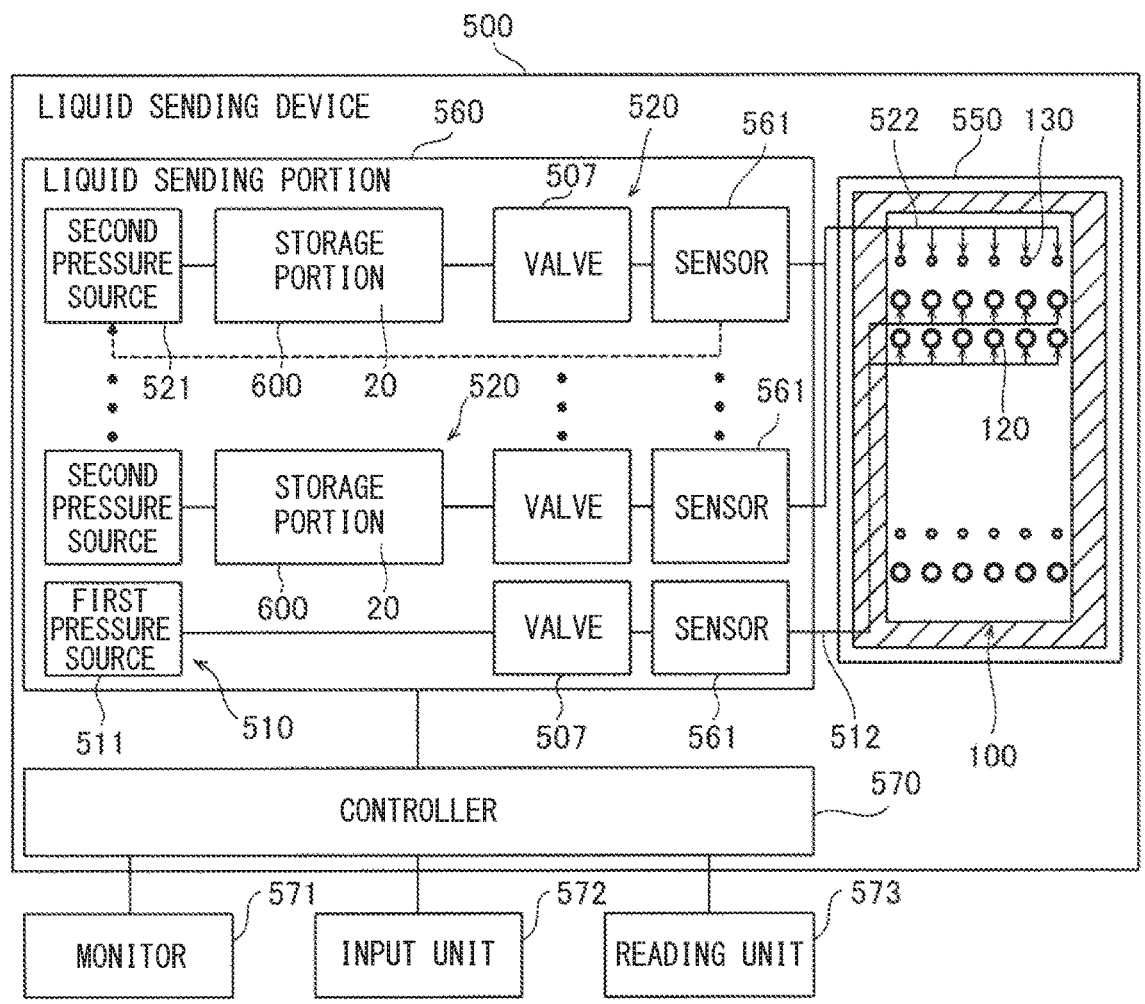
FIG. 15 is a block diagram illustrating an exemplary structure of the liquid sending device.

Next, a specific example of a structure of the liquid sending device 500 will be described. In FIG. 15, the liquid sending device 500 includes: a setting portion 550 on which the sample processing chip 100 is set; a liquid sending portion 560; and a controller 570 for controlling the liquid sending portion 560.

The setting portion 550 is formed into a shape corresponding to the sample processing chip 100, and supports the sample processing chip 100. The setting portion 550 is structured so as to open at least one of the upper portion and the lower portion of the sample processing chip 100 for connection of the sample processing chip 100 to the flow path or for setting a processing unit used in various processing steps in the sample processing chip 100. The setting portion 550 can be, for example, structured so as to have a recessed shape or a frame shape by which the peripheral edge portion of the sample processing chip 100 is supported.

The liquid sending portion 560 has a function of supplying and transferring a sample containing a target component, to the sample processing chip 100. That is, the liquid sending portion 560 includes a liquid sending mechanism that includes at least the first liquid sending mechanism 510 and the second liquid sending mechanism 520. The number of the first liquid sending mechanisms 510 to be provided and the number of the second liquid sending mechanisms 520 to be provided may be each plural. The liquid sending portion 560 may include the third liquid sending mechanism 530 and the fourth liquid sending mechanism 540.

The controller 570 controls the liquid sending portion 560 such that various kinds of liquids such as a sample and a reagent are supplied into the sample processing chip 100 and sequentially transferred into the flow path 110 in order to perform one or more predetermined processing steps based on the structure of the sample processing chip 100. The various kinds of liquids such as a sample and a reagent are sent as the first liquid 10 and the second liquid 20 into the flow path 110.

The liquid sending portion 560 is controlled by, for example, controlling pressure to be supplied by the liquid sending portion 560 with the use of a flow rate sensor or a pressure sensor provided in a liquid supply path. In FIG. 15, the liquid sending portion 560 includes a flow rate sensor 561 that measures a flow rate of liquid to be sent. When a metering pump such as a syringe pump or a diaphragm pump is used for the liquid sending portion 560, a flow rate sensor may not necessarily be provided.

In the structure shown in FIG. 15, the flow rate sensor 561 performs feedback to the liquid sending mechanism (the first liquid sending mechanism 510, the second liquid sending mechanism 520, or the like) that sends liquid. The liquid sending mechanism controls pressure according to the feedback from the flow rate sensor 561.

The flow rate sensor 561 may perform feedback to the controller 570. The controller 570 controls pressure, by the liquid sending portion 560, for transferring liquid, according to a flow rate measured by the flow rate sensor 561. Thus, pressure to be supplied when a sample containing a target component, and a reagent are supplied to the sample processing chip 100 can be accurately controlled.

In a case where processing units used for various processing steps are provided in the liquid sending device 500, the controller 570 may control the processing units. Examples of the units used in the various processing steps include a heater unit or a cooling unit for controlling a temperature of liquid, a magnet unit that causes magnetic force to act on liquid, a camera unit for taking an image of liquid, and a detection unit for detecting a sample and a label in liquid. These processing units are structured to operate when the processing steps are performed in the flow path 110 of the sample processing chip 100.

Other than the above-described units, the liquid sending device 500 may include a monitor 571, an input unit 572, a reading unit 573, and the like. The controller 570 causes the monitor 571 to display a predetermined display screen corresponding to an operation of the liquid sending device 500. When the liquid sending device 500 is connected to an external computer (not shown), a screen display on a monitor of the computer may be performed. The input unit 572 is implemented by, for example, a key board, and has a function of receiving information input. The reading unit 573 is implemented by, for example, a code reader for a bar code or a two-dimensional code, or a tag reader for an RFID tag or the like, and has a function of reading information in the sample processing chip 100. The reading unit 573 is also capable of reading information about, for example, a sample container (not shown) in which a sample containing a target component is stored.

In such a structure of the device, the controller 570 controls the liquid sending portion 560 so as to send a sample containing a target component, and a reagent into the sample processing chip 100. Thus, in the sample processing chip 100, one or more processing steps based on the structure of the flow path of the sample processing chip 100 are performed.

Figure 16:
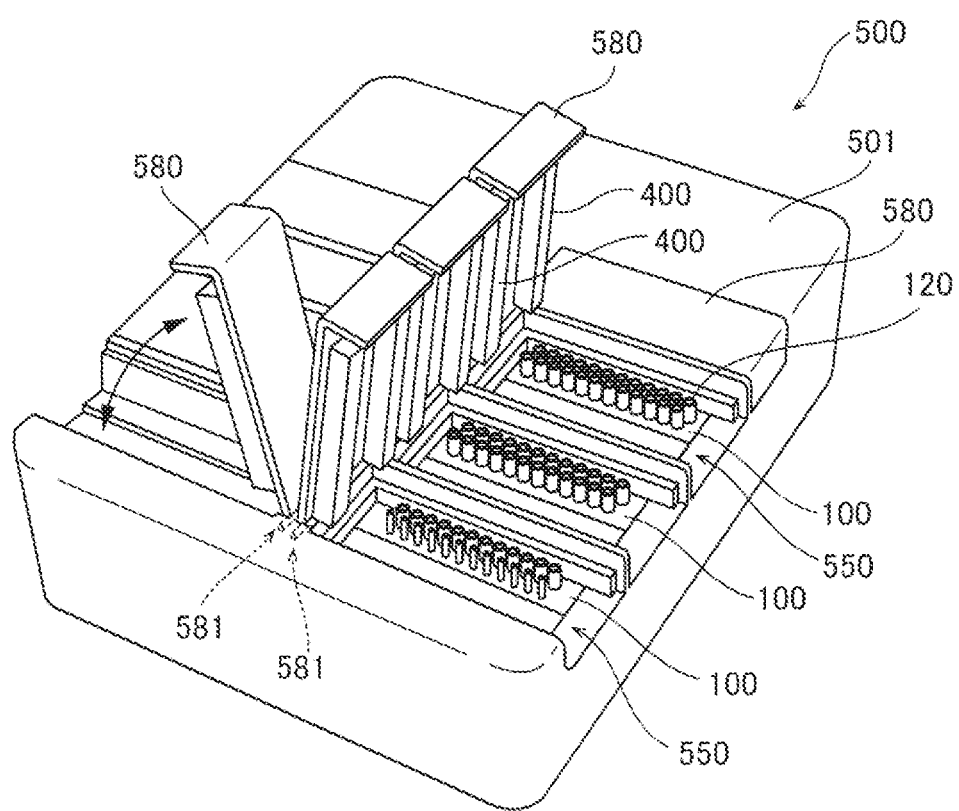
FIG. 16 is a perspective view of an exemplary structure of the liquid sending device.

FIG. 16 is a schematic diagram illustrating an outer appearance of the liquid sending device 500. In FIG. 16, the liquid sending device 500 includes the setting portion 550 on which the sample processing chip 100 is set, and the lid 580 corresponding to the setting portion 550. The liquid sending device 500 includes a device body 501, and the lid 580 connected to the device body 501. The setting portion 550 is disposed on the upper surface of the box-shaped device body 501.

The lid 580 includes the connector 400 which fluidly connects between: the first liquid sending mechanism 510 and the second liquid sending mechanism 520; and the liquid holding portion 120 and the injection hole 130, respectively, on the sample processing chip 100. That is, the connector 400 includes a connection opening for connection to the liquid holding portion 120 of the sample processing chip 100, and a connection opening for connection to the injection hole 130 thereof. The connector 400 is connected to each of the liquid holding portion 120 and the injection hole 130 of the sample processing chip 100 that is set on the setting portion 550, whereby pressure can be supplied to the liquid holding portion 120 by the first liquid sending mechanism 510, and the second liquid 20 can be sent into the injection hole 130 by the second liquid sending mechanism 520.

Thus, the sample processing chip 100 is set in the device, and the liquid sending device 500 and the sample processing chip 100 can be easily connected assuredly to each other by the connector 400 of the lid 580. When the sample processing chip 100 is set in the device, for example, the pressure path and the liquid sending tube for liquid sending can be inhibited from being unnecessarily long, and response in the liquid sending process is made fast, thereby enhancing controllability. The connector 400 may be detachably mounted to the lid 580, or may be fixed to the lid 580. A plurality of the connectors 400 may be provided so as to connect each connector 400 to one liquid holding portion 120 or injection hole 130.

The sample processing chip 100 that includes a plurality of channels of the unit flow path structures 101 each of which includes the flow path 110, the liquid holding portion 120, and the injection hole 130 is set in the setting portion 550, which is not specifically illustrated in FIG. 16. The connector 400 is provided on the lower surface of the lid 580. The connector 400 is structured as a manifold that can be collectively connected to the liquid holding portions 120 and the injection holes 130 provided in the plurality of channels of the unit flow path structures 101, respectively. That is, the connector 400 integrally includes the connection openings for connection to a plurality of the liquid holding portions 120 corresponding to the number of the channels of the sample processing chip 100 and the connection openings for connection to a plurality of the injection holes 130 corresponding to the number of the channels. By closing the lid 580, the connector 400 is connected collectively to the liquid holding portions 120 and the injection holes 130 which are provided in the plurality of channels of the unit flow path structures 101, respectively.

Thus, in the example shown in FIG. 16, the lid 580 is structured so as to be openable and closable relative to the setting portion 550, and, when the lid 580 is closed relative to the setting portion 550, the connector 400 is connected to each of the liquid holding portions 120 and the injection holes 130. Thus, simply by the sample processing chip 100 being set in the setting portion 550 and the lid 580 being closed, the liquid sending device 500 and the sample processing chip 100 can be easily connected to each other. Therefore, convenience is enhanced for an operator. In the example shown in FIG. 16, the lid 580 is connected to the device body 501 by a hinge 581, and pivots about the hinge 581, whereby the lid 580 is opened or closed.

Figure 17:
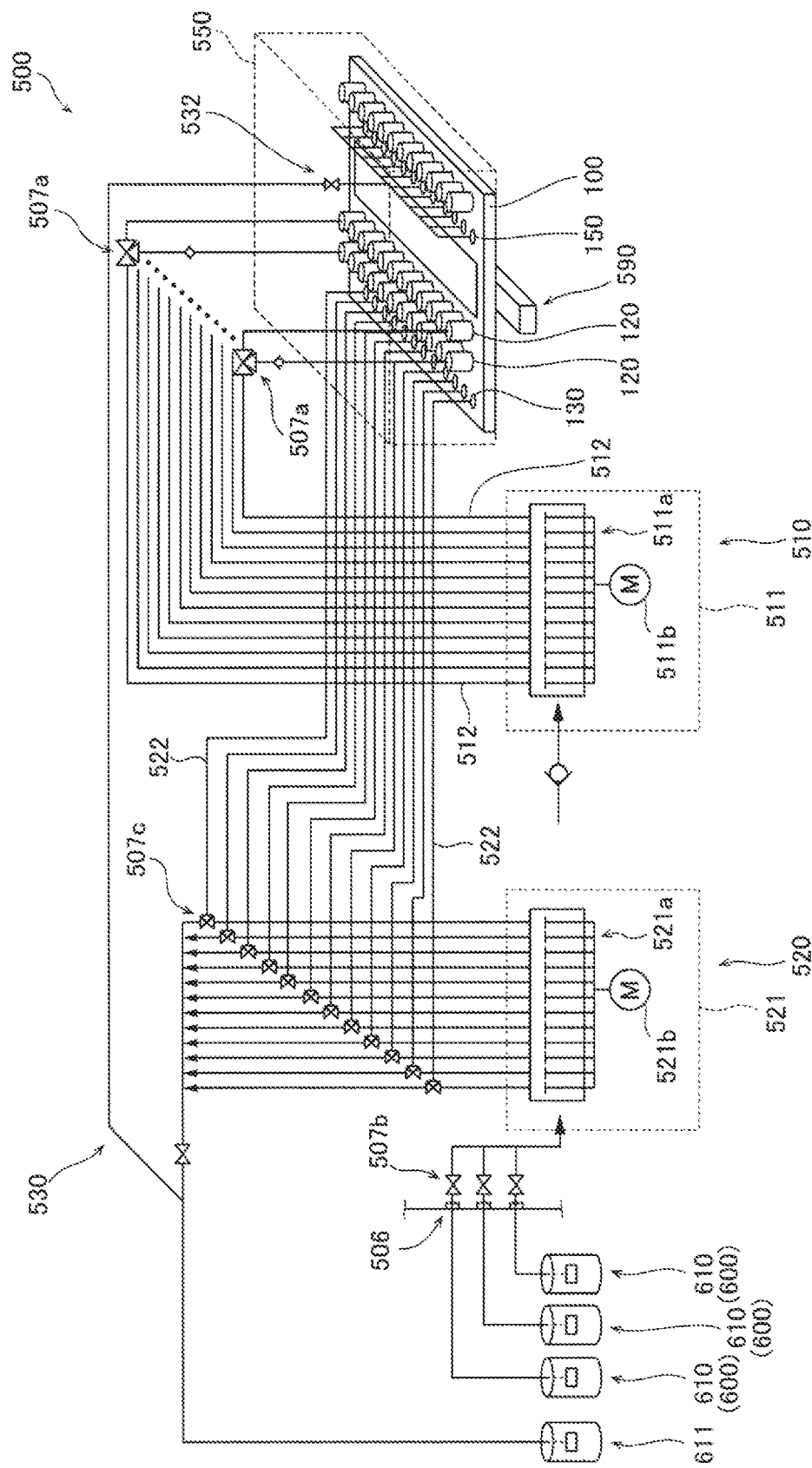
FIG. 17 illustrates an exemplary structure of a liquid sending device which sends liquid to a sample processing chip having a plurality of channels.

FIG. 17 illustrates an exemplary structure of the liquid sending device 500 that sends liquid to the sample processing chip 100 which includes a plurality of channels of the unit flow path structures 101 each including the flow path 110, the liquid holding portion 120, and the injection hole 130. In FIG. 17, the sample processing chips 100 is structured to have 12 channels and is provided with 12 unit flow path structures 101.

In the example shown in FIG. 17, the first liquid sending mechanism 510 is structured so as to collectively apply pressure to the liquid holding portions 120 of each channel. The first liquid sending mechanism 510 includes the first pressure source 511 that includes a syringe pump having a series of multiple syringes 511*a*, and a motor 511*b* that collectively drives the series of multiple syringes 511*a*. The first liquid sending mechanism 510 includes a plurality (12) of pressure paths 512 that individually connect between the syringes 511*a* of the first pressure source 511, and the liquid holding portions 120 of the channels, respectively. The unit flow path structure 101 of each channel includes a plurality of the liquid holding portions 120, and each pressure path 512 is connected to the plurality of the liquid holding portions 120 provided for each channel, through a valve 507*a* implemented by a multi-way valve. The first liquid sending mechanism 510 collectively supplies pressure to each of the liquid holding portions 120 of the plurality of channels of the unit flow path structures 101 by switching of the valve 507*a* and driving of the first pressure source 511. In FIG. 17, the syringe 511*a* of the first pressure source 511 is connected to an air path, and the first pressure source 511 supplies air pressure.

The second liquid sending mechanism 520 is structured so as to collectively send the second liquid 20 into the injection hole 130 of each channel. The second liquid sending mechanism 520 includes the second pressure source 521 that includes a syringe pump having a series of multiple syringes 521*a*, and a motor 521*b* that collectively drives the series of multiple syringes. The second liquid sending mechanism 520 includes a plurality (12) of liquid sending tubes 522 that individually connect between the syringes 521*a* of the second pressure source 521 and the injection holes 130 of the channels, respectively. FIG. 17 shows an example where three storage portions 600 that store different kinds of second liquids 20, respectively, are provided outside the device body 501. The second liquid sending mechanism 520 is connected to the storage portions 600 through the external connection portion 506 that includes valves 507*b*, respectively. The valve 507*b* is switched to change the second liquid 20 to be sent, the second pressure source 521 is driven, and the valve 507*c* is switched, whereby the second liquid sending mechanism 520 collectively sends the selected second liquid 20 to each of the injection holes 130 of the plurality of channels of the unit flow path structures 101. In this structure, the second liquid sending mechanism 520 can also function as the fourth liquid sending mechanism 540.

Thus, the second liquid sending mechanism 520 sends the second liquid 20 in the storage portion 600, through a plurality of the injection holes 130 provided in a plurality of the flow paths 110 of the sample processing chip 100, into the plurality of the flow paths 110, respectively, by applying pressure to the storage portion 600. Thus, unlike in the case of, for example, the second liquid 20 being injected into liquid holding portions provided for the second liquid 20 in a plurality of the flow paths 110, respectively, the second liquid 20 can be collectively sent into the plurality of the flow paths 110 simply by the second liquid 20 being stored in the storage portion 600 of the liquid sending device 500, whereby an operation of storing the second liquid 20 can be simplified. The second liquid 20 can be sent into a plurality of the flow paths 110 from the storage portion 600 in parallel, whereby liquid can be sent expeditiously even in a case where the sample processing chip 100 includes a plurality of the flow paths 110.

As described above, the liquid sending device 500 shown in FIG. 17 can cause the first liquid sending mechanism 510 to collectively apply pressure to the liquid holding portions 120 provided in the respective channels of the sample processing chip 100. The liquid sending device 500 can cause the second liquid sending mechanism 520 to collectively send the second liquid 20 into the injection holes 130 provided in the respective channels. FIG. 17 illustrates an example where the third liquid sending mechanism 530 capable of collectively sending fluid into the collection container 611 from the discharge outlets 150 of the respective channels, is provided.

(Structure of Connection to Sample Processing Chip)

Figure 18:
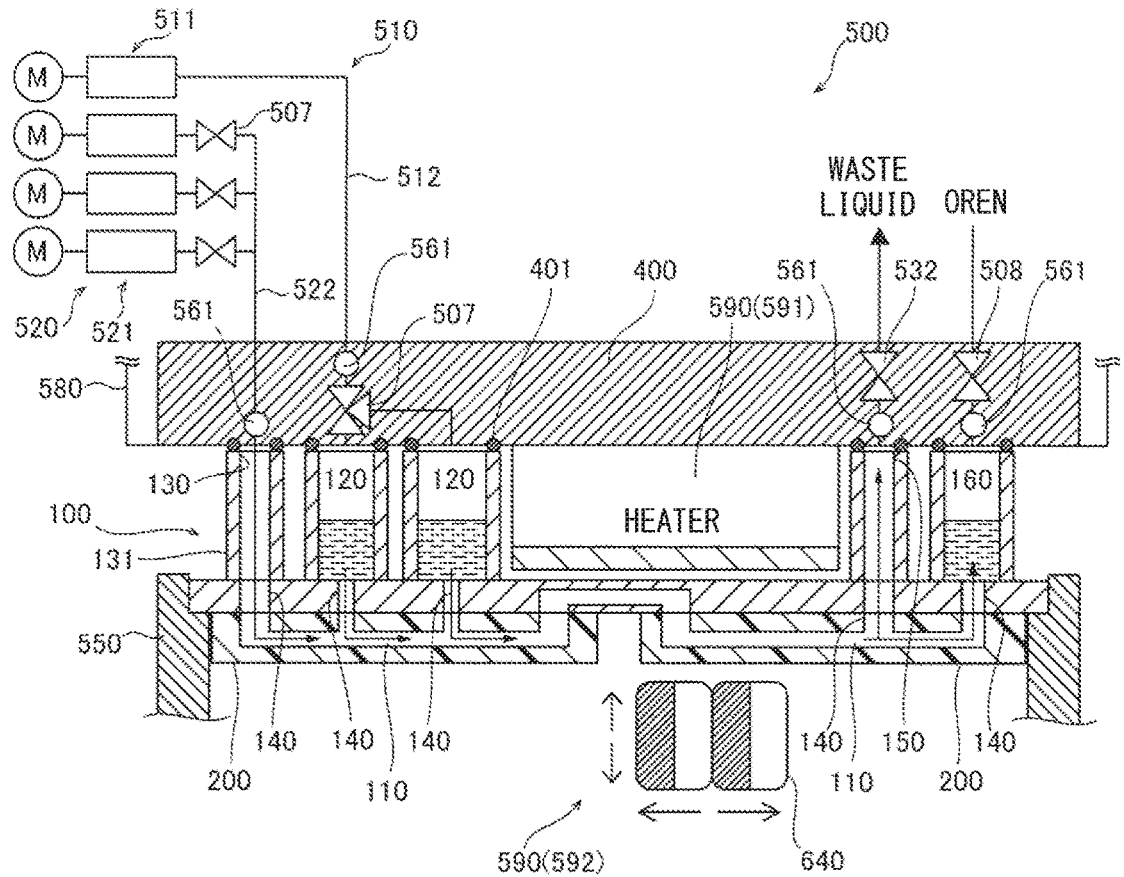
FIG. 18 is a vertical cross-sectional view of an exemplary structure for connecting the liquid sending device and the sample processing chip to each other.

FIG. 18 illustrates the sample processing chip 100 set in the setting portion 550, and the connector 400 provided in the lid 580 corresponding to the setting portion 550. FIG. 18 illustrates, for example, one of 12 channels of the unit flow path structures 101 in the sample processing chip 100 shown in FIG. 17. A plurality of the liquid sending tubes 522 and a plurality of the pressure paths 512 are provided in the manifold-type connector 400. In a state where the lid 580 is closed, the liquid sending tubes 522 and the pressure paths 512 are collectively connected to the injection holes 130 and the liquid holding portions 120 of the sample processing chip 100, through the connector 400.

The connector 400 may include the valve 507 or the flow rate sensor 561. In the connector 400 shown in FIG. 18, the valves 507, 508, 532 and the flow rate sensors 561 are provided.

In FIG. 18, the position, in the height from the base plate 300, of the upper surface (position at which the opening 121 is formed) of the liquid holding portion 120 of the sample processing chip 100, is almost the same as the position, in the height from the base plate 300, of the upper surface of a tube portion 131 in which the injection hole 130 is formed. Thus, since connection positions to the sample processing chip 100 are almost flush with each other, the surface, of the connector 400, on the sample processing chip 100 side is formed so as to be almost a flat plane. A portion between the connector 400 and the upper surface of the liquid holding portion 120, and a portion between the connector 400 and the upper surface of the tube portion 131 are each sealed by a sealing member 401 such as an O-ring or a gasket.

As shown in FIG. 18, the connector 400 may be provided with a processing unit 590 used for sample processing. The setting portion 550 on which the sample processing chip 100 is set may also be provided with a processing unit 590. The processing unit is provided according to the contents of sample processing performed in the flow path 110. The connector 400 and the setting portion 550 may not be provided with the processing unit 590.

Figure 19:
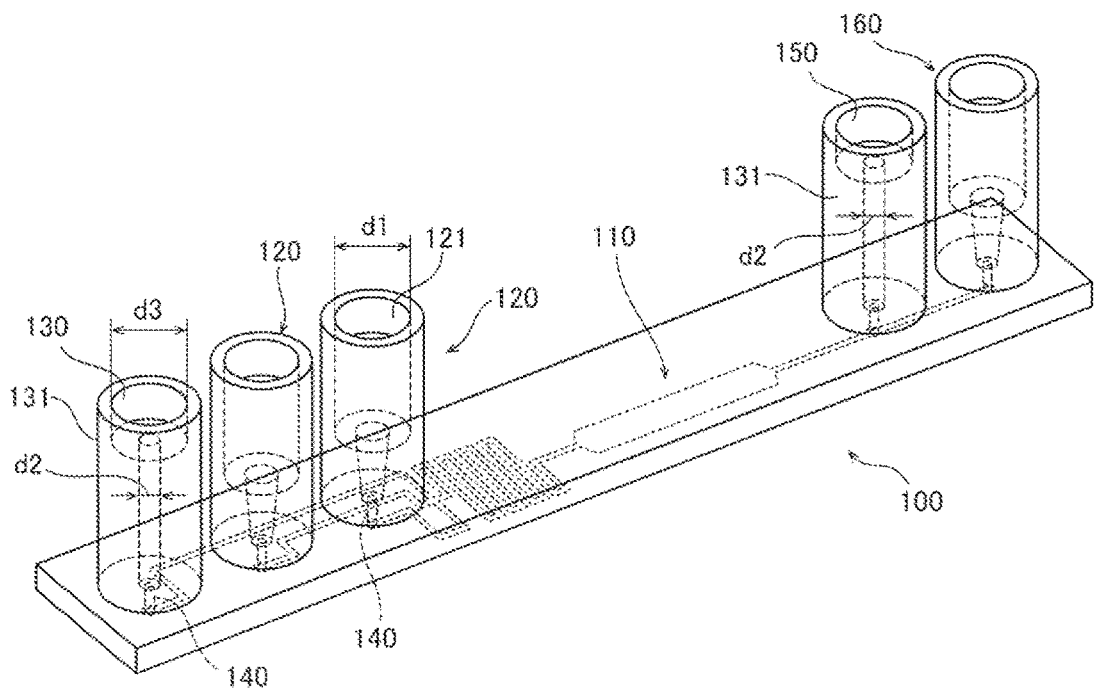
FIG. 19 is a perspective view of an exemplary structure of the sample processing chip.

FIG. 19 illustrates an exemplary structure of the sample processing chip 100 that is one of the plurality of channels of the unit flow path structures 101. In the exemplary structure shown in FIG. 19, two liquid holding portions 120, one liquid holding portion 160, one tube portion 131 having the injection hole 130 formed therein, and one tube portion 131 having the discharge outlet 150 formed therein, are provided. The liquid holding portions 120 and 160, and the tube portions 131 each extend upward relative to the surface of the base plate 300 of the sample processing chip 100, and each have a tubular shape. The three liquid holding portions 120 store the first liquids 10, and a specimen after sample processing. The liquid holding portion 120 has an inner diameter d1 so as to have a predetermined volume corresponding to an amount of liquid to be stored. The liquid holding portion 120 has the opening 121 at its upper end portion, and has, at its lower end portion, the connection portion 140 for connection to the flow path 110

In the tube portion 131, a liquid passage having an inner diameter d2 that is less than the inner diameter d1 of the liquid holding portion 120 is provided. The injection hole 130 or the discharge outlet 150 is provided at the upper end portion of the tube portion 131, and the lower end portion of the tube portion 131 is connected to the flow path 110. In the example shown in FIG. 19, the outer diameter of the tube portion 131 is almost equal to the outer diameter of the liquid holding portion 120. The injection hole 130 or the discharge outlet 150 at the upper end portion of the tube portion 131 has an increased inner diameter such that an inner diameter d3 of the upper end portion is greater than the inner diameter d2. The inner diameter d3 is almost equal to the inner diameter d1 of the opening 121 of the liquid holding portion 120. Therefore, in the sample processing chip 100, the inner diameter of the connection portion between the liquid holding portion 120 and the connector 400, and the inner diameter of the connection portion between the injection hole 130 and the connector 400, are almost equal to each other. Thus, the shapes of the connection portions of the connector 400 and the shapes of the sealing members 401 can be the same.

(Example of Liquid Sending)

Figure 20:
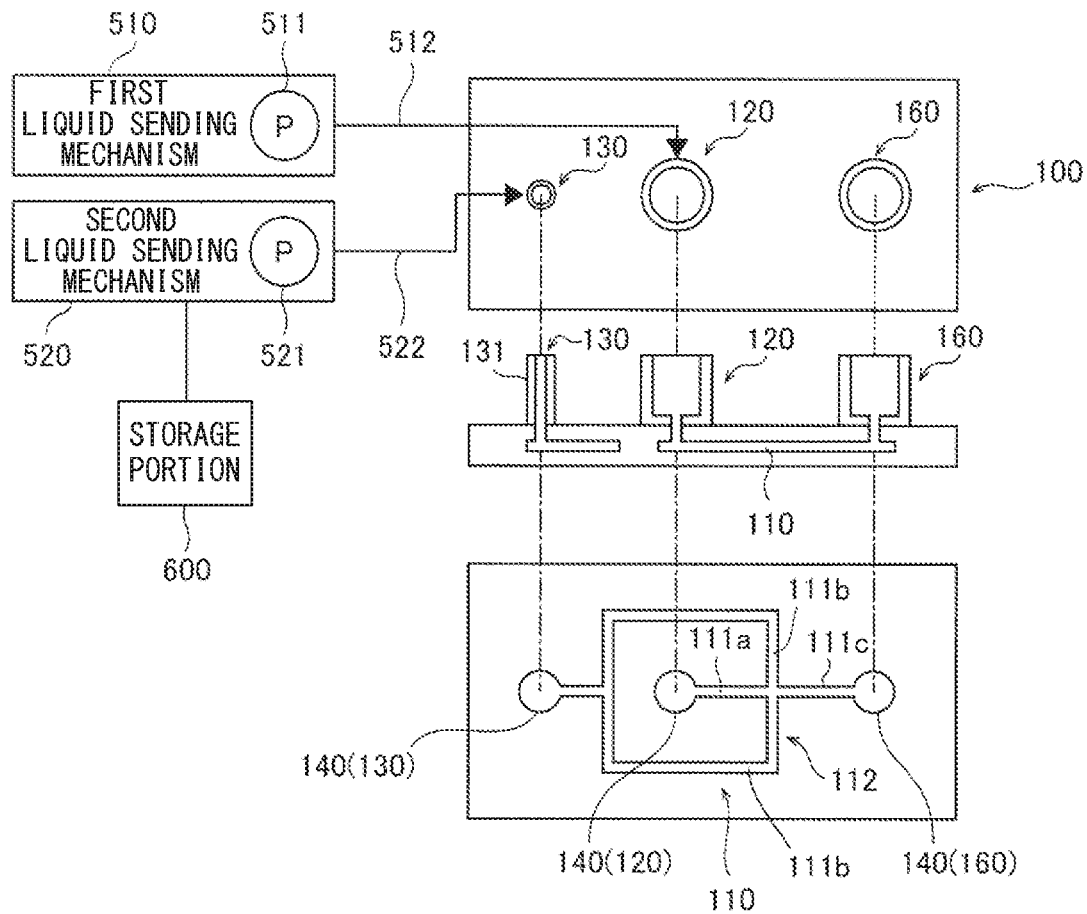
FIG. 20 illustrates an example of liquid sending for forming droplets by the sample processing chip.

FIG. 20 illustrates an example of liquid sending for performing a step of forming a fluid in an emulsion state. That is, a fluid, in an emulsion state, in which the second liquid 20 is a dispersion medium and the first liquid 10 is a dispersoid, is formed in the flow path 110 by liquid sending. FIG. 20 illustrates the sample processing chip 100 used for forming an emulsion.

The first liquid 10 is held in the liquid holding portion 120. The injection hole 130 is connected to the storage portion 600 of the liquid sending device 500. The second liquid 20 is stored in the storage portion 600. In FIG. 20, the droplets 50 (see FIG. 21) of the first liquid 10 are formed in the second liquid 20 in the flow path 110 by controlling pressure to be applied to the liquid holding portion 120 for holding the first liquid 10 and pressure to be applied to the storage portion 600 for storing the second liquid 20. By liquid sending, the first liquid 10 is dispersed into the second liquid 20 in the flow path 110 to form the droplets 50. That is, an emulsion in which the second liquid 20 is a dispersion medium, and the first liquid 10 as the droplets 50 in the second liquid 20 is a dispersoid, is formed.

Thus, a fluid, in an emulsion state, in which the droplets 50 of the first liquid 10 are dispersed in the second liquid 20 can be formed in the flow path 110. As a result, for example, a component in a sample is divided and contained in the droplet 50 in one unit portions, whereby sample processing for each one unit component can be performed in the sample processing chip 100. The second liquid 20 is preferably sent at a relatively high flow rate in order to form the droplets 50 of the first liquid 10. Therefore, the liquid sending method of the present embodiment, in which the second liquid 20 is sent into the sample processing chip 100 from the storage portion 600 of the liquid sending device 500, is suitable to a case where a process of forming a fluid in the emulsion state is performed. That a component is divided and contained in the droplet 50 in one unit portions means that, for example, when a component in a sample is nucleic acid, limiting dilution (such a dilution that 1 or 0 target component is contained in each droplet) in which one nucleic acid molecule is contained in each droplet 50 is performed. For example, in a case where nucleic acid amplification for each droplet 50 is performed as the sample processing, a nucleic acid amplification product derived from only one molecule can be produced in the droplet 50.

The liquid sending device 500 controls each of pressure to be applied to the liquid holding portion 120 for holding the first liquid 10 by the first liquid sending mechanism 510 and pressure to be applied to the storage portion 600 for storing the second liquid 20 by the second liquid sending mechanism 520 such that a fluid, in an emulsion state, in which the second liquid 20 is a dispersion medium and the first liquid 10 is a dispersoid, is formed in the flow path 110. Thus, for the sample processing chip 100 in which sample processing for each one unit component can be performed by a component in a sample being divided and contained in the minute droplet 50 in one unit portions, the fluid, in an emulsion state, in which the droplets 50 of the first liquid 10 are dispersed in the second liquid 20, can be formed in the flow path 110. The second liquid 20 is preferably sent at a relatively high flow rate in order to form the droplets 50 of the first liquid 10. Therefore, the liquid sending device 500 of the present embodiment, in which the second liquid 20 can be sent from the storage portion 600 into the sample processing chip 100 by the second liquid sending mechanism 520, is suitable to a case where a process of forming a fluid in an emulsion state is performed.

Figure 21:
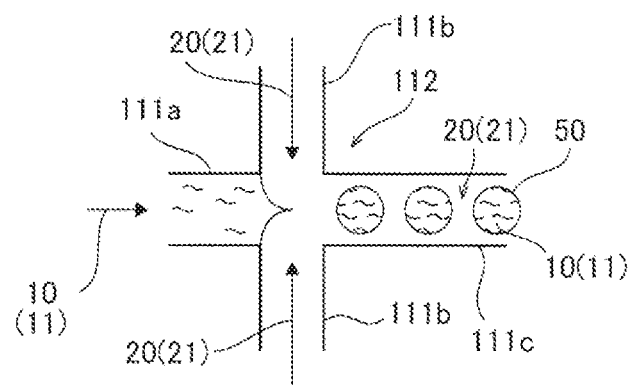
FIG. 21 is a plan view of a first exemplary structure of a flow path in which droplets are formed.

In the examples shown in FIG. 20 and FIG. 21, the first liquid 10 contains the sample 11 derived from an organism, and the second liquid 20 is oil 21. The first liquid sending mechanism 510 sends the first liquid 10 containing the sample 11 derived from an organism, into the flow path 110, by applying pressure to the liquid holding portion 120, and the second liquid sending mechanism 520 sends the second liquid 20 that is the oil 21, into the flow path 110, by applying pressure to the storage portion 600. The sample 11 derived from an organism generally forms an aqueous phase and is likely to form an interface between the oil 21 and the sample 11. Therefore, an emulsion state in which the droplets 50 of the first liquid 10 are dispersed in the oil 21, can be easily formed. That is, an emulsion of the first liquid 10 and the second liquid 20 can be easily formed.

FIG. 21 illustrates an example of sending of liquid into the flow path 110 for forming the droplets 50 of the first liquid 10 in the second liquid 20. In FIG. 21, the flow path 110 includes a first channel 111a and a second channel 111b that intersect each other. In FIG. 21, the droplets 50 of the first liquid 10 are formed in the second liquid 20 by the first liquid 10 and the second liquid 20 being sent in the first channel 111a and the second channel 111b, respectively. That is, a fluid, in an emulsion state, which contains the second liquid 20 and the first liquid 10, is formed. In an intersection portion 112 at which the first channel 111a and the second channel 111b intersect each other, the second liquid 20 flows in a direction that intersects the flow of the first liquid 10. The first liquid 10 is separated into droplets by a shearing force generated by the flow of the second liquid 20 at the intersection portion 112. As a result, the droplets 50 of the first liquid 10 are formed in the second liquid 20. Thus, the multiple droplets 50 of the first liquid 10 are efficiently generated continuously by applying a shearing force due to flow of the second liquid 20, to the first liquid 10, at the intersection portion 112 at which the first channel 111a and the second channel 111b intersect each other, thereby efficiently forming the emulsion state. A flow rate of the first liquid 10 and a flow rate of the second liquid 20 are appropriately controlled, whereby the multiple droplets 50 having a uniform diameter can be continuously formed.

In the liquid sending device 500, the first liquid sending mechanism 510 and the second liquid sending mechanism 520 send the first liquid 10 and the second liquid 20 into the first channel 111a and the second channel 111b, respectively, which are provided in the flow path 110 so as to intersect each other, thereby forming the droplets 50 of the first liquid 10 in the second liquid 20. Thus, by applying a shearing force due to flow of the second liquid 20, to the first liquid 10, at the intersection portion at which the first channel 111a and the second channel 111b intersect each other, the multiple droplets 50 of the first liquid 10 can be efficiently generated continuously.

In FIG. 21, the first channel 111a and the second channel 111b are orthogonal to each other. A pair of the second channels 111b are provided on both sides of the first channel 111a. The second liquid 20 in the pair of the second channels 111b flows into the intersection portion 112 so as to sandwich the flow of the first liquid 10, whereby a shearing force for forming the droplets 50 efficiently acts. A mixture of the second liquid 20 and the droplets 50 of the first liquid 10 flows from the intersection portion 112 toward a third channel 111c that extends on the side opposite to the first channel 111a side.

Figure 22:
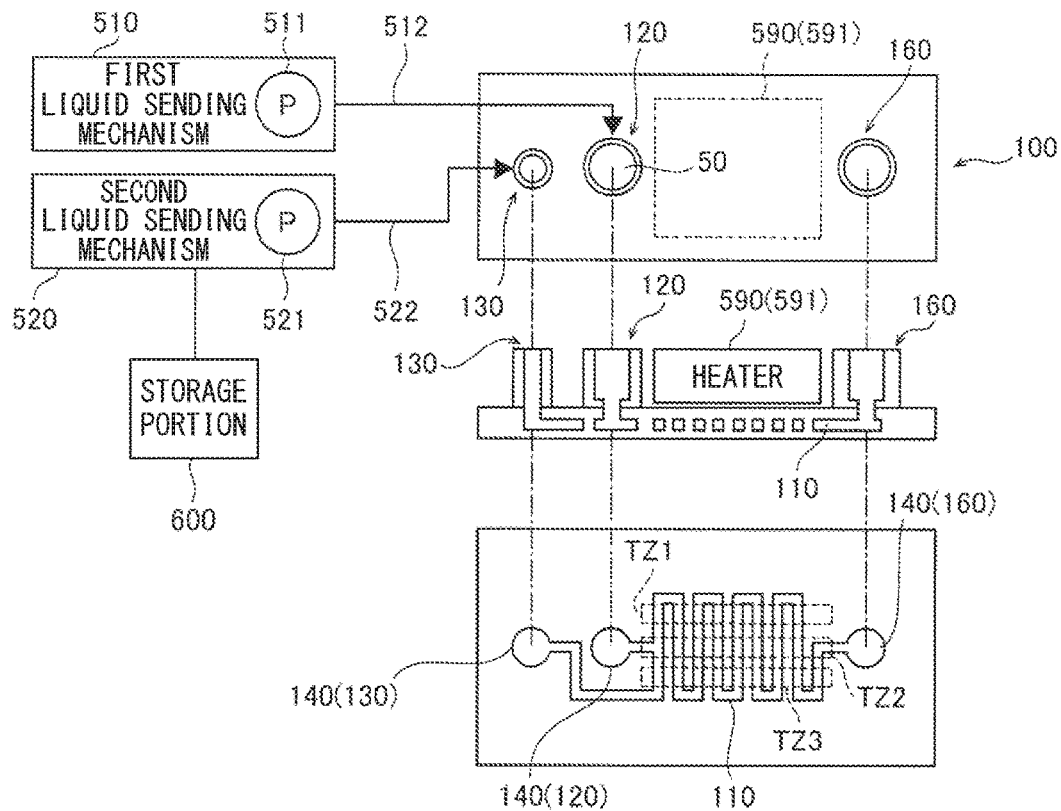
FIG. 22 illustrates an example of liquid sending for PCR by the sample processing chip.

FIG. 22 illustrates an example of the sample processing chip 100 for performing sample processing on the droplets 50 of the first liquid 10 that contains a sample. In FIG. 22, the droplets 50 supplied as the first liquid 10 contain DNA as a target component in the sample, and a reagent includes a reagent for amplifying the DNA by PCR (Polymerase Chain Reaction). The reagent for amplification contains, for example, a polymerase and a primer according to the DNA.

In the example shown in FIG. 22, the first liquid 10 that is a fluid in an emulsion state in which the droplets 50 are in liquid, is sent into the flow path 110 by applying pressure to the liquid holding portion 120. The second liquid 20 for transporting the first liquid 10 that is an emulsion in the flow path 110 is sent through the injection hole 130 into the flow path 110 by pressure being applied to the storage portion 600. In the flow path 110, the first liquid 10 is transported by the second liquid 20.

In the case shown in FIG. 22, a heater 591 for amplifying DNA by PCR in the flow path 110 is used as the processing unit 590 shown in FIG. 18. The heater 591 heats the sample processing chip 100. The flow path 110 is structured so as to pass through a plurality of temperature zones TZ1 to TZ3 formed by the heater 591 multiple times. The number of the temperature zones TZ may be a number other than three. The number of times the channel 111 passes through each of the temperature zones TZ1 to TZ3 corresponds to the number of thermal cycles.

The first liquid 10 introduced from the liquid holding portion 120 into the flow path 110 is pushed by the second liquid 20 sent through the injection hole 130, and moves in the flow path 110 at a predetermined speed. DNA in the droplets 50 dispersed in the first liquid 10 is amplified while flowing in the flow path 110. The droplets containing the amplified DNA are collected into the liquid holding portion 120 for collection. Unlike in the case of PCR process being performed collectively on multiple DNA molecules, DNA can be individually amplified in units of one molecules by amplification being performed in the droplet 50.

Figure 23:
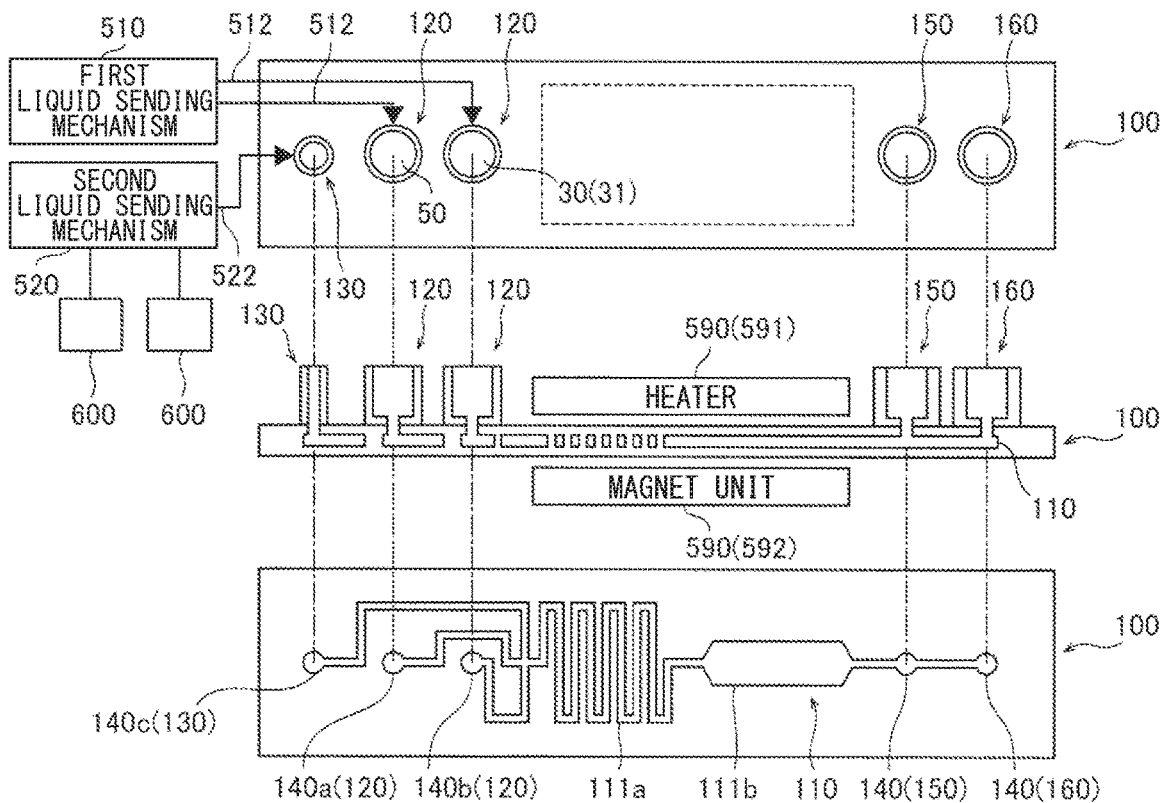
FIG. 23 illustrates an example of liquid sending for breaking droplets by the sample processing chip.

FIG. 23 illustrates an example of liquid sending for performing a step of demulsifying the first liquid 10 in an emulsion state. For example, the formed droplets 50 in the emulsion are broken after the emulsion forming process. By breaking of the droplets 50, the first liquid 10 is demulsified. FIG. 23 illustrates the sample processing chip 100 used for the demulsification.

In the example shown in FIG. 23, the first liquid 10 that is s fluid in an emulsion state is sent into the flow path 110 by pressure being applied to the liquid holding portion 120, and the second liquid 20 for demulsifying the first liquid 10 is sent through the injection hole 130 into the flow path 110 by pressure being applied to the storage portion 600, and the first liquid 10 and the second liquid 20 are mixed in the flow path 110. In a case where the first liquid 10 is an emulsion in which the droplets 50 in an aqueous phase are in oil, one or more kinds of emulsion breaking reagents which contain alcohol, a surfactant, or the like is used as the second liquid 20 for demulsification. The first liquid 10 and the second liquid 20 are agitated while passing through the meandering channel 111a, and sufficiently mixed.

Thus, a process for demulsifying the first liquid 10 can be performed in the sample processing chip 100. The second liquid 20 is preferably sent at a relatively high flow rate as compared to the first liquid 10 to accelerate mixture with the first liquid 10 such that the multiple droplets 50 are efficiently broken. Therefore, the liquid sending method of the present embodiment, in which the second liquid 20 can be sent into the sample processing chip 100 from the storage portion 600 of the liquid sending device 500, is suitable to a case where a process of demulsifying fluid in an emulsion state is performed. The interface of the droplet 50 is broken by mixture of the first liquid 10 and the second liquid 20, and a component contained in the droplet 50 is taken out into the flow path 110.

In the liquid sending device 500, the first liquid sending mechanism 510 sends the first liquid 10 into the flow path 110 by applying pressure to the liquid holding portion 120 that holds the first liquid 10 that is a fluid in an emulsion state, and the second liquid sending mechanism 520 sends the second liquid 20 into the flow path 110 through the injection hole 130 by applying pressure to the storage portion 600 that stores the second liquid 20 for demulsifying the first liquid 10, and a mixture of the first liquid 10 and the second liquid 20 is formed in the flow path 110 by liquid sending performed by the first liquid sending mechanism 510 and the second liquid sending mechanism 520. Thus, a process of demulsifying the first liquid 10 can be performed in the sample processing chip 100. The second liquid 20 is preferably sent at a relatively high flow rate as compared to the first liquid 10 to accelerate mixture with the first liquid 10 in order to efficiently break the multiple droplets 50. Therefore, the liquid sending device 500 of the present embodiment which allows the second liquid sending mechanism 520 to send the second liquid 20 from the storage portion 600 into the sample processing chip 100 is suitable to a case where a process of demulsifying a fluid in an emulsion state is performed.

In the example shown in FIG. 23, the first liquid 10 is a fluid in an emulsion state in which a dispersoid that contains the sample 11 derived from an organism, and a carrier 13 (see FIGS. 25A through 25D) that binds to the sample 11 is in the oil 21. The first liquid sending mechanism 510 sends, into the flow path 110, the first liquid 10 that is a fluid in an emulsion state in which a dispersoid that contains the sample 11 derived from an organism and the carrier 13 that binds to the sample 11 is in the oil 21. Thus, the sample processing is performed for each one unit component, and a component in the droplet 50 is taken out, by demulsification, from the first liquid 10 in which the component carried by the carrier 13 is in a state of the droplet 50, and processing can be collectively performed in the flow path 110.

In the example shown in FIG. 23, a step of causing the demulsified first liquid 10 and a labelling substance 31 to react with each other, is performed. In the example shown in FIG. 23, a third liquid 30 held in any of a plurality of the liquid holding portions 120 provided in the sample processing chip 100 is sent into the flow path 110 by pressure being applied to the liquid holding portion 120, and the first liquid 10 demulsified by mixture with the second liquid 20 is mixed, in the flow path 110, with the third liquid 30 that contains the labelling substance 31 for detecting the sample 11 contained in the first liquid 10. The target component contained in the sample 11 and the labelling substance 31 bind to each other by the mixture, and detection based on the labelling substance 31 can be performed.

The labelling substance 31 specifically binds to the target component in the sample 11, and can be measured by a detector. Examples of the label include an enzyme, a fluorescent substance, and a radioisotope. The labelling substance 31 is, for example, formed by a fluorescent substance being bound to a probe of DNA complementary to DNA that is the target component.

Thus, a process of labeling, with the labelling substance 31, the component in the sample 11 that has been subjected to the sample processing for each one unit component in the droplet 50 can be performed in the flow path 110. The labelling substance 31 is different depending on a target component. Therefore, contamination of the labelling substance 31 in the case of liquid sending for a plurality of the sample processing chips 100 being performed by the same liquid sending device 500 can be prevented since not the storage portion 600 of the liquid sending device 500 but the liquid holding portion 120 of the sample processing chip 100 is caused to hold the third liquid 30.

In the liquid sending device 500, by the first liquid sending mechanism 510, the third liquid 30 held in any of the plurality of the liquid holding portions 120 provided in the sample processing chip 100 is sent into the flow path 110 by pressure being applied to the liquid holding portion 120. In the liquid sending device 500, the first liquid 10 that has been demulsified by mixture with the second liquid 20, and the third liquid 30 that contains the labelling substance 31 for detecting the sample 11 contained in the first liquid 10 are mixed in the flow path 110 by liquid sending performed by the first liquid sending mechanism 510 and the second liquid sending mechanism 520. Thus, a process of labeling, with the labelling substance 31, a component in the sample 11 having been subjected to the sample processing for each one unit component can be performed in the flow path 110. The labelling substance 31 is different depending on a target component. Therefore, the third liquid 30 is sent into the flow path 110 from the liquid holding portion 120 of the sample processing chip 100 without taking the labelling substance 31 into the device, thereby preventing contamination of the labelling substance 31 in the case of liquid sending being performed for a plurality of the sample processing chips 100.

In FIG. 23, the first liquid 10 and the third liquid 30 are sent into the flow path 110 through the connection portion 140a and the connection portion 140b, respectively, and mixed in a channel 111b, having a wide width, for labeling process. Heat or electric field, magnetic field, or the like may be caused to act from the outside of the flow path 110 in order to accelerate binding of a target component and the labelling substance. The first liquid 10 and the third liquid 30 are mixed in the channel 111b. The emulsion breaking reagent is sent through the connection portion 140c.

[Example of Assay Using Sample Processing Chip]

Next, a specific example of an assay using the sample processing chip 100 will be described.

(Emulsion PCR Assay)

An example where emulsion PCR assay is performed by using the liquid sending device 500 and the sample processing chip 100 described above will be described.

Figure 24:
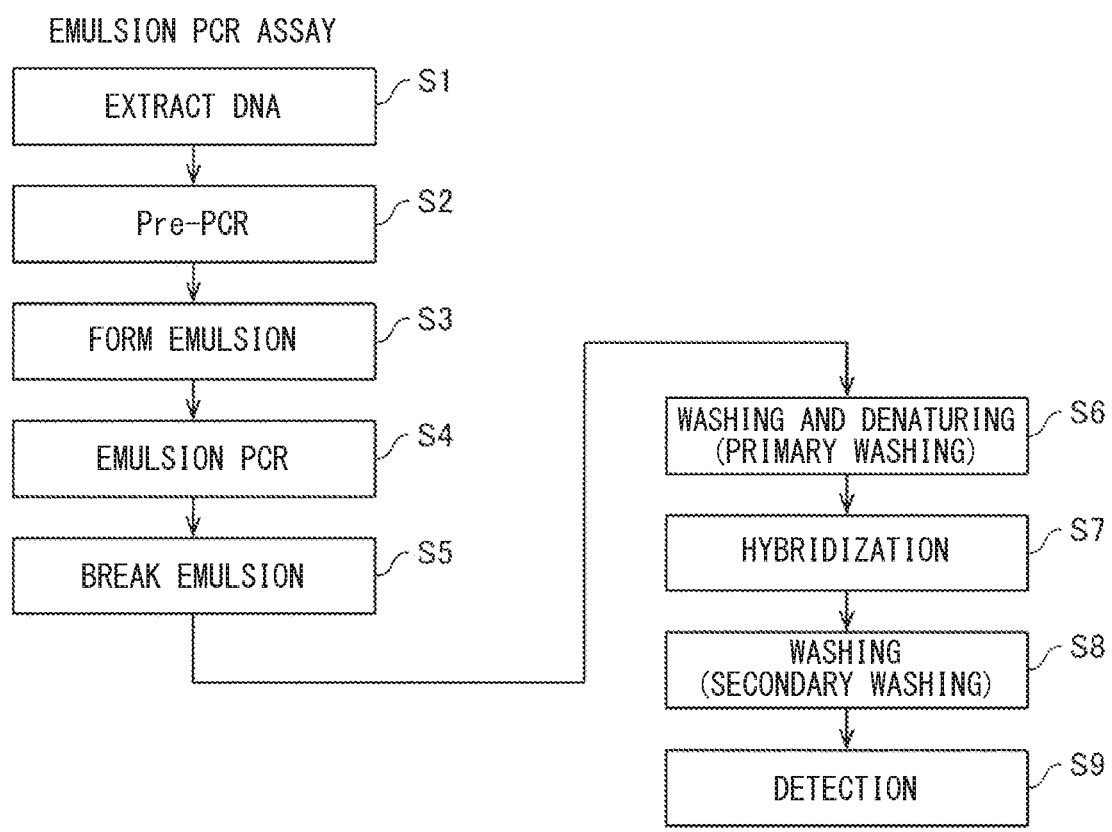
FIG. 24 is a flow chart showing an example of an emulsion PCR assay.

FIG. 24 shows an example of a flow of the emulsion PCR assay. FIG. 24 illustrates a progress of reaction in the emulsion PCR assay.

Figure 25:
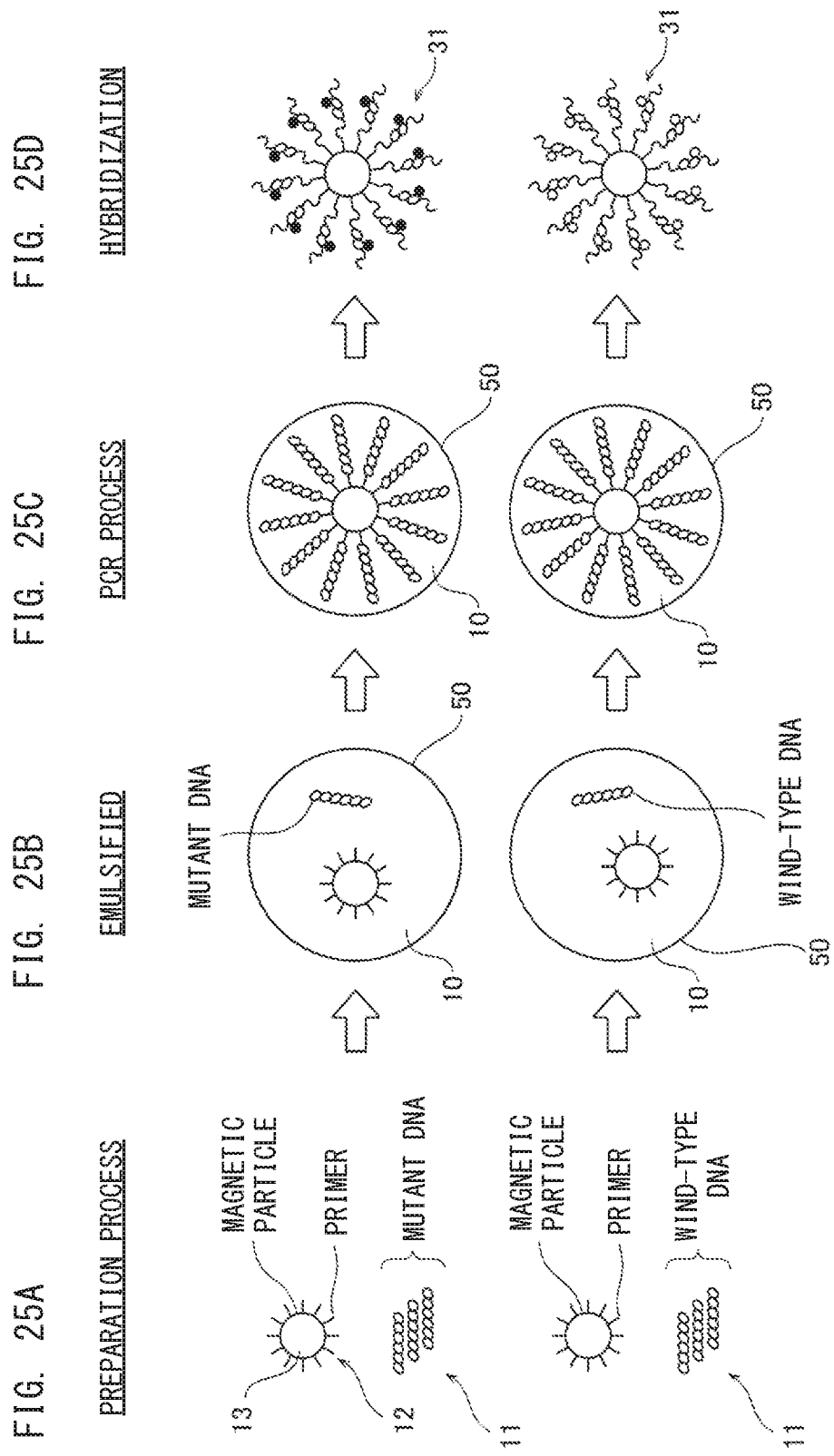
FIGS. 25A through 25D illustrate a progress of reaction in the emulsion PCR assay.

In step S1, DNA is extracted from a specimen such as blood by pretreatment (see FIG. 25A). The pretreatment may be performed by using a dedicated nucleic acid extracting device, or the liquid sending device 500 may have a pretreatment mechanism.

In step S2, the extracted DNA is amplified by Pre-PCR processing (see FIG. 25A). The Pre-PCR processing is processing for preliminarily amplifying the DNA contained in the extract obtained after the pretreatment, to such a degree as to enable the subsequent emulsion forming process. In the Pre-PCR processing, the extracted DNA, and a reagent, for PCR amplification, which contains a polymerase and a primer are mixed, and the DNA in the mixture is amplified by temperature control by a thermal cycler. The thermal cycler performs a thermal cycle process of repeating, multiple times, one cycle of changing the temperature of the mixture to a plurality of different temperatures.

Step S3 is an emulsion forming step. In the emulsion forming step, a droplet, which contains a mixture of nucleic acid (DNA) that is a target component, a reagent for amplification reaction of the nucleic acid, and a carrier for the nucleic acid, is formed as a dispersoid in a dispersion medium. The reagent for amplification reaction of the nucleic acid contains a substance, necessary for PCR, such as DNA polymerase. In step S3, an emulsion that includes a magnetic particle, the reagent containing the polymerase and the like, and the DNA is formed (see FIG. 25B). In step S3, a droplet that includes thereinside the mixture of the magnetic particle, the reagent that contains the polymerase and the like, and the DNA is formed, and a dispersoid including the multiple droplets is dispersed in the dispersion medium. To the surface of the magnetic particle enclosed in the droplet, a primer for amplifying the nucleic acid is applied. The droplet is formed so as to include about one magnetic particle and one target DNA molecule in the droplet. The dispersion medium is immiscible with the mixture. In this example, the mixture is water-based, and the dispersion medium is oil-based. The dispersion medium is, for example, oil.

Step S4 is an emulsion PCR step of amplifying the nucleic acid (DNA) in the droplet formed in the emulsion forming step. In step S4, by temperature control by the thermal cycler, in each droplet in the emulsion, the DNA binds to the primer on the magnetic particle, and is amplified (emulsion PCR) (see FIG. 25C). Thus, a target DNA molecule is amplified in each droplet. That is, an amplification product of the nucleic acid is produced in each droplet. The amplified nucleic acid binds to the carrier via the primer in the droplet.

Step S5 is an emulsion breaking step of breaking the droplet that contains the carrier (magnetic particle) which carries the amplification product of the nucleic acid (DNA) produced in the emulsion PCR step. In other words, step S5 is a step of demulsifying a fluid in an emulsion state after the emulsion PCR step. After the DNA is amplified on the magnetic particle in step S4, the emulsion is broken in step S5, and the magnetic particle that contains the amplified DNA is taken out from the droplet (emulsion breaking). One or more kinds of emulsion breaking reagents that include alcohol, a surfactant, or the like are used for breaking the emulsion.

Step S6 is a washing step of collecting carriers (magnetic particles) taken out from the droplets by the breaking in the emulsion breaking step. In step S6, the magnetic particles taken out from the droplets are washed in the BF separation step (primary washing). The BF separation step is a processing step in which the magnetic particles containing the amplified DNA are caused to pass through the washing liquid in a state where the magnetic particles are attracted by magnetic force, to remove unnecessary substances adhered to the magnetic particles. In the primary washing step, for example, washing liquid containing alcohol is used. The alcohol removes an oil film on the magnetic particle, and denatures the amplified double-stranded DNA into single strands.

Step S7 is a hybridization step of causing the amplification product on the carrier (magnetic particle) collected in the washing step to react with a labelling substance. After the washing, in step S7, the DNA having been denatured into the single strands on the magnetic particle is hybridized to the labelling substance for detection (hybridization) (see FIG. 25D). The labelling substance includes, for example, a substance that emits fluorescence. The labelling substance is designed to specifically bind to the DNA to be detected.

In step S8, the magnetic particle bound to the labelling substance is washed in another BF separation step (secondary washing). The secondary BF separation step is performed in the same manner as in the primary BF separation step. In the secondary washing step, for example, PBS (phosphate buffered saline) is used as the washing liquid. PBS removes an unreacted labelling substance (including a labelling substance that is non-specifically adsorbed to the magnetic particle) which does not bind to the DNA.

In step S9, the DNA is detected through the labelling substance hybridized thereto. The DNA is detected by, for example, a flow cytometer. In the flow cytometer, the magnetic particle that includes the DNA bound to the labelling substance flows through a flow cell, and laser light is applied to the magnetic particle. Fluorescence, of the labelling substance, emitted due to the applied laser light is detected.

The DNA may be detected by image processing. For example, the magnetic particles that include DNA bound to the labelling substance are dispersed on a flat slide, and an image of the dispersed magnetic particles is taken by a camera unit. The number of magnetic particles that emit fluorescence is counted on the basis of the taken image.

Figure 26:
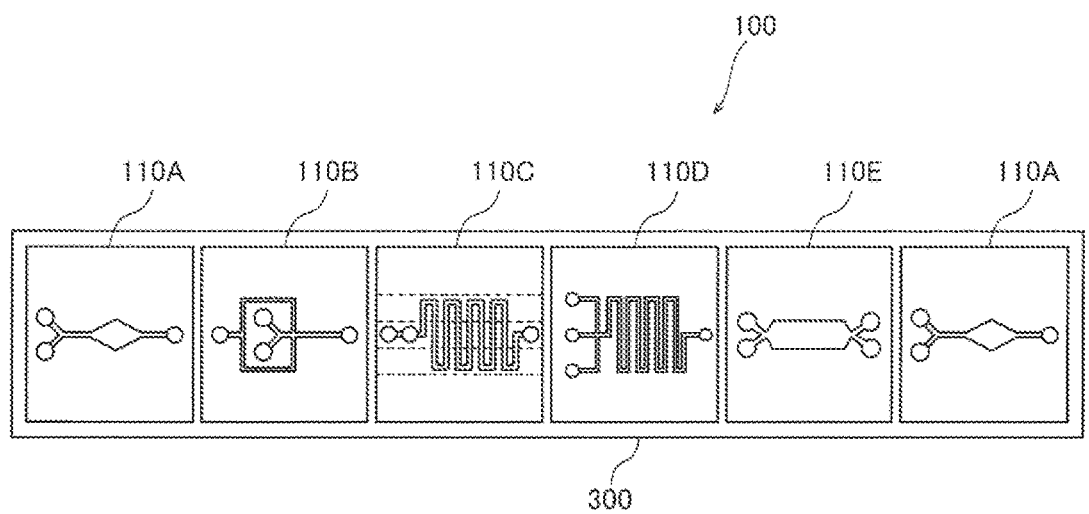
FIG. 26 illustrates an exemplary structure of the sample processing chip used in the emulsion PCR assay.

Hereinafter, an example of the structure of the flow path 110 and an example of the liquid sending method for performing emulsion PCR assay will be described. The flow paths 110 described below may be formed in the single sample processing chip 100 as shown in FIG. 26, or may be formed in the separate sample processing chips 100 as shown in FIG. 20, FIG. 22, FIG. 23, and the like. In a case where the flow paths 110 for performing different processing steps are formed in the single sample processing chip 100, the liquid sending device 500 can collectively perform a plurality of processing steps in the single sample processing chip 100. In a case where a plurality of the sample processing chips 100 having the flow paths 110 formed for performing different processing steps, are used, sending of liquid into the first sample processing chip 100 is performed in the order for the processing steps, the processed specimen is injected into the liquid holding portion 120 of the second sample processing chip 100, and sending of liquid into the second sample processing chip 100 is performed. Processing is performed for the third and the subsequent sample processing chips in the same manner. Thus, by the sample processing chips 100 being sequentially changed, separate sample processing steps are performed, whereby a series of emulsion PCR assay can be performed.

<Pre-PCR>

Figure 27:
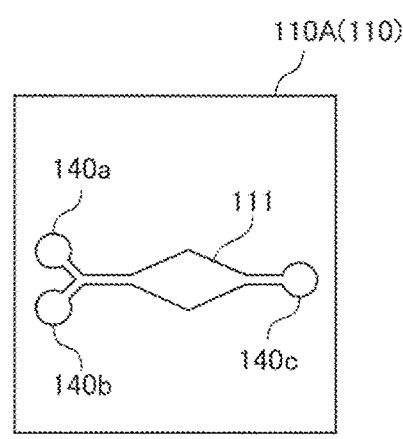
FIG. 27 illustrates an exemplary structure of a flow path for performing Pre-PCR.

FIG. 27 illustrates an exemplary structure of a flow path in which the Pre-PCR process is performed. A flow path 110A includes a channel 111, and connection portions 140a and 140b in which a reagent and a sample are injected, and a connection portion 140c through which liquid is discharged. The channel 111 is formed into, for example, a rhombic shape for controlling a flow rate of liquid.

The flow path 110A is formed from, for example, a highly heat-resistant material such as a polycarbonate. The channel 111 is formed so as to have the height of, for example, 50 μm to 500 μm.

For example, by the first liquid sending mechanism 510, DNA extracted in the pretreatment is injected as the first liquid 10 through the connection portion 140a connected to the first liquid holding portion 120, and a reagent for PCR amplification is injected as the first liquid 10 through the connection portion 140b connected to the second liquid holding portion 120. The temperature of the mixture of the DNA and the reagent is controlled by the heater 591 while the mixture flows through the channel 111. By controlling the temperature, the DNA and the reagent react with each other, to amplify the DNA. Liquid containing the amplified DNA is transferred into the adjacent flow path 110 or the liquid holding portion 160 for specimen collection through the connection portion 140c.

<Forming of Emulsion>

Figure 28:
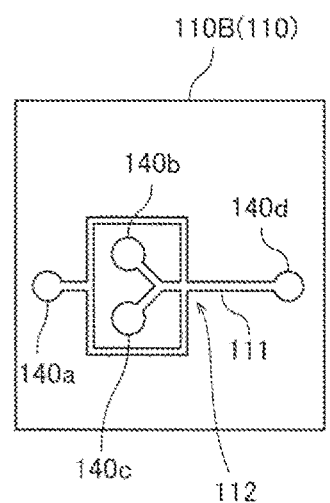
FIG. 28 illustrates an exemplary structure of a flow path for forming an emulsion.

FIG. 28 illustrates an exemplary structure of a flow path 110B in which an emulsion forming process is performed.

The flow path 110B includes: a channel 111; connection portions 140a, 140b, and 140c through which liquids such as a sample and a reagent are injected; and a connection portion 140d through which liquid is discharged. The channel 111 has an intersection portion 112 at which at least two channels intersect each other. The width of each of the channels that form the intersection portion 112 is several tens of µm. In the present embodiment, the width of the channel is 20 µm. The flow path 110B may be provided with only the connection portion 140b or provided with only the connection portion 140c.

The channel 111 of the flow path 110B has the height of, for example, 10 µm to 20 µm. The wall surface of the channel 111 is, for example, treated with a hydrophobic material or fluorine in order to improve wettability with respect to oil. The material of the flow path 110B is, for example, PDMS, PMMA, or the like.

For example, the first liquid 10 that contains the DNA having been amplified by the Pre-PCR is sent from the first liquid holding portion 120 to the connection portion 140b by the first liquid sending mechanism 510. The first liquid 10 that contains magnetic particles and a reagent for PCR amplification is sent from the second liquid holding portion 120 to the connection portion 140c by the first liquid sending mechanism 510. The liquids injected through the connection portions 140b and 140c, respectively, are mixed in the channel 111, and flow into the intersection portion 112. The particle size of the magnetic particle is, for example, 0.5 µm to 3 µm. The first pressure source 511 of the first liquid sending mechanism 510 applies a pressure P (1000 mbar≤P≤10000 mbar) in order to send liquid to the connection portions 140b and 140c.

For example, by the second liquid sending mechanism 520, the second liquid 20 that is oil for forming an emulsion is sent to the connection portion 140a that connects to the injection hole 130. The injected oil is sent separately into a plurality of branching paths in the channel 111, and flows into the intersection portion 112 through the plurality of the branching paths. The second pressure source 521 of the second liquid sending mechanism 520 applies a pressure P (1000 mbar≤P≤10000 mbar) in order to send the oil to the connection portion 140a.

As shown in FIG. 21, the mixture of the first liquid 10 is separated into droplets by a shearing force generated due to the first liquid 10 being sandwiched between the oil at the intersection portion 112. The droplets obtained by the separation are enclosed by the oil that flows into the intersection portion 112, thereby forming an emulsion. The flow of the specimen in the form of the emulsion is transferred into the adjacent flow path 110 or the liquid holding portion 160 for specimen collection through the connection portion 140d.

For example, the mixture of the DNA and the reagent flows into the intersection portion 112 at a flow rate of 0.4 µL/min to 7 µL/min, and the oil flows into the intersection portion 112 at a flow rate of 1 µL/min to 50 µL/min. The flow rate is controlled by pressure applied by the second liquid sending mechanism 520. For example, when the mixture of the DNA and the reagent flows into the intersection portion 112 at the flow rate of 2 µL/min (about 5200 mbar), and the oil flows into the intersection portion 112 at the flow rate of 14 µL/min (about 8200 mbar), droplets are formed at about 10,000,000 droplets/min. Droplets are formed at a rate of, for example, about 600,000 droplets/min to about 18,000,000 droplets/min (about 10000 droplets/sec to about 300000 droplets/sec).

Figure 29:
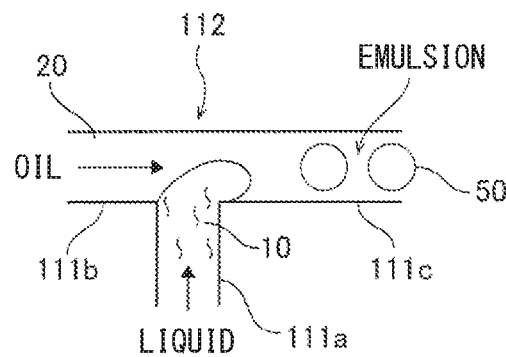
FIG. 29 is a plan view of a second exemplary structure of a flow path in which droplets are formed.

The intersection portion 112 may be formed by the three channels 111 so as to be T-shaped as shown in FIG. 29. In the case shown in FIG. 29, the mixture flows from the channel 111a and the oil flows from the channel 111b. By a shearing force of the flow of the oil, the mixture is formed into droplets in the oil to form an emulsion.

<PCR>

Figure 30:
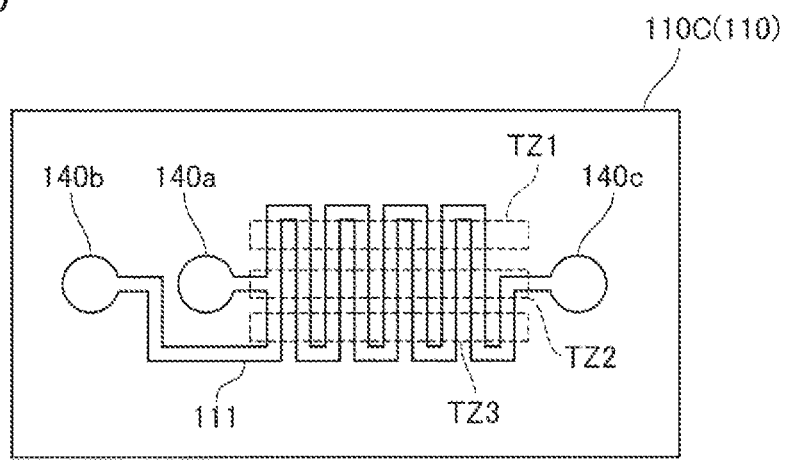
FIG. 30 illustrates an exemplary structure of a flow path for performing PCR.

FIG. 30 illustrates an exemplary structure of a flow path 110C in which emulsion PCR process is performed. The flow path 110C includes: a channel 111; connection portions 140a and 140b into which liquid flows; and a connection portion 140c through which liquid is discharged.

The flow path 110C is formed from, for example, a highly heat-resistant material such as a polycarbonate. The channel 111 is formed so as to have a height of, for example, 50 µm to 500 µm.

The channel 111 is structured so as to pass through a plurality of temperature zones TZ1 to TZ3 formed by the heater 591 multiple times. The number of times the channel 111 passes through each of the temperature zones TZ1 to TZ3 corresponds to the number of thermal cycles. The number of thermal cycles for emulsion PCR is set to be, for example, about 40 cycles. Therefore, the channel 111 is formed so as to cycle or meander the number of times corresponding to the number of cycles such that the channel 111 intersects each of the temperature zones TZ1 to TZ3 about 40 times, which is illustrated in a simplified manner in FIG. 30.

For example, the first liquid 10, which is an emulsion of oil and the droplets 50 that contain magnetic particles and the reagent for PCR amplification, is sent from the liquid holding portion 120 to the connection portion 140a by the first liquid sending mechanism 510. The second liquid 20 for transporting the first liquid 10 is sent to the connection portion 140b through the injection hole 130 by the second liquid sending mechanism 520. The DNA in each droplet 50 in the first liquid 10 is amplified while flowing in the channel 111. That is, as shown in FIG. 25C, the DNA is amplified in each droplet 50, and an amplification product of the DNA binds to the magnetic particle via a primer. The fluid containing the droplets 50 that contain the amplified DNA is transferred into the adjacent flow path 110 or the liquid holding portion 160 for specimen collection through the connection portion 140c.

<Emulsion Breaking>

Figure 31:
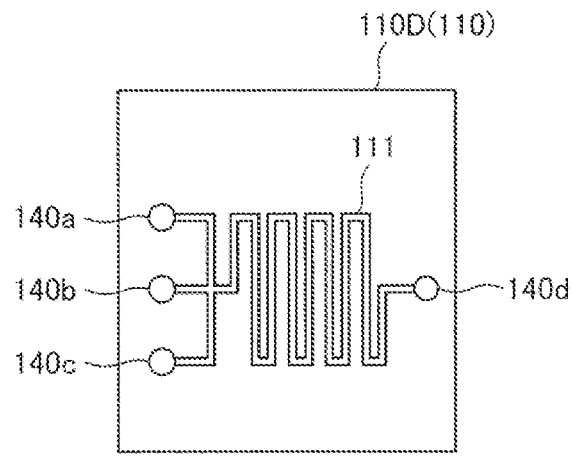
FIG. 31 illustrates an exemplary structure of a flow path for breaking an emulsion.

FIG. 31 illustrates an exemplary structure of a flow path 110D in which emulsion breaking is performed. The flow path 110D has a function of mixing a plurality of liquids. The flow path 110D includes: a channel 111; connection portions 140a, 140b, and 140c, to which the emulsion and a reagent for demulsification in emulsion breaking, flow; and a connection portion 140d through which liquid is discharged.

The flow path 110D is formed from a material, such as a polycarbonate or polystyrene, having a high chemical resistance. The channel 111 is formed so as to have a height of, for example, 50 µm to 500 µm.

For example, the first liquid 10 formed from the emulsion having been subjected to the emulsion PCR step is sent to the connection portion 140b from the liquid holding portion 120 that holds the first liquid 10, by the first liquid sending mechanism 510. The second liquid 20 that contains a reagent for emulsion breaking is sent through the injection holes 130 to the connection portions 140a and 140c by the second liquid sending mechanism 520. For example, the first liquid 10 that is formed from the emulsion is sent into the flow path 110D at the flow rate of about 2 µL/min, and the reagent for emulsion breaking is sent into the flow path 110D at the flow rate of about 30 µL/min. The emulsion and the reagent for emulsion breaking are mixed while flowing in the channel 111, and droplets in the emulsion are broken. The channel 111 has such a shape as to accelerate mixture of liquids. For example, the channel 111 is formed such that liquid reciprocates in the width direction of the sample processing chip 100 multiple times. The magnetic particles taken out from the droplets are transferred into the adjacent flow path 110 or the liquid holding portion 160 for specimen collection through the connection portion 140d.

<Washing (Primary Washing)>

Figure 32:
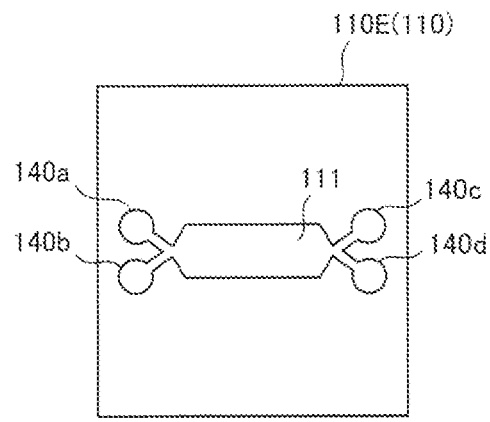
FIG. 32 illustrates an exemplary structure of a flow path for performing washing step (primary washing)

FIG. 32 illustrates an exemplary structure of a flow path 110E used in washing step (primary washing). The flow path 110E includes: connection portions 140a and 140b into which liquid flows; connection portions 140c and 140d through which liquid is discharged; and a channel 111.

The channel 111 is shaped so as to linearly extend in a predetermined direction, for example, the channel 111 has a substantially rectangular shape, or the like. The channel 111 has an increased width such that magnetic particles can be magnetically attracted and dispersed sufficiently. The connection portions 140a and 140b on the flow-in side are disposed on one end side of the channel 111 and the connection portions 140c and 140d on the discharge side are disposed on the other end side of the channel 111.

The flow path 110E is formed from a material, such as a polycarbonate or polystyrene, having a high chemical resistance. The channel 111 is formed so as to have a height of, for example, 50 µm to 500 µm.

Figure 33:
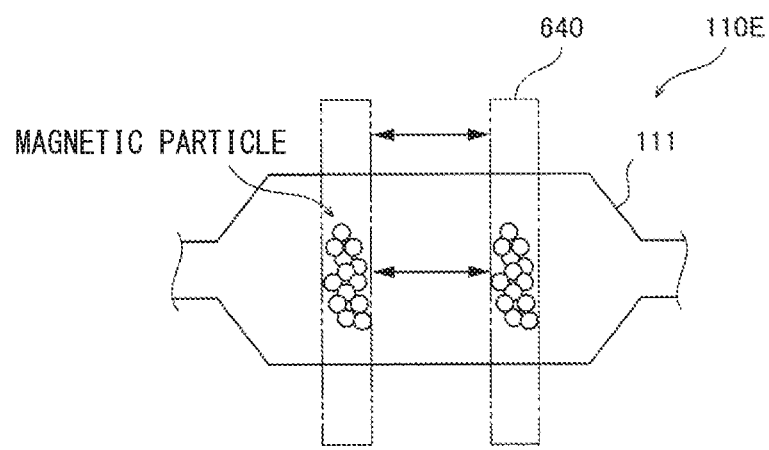
FIG. 33 illustrates an example of an operation of washing and concentrating magnetic particles in a flow path.

FIG. 33 illustrates an example of an operation in which magnetic particles that carry DNA are washed and concentrated in the flow path 110E. The liquid containing the magnetic particles flows from the connection portion 140a toward the connection portion 140c. For example, the first liquid 10 that is formed from the emulsion having been subjected to the emulsion PCR step is sent to the connection portion 140a from the liquid holding portion 120 that holds the first liquid 10, by the first liquid sending mechanism 510. In the case shown in FIG. 33, a magnet unit 592 that causes a magnetic force to act on the flow path 110 is used as the processing unit 590 shown in FIG. 18. The magnet unit 592 magnetically attracts the magnetic particles in the flow path 110 by using a magnet 640. The magnetic particles in the liquid are concentrated by the magnetic force of the magnet 640. The magnet 640 can reciprocate in the longitudinal direction of the channel 111. The magnetic particles follow the reciprocating of the magnet 640 and are concentrated while reciprocating in the channel 111.

The second liquid 20 that is formed from a washing liquid such as alcohol is sent through the injection hole 130 to the connection portion 140b by the second liquid sending mechanism 520. The washing liquid is continuously sent from the connection portion 140b toward the connection portion 140d by the second liquid sending mechanism 520. The connection portion 140d is connected to the discharge outlet 150, and functions as a drain for discharging the washing liquid. The magnetic particles follow the operation of the magnet 640 in the flow of the washing liquid and reciprocate in the channel 111, whereby washing process is performed. The magnetic particles follow the operation of the magnet 640 and reciprocate in the channel 111, whereby the magnetic particles are inhibited from sticking to each other in a lump.

In the primary washing step, washing liquid containing alcohol is used as the second liquid 20. In the primary washing using the washing liquid, the oil film on the magnetic particle is removed, and the amplified double-stranded DNA is denatured into single strands.

<Hybridization>

The third liquid 30 that is formed from a reagent containing the labelling substance is sent to the connection portion 140a from the liquid holding portion 120 that holds the third liquid 30, by the first liquid sending mechanism 510. As the processing unit 590 shown in FIG. 18, the heater 591 for amplifying DNA by PCR in the flow path 110 is used. The heater 591 heats the sample processing chip 100. The magnetic particles after the primary washing step are mixed with the reagent containing the labelling substance, in the channel 111, and are subjected to thermal cycle. By thermal cycle, the DNA on the magnetic particle and the labelling substance bind to each other.

<Washing (Secondary Washing)>

A secondary washing step after hybridization (binding) to the labelling substance is performed in the channel 111. In the secondary washing step, PBS is used as washing liquid. The second liquid 20 that is formed from PBS is sent through the injection hole 130 to the connection portion 140b by the second liquid sending mechanism 520. The washing liquid flows in the channel 111 in a state where the magnetic particles are magnetically attracted in the channel 111 by the magnet 640 (see FIG. 33). By the secondary washing using the washing liquid, an unreacted labelling substance (including a labelling substance that is non-specifically adsorbed to the magnetic particles) that does not bind to the DNA, is removed. The magnetic particles that contain the labelling substance after the secondary washing are transferred through the connection portion 140c into the liquid holding portion 160 for specimen collection.

<Detection>

The magnetic particles that contain the labelling substance after the secondary washing are detected by, for example, a flow cytometer or image analysis. For detection by a flow cytometer, the magnetic particles containing the labelling substance are, for example, collected from the liquid holding portion 160, for specimen collection, of the sample processing chip 100, and transferred into the flow cytometer that is separately provided. The liquid sending device 500 may include, as the processing unit 590 shown in FIG. 18, a detector that detects, for example, fluorescence based on labelling of the magnetic particles that contain the labelling substance in the flow path 110. The liquid sending device 500 includes, as the processing unit 590, a camera unit that takes an image of the magnetic particles that contain the labelling substance. The taken image is analyzed by the liquid sending device 500 or a computer connected to the liquid sending device 500.

(Single Cell Analysis)

Figure 34:
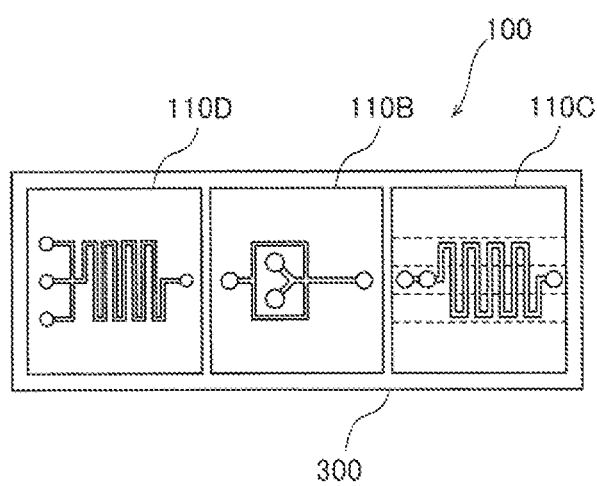
FIG. 34 illustrates an exemplary structure of the sample processing chip used for single cell analysis.

An example of single cell analysis using the sample processing chip 100 described above will be described. This analysis is a method for analyzing an individual cell, to be analyzed, contained in a specimen such as blood, for each cell. FIG. 34 illustrates an exemplary structure of the sample processing chip 100 used in the single cell analysis.

The sample processing chip 100 is, for example, formed by combination of the flow path 110D for mixing liquids, the flow path 110B for forming an emulsion, and the flow path 110C for PCR amplification.

The single cell analysis includes a step (first step) of mixing a cell that is a target component, with a reagent for amplification reaction of nucleic acid in the cell, a step (second step) of forming, in a dispersion medium, a droplet that contain a mixture of the liquid obtained by mixture in the first step and a reagent for lysing the cell, and a step (third step) of amplifying, in the droplet, nucleic acid that is eluted from the cell in the droplet in the second step.

The structure (for example, material and channel height) of the flow path 110D is the same as the structure illustrated in FIG. 31, and the detailed description thereof is not given.

A sample such as blood is injected through the connection portion 140b of the flow path 110D, and the reagent for PCR amplification is injected through the connection portions 140a and 140c. The cell contained in the sample and the reagent for PCR amplification are mixed while flowing in the channel 111. The liquid obtained by the mixture is transferred through the connection portion 140d into the adjacent flow path 110B.

The structure (for example, material and channel height) of the flow path 110B is the same as the structure illustrated in FIG. 28, and the detailed description thereof is not given.

A mixture of the cell, the reagent for PCR amplification, and a fluorescent dye is injected through the connection portion 140b of the flow path 110B. The reagent for lysing the cell is injected through the connection portion 140c. Oil for forming an emulsion is injected through the connection portion 140a. The mixture of the cell, the reagent for PCR amplification, and the reagent for lysing the cell is formed into the droplet 50 that is enclosed in the oil, in the intersection portion 112, to form an emulsion. The droplet 50 that encloses the mixture is transferred through the connection portion 140d into the adjacent flow path 110C. The cell in the droplet is lysed by the reagent for lysing the cell while the emulsion is transferred into the flow path 110C. DNA in the cell is eluted from the lysed cell in the droplet containing the reagent for PCR amplification.

The structure (for example, material and the channel height) of the flow path 110C is the same as the structure illustrated in FIG. 30, and the detailed description thereof is not given.

The emulsion having been transferred into the flow path 110C is subjected to thermal cycle while flowing in the channel 111 of the flow path 110C. The DNA eluted from the cell in the droplet is amplified by thermal cycle. Protein eluted from the cell in the droplet may be detected through enzyme-substrate reaction or the like.

(Immunoassay <Digital ELISA>)

Figure 35:
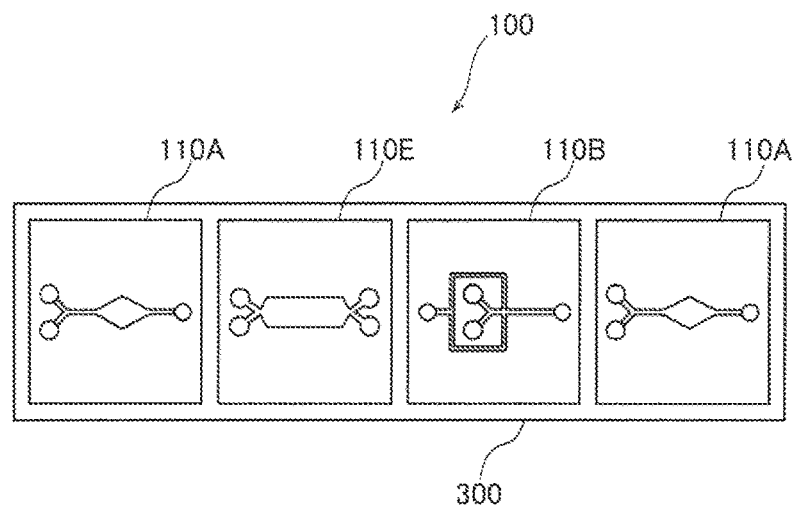
FIG. 35 illustrates an exemplary structure of the sample processing chip used for immunoassay.

An example of immunoassay performed by using the sample processing chip 100 described above will be described. In the immunoassay, protein such as an antigen or antibody contained in blood or the like is a target component. FIG. 35 illustrates an exemplary structure of the sample processing chip 100 used in Digital ELISA (Enzyme-Linked ImmunoSorbent Assay).

The sample processing chip 100 is formed by combination of the flow path 110A for temperature control, the flow path 110E for BF separation, the flow path 110B for forming an emulsion, and the flow path 110A for temperature control.

Figure 36:
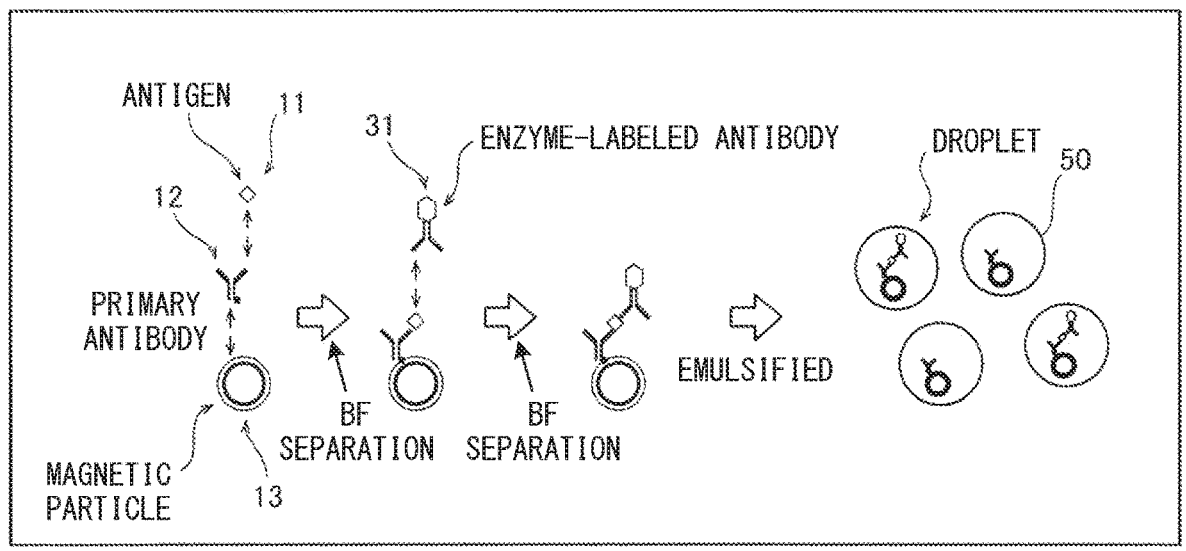
FIG. 36 illustrates a progress of reaction in immunoassay.

FIG. 36 illustrates an outline of the Digital ELISA. ELISA is a method in which an immune complex is formed by causing a magnetic particle to carry: an antigen (or antibody) that is a target component; and a labelling substance, and the target component is detected on the basis of the label in the immune complex.

ELISA is a method in which a sample diluted to limiting dilution (such a dilution that causes 1 or 0 target component to be contained in each micro partition) is dispersed in the micro partitions, and the number of the micro partitions in which signals based on the label are positive is directly counted, to absolutely measure the concentration of the target component in the sample. In the case shown in FIG. 36, each droplet in the emulsion serves as the micro partition. The assay illustrated in FIG. 36 is performed by the sample processing chip 100.

More specifically, the Digital ELISA includes a step (first step) of forming an immune complex by a target component (antigen or antibody) and a carrier being bound to each other by an antigen-antibody reaction, a step (second step) of causing the immune complex formed in the first step and the labelling substance to react with each other, a step (third step) of forming, in a dispersion medium, a droplet containing: the immune complex to which the labelling substance is bound in the second step; and a substrate for detecting the labelling substance, and a step (fourth step) of causing the substrate to react with the labelling substance in the droplet formed in the third step.

The structure (for example, material and channel height) of the flow path 110A is the same as the structure illustrated in FIG. 27, and the detailed description thereof is not given.

A sample containing an antigen is injected through the connection portion 140a of the flow path 110A, and a reagent containing a primary antibody and magnetic particles is injected through the connection portion 140b. The sample and the reagent are mixed in the channel 111. The temperature of the mixture is controlled in the channel 111, and an immune complex that contains the antigen, the primary antibody, and the magnetic particles is generated. The temperature is controlled to be about 40° C. to about 50° C., and more preferably about 42° C. The liquid containing the generated complex is transferred through the connection portion 140c into the adjacent flow path 110E.

The structure (for example, material and channel height) of the flow path 110E is the same as the structure illustrated in FIG. 33, and the detailed description thereof is not given.

The complex containing the magnetic particles is magnetically attracted by the magnet 640 and washed in the channel 111 of the flow path 110E (primary BF separation). After the primary BF separation, influence of the magnetic force of the magnet 640 is removed, to disperse the immune complex. The dispersed immune complex is caused to react with an enzyme-labeled antibody. After the reaction, the immune complex is magnetically attracted again by the magnet 640 and washed (secondary BF separation). After the washing, the immune complex is transferred into the adjacent flow path 110B.

The structure (for example, material and channel height) of the flow path 110B is the same as the structure illustrated in FIG. 28, and the detailed description thereof is not given.

The complex is injected through the connection portion 140b of the flow path 110B, and a reagent that contains a fluorescent/luminescent substrate is injected through the connection portion 140c. Oil for forming an emulsion is injected through the connection portion 140a. The liquid containing the immune complex and the reagent containing the fluorescent/luminescent substrate are enclosed in the oil into droplets in the intersection portion 112, to form an emulsion. The emulsion is transferred through the connection portion 140d into the adjacent flow path 110A.

The emulsion having been transferred into the flow path 110A is heated in the channel 111, and the substrate and the immune complex react with each other in each droplet to generate fluorescence. A detector as the processing unit 590 of the liquid sending device 500 detects the fluorescence. As a result, the target component enclosed in the individual droplet can be detected for each molecule.

(PCR Assay)

Figure 37:
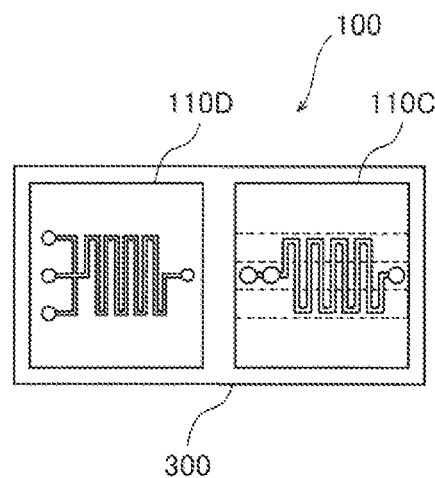
FIG. 37 illustrates an exemplary structure of the sample processing chip used for PCR assay.
Figure 38:
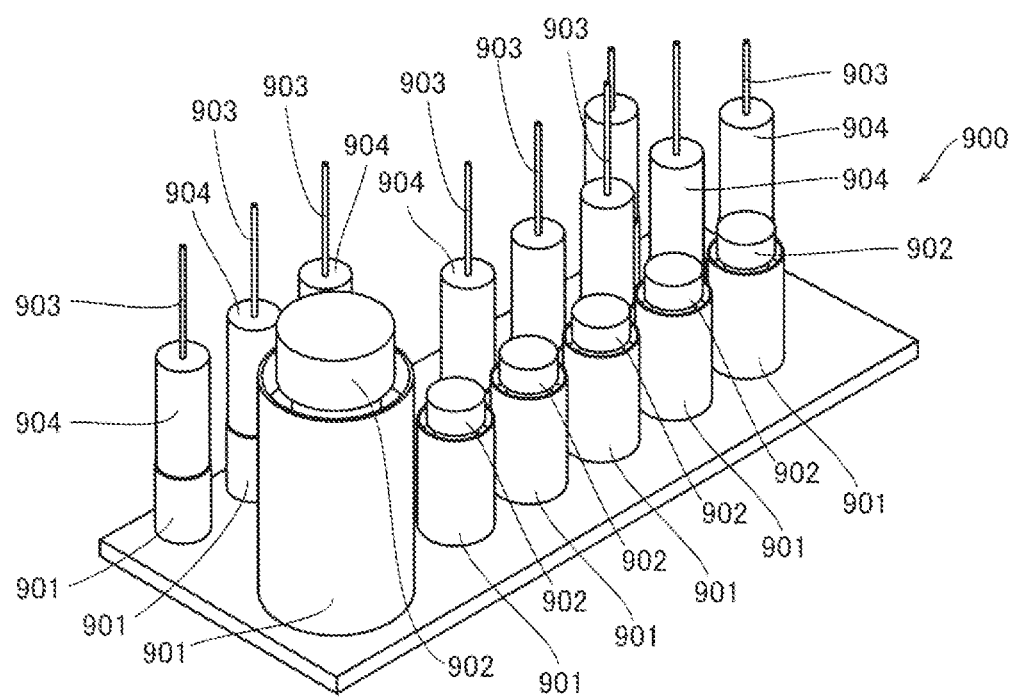
FIG. 38 illustrates a structure for sending liquid to a sample processing chip of conventional art.

An example of PCR assay using the sample processing chip 100 described above will be described. FIG. 37 illustrates an exemplary structure of the sample processing chip 100 used in the PCR assay.

In the flow path 110D, nucleic acid that is a target component and a reagent for gene amplification are mixed. For example, in amplification of a mutant gene by a clamp PCR method, the target component is mixed with the reagent, for gene amplification, which contains a probe that selectively binds to a mutant gene. The mixed specimen is transferred through the connection portion 140d into the adjacent flow path 110C. In the flow path 110C, PCR is performed through temperature control by the heater 591 in a continuous fluid. In the example shown in FIG. 37, simple real-time PCR using a small sample processing chip 100 can be performed. Therefore, a small chip for a point of care (POC) for testing and diagnosis at a place where the patient is treated, can be implemented.

The assay using the sample processing chip 100 is not limited to the above-described exemplary ones, and the sample processing chip 100 may be structured for any assay by combination of the flow paths 110.

The embodiment disclosed herein is merely illustrative in all aspects and should not be considered as being restrictive. The scope of the present invention is defined not by the description of the above embodiment but by the scope of the claims, and is intended to include meaning equivalent to the scope of the claims and all changes (modifications) within the scope.

What is claimed is:

1. A liquid sending method using a sample processing chip having a flow path into which a plurality of liquids flow, the method comprising:
    setting the sample processing chip in a setting portion of a liquid sending device;
    closing a lid to cover the sample processing chip in the setting portion, the lid including a connector that fully connects: (i) a first liquid sending mechanism of the liquid sending device and a liquid holding portion of the sample processing chip; and (ii) a second liquid sending mechanism of the liquid sending device and an injection hole of the sample processing chip, respectively;
    sending a first liquid held in the liquid holding portion of the sample processing chip into the flow path by applying pressure to the liquid holding portion by the first liquid sending mechanism;
    sending a second liquid held in a storage portion of the liquid sending device connected to the sample processing chip into the flow path through an injection hole in the sample processing chip by applying pressure to the storage portion by the second liquid sending mechanism; and
    forming a fluid in the flow path containing the first liquid and the second liquid.

2. The liquid sending method, using the sample processing chip, of claim 1, wherein
    the first liquid contains a sample derived from an organism.

3. The liquid sending method, using the sample processing chip, of claim 1, wherein
    the first liquid contains a component corresponding to a test item of sample testing using the sample processing chip.

4. The liquid sending method, using the sample processing chip, of claim 1, wherein
    a plurality of kinds of the first liquids held in a plurality of the liquid holding portions are sent into the flow path by applying pressure to the liquid holding portions, respectively.

5. The liquid sending method, using the sample processing chip, of claim 1, wherein
    the first liquid is sent into the flow path by applying pressure to the liquid holding portion into which the first liquid is injected by an injector.

6. The liquid sending method, using the sample processing chip, of claim 1, wherein
    a plurality of kinds of the second liquids stored in a plurality of the storage portions, respectively, are sent through the injection hole into the flow path.

7. The liquid sending method, using the sample processing chip, of claim 1, wherein
    a fluid, in an emulsion state, including the second liquid as a dispersion medium and the first liquid as a dispersoid is formed in the flow path by controlling pressure to be applied to the liquid holding portion that holds the first liquid, and pressure to be applied to the storage portion that stores the second liquid.

8. The liquid sending method, using the sample processing chip, of claim 7, wherein
    a fluid, in an emulsion state, including the second liquid and the first liquid is formed in the flow path that includes a first channel and a second channel that intersect each other, by sending the first liquid and the second liquid into the first channel and the second channel, respectively.

9. The liquid sending method, using the sample processing chip, of claim 7, wherein
    the first liquid contains a sample derived from an organism, and the second liquid is oil.

10. The liquid sending method, using the sample processing chip, of claim 1, wherein
    the first liquid that is a fluid in an emulsion state is sent into the flow path by pressure being applied to the liquid holding portion,
    the second liquid for demulsifying the first liquid is sent through the injection hole into the flow path by pressure being applied to the storage portion, and
    the first liquid and the second liquid are mixed in the flow path.

11. The liquid sending method, using the sample processing chip, of claim 1, wherein
    the fluid in the flow path is collected through a discharge outlet provided in the sample processing chip.

12. The liquid sending method, using the sample processing chip, of claim 1, wherein
    a fourth liquid stored in the storage portion is sent through the injection hole into the flow path by pressure being applied to the storage portion so as to be disposed in the flow path, and
    after the fourth liquid has been disposed in the flow path or in parallel with disposing of the fourth liquid in the flow path, the first liquid is put into a state where the first liquid can be injected into the liquid holding portion.

13. The liquid sending method, using the sample processing chip, of claim 1, wherein
    the second liquid is sent through the injection hole from the storage portion into the flow path at a flow rate higher than a flow rate of the first liquid.

14. The liquid sending method, using the sample processing chip, of claim 1, wherein
    the second liquid in the storage portion is sent into a plurality of the flow paths through a plurality of the injection holes provided in the plurality of the flow paths, respectively, of the sample processing chip by pressure being applied to the storage portion.

15. A liquid sending device, for a sample processing chip, which sends liquid into a sample processing chip having a flow path into which a plurality of liquids flow, the liquid sending device comprising:
- a first liquid sending mechanism configured to send a first liquid held in a liquid holding portion in the sample processing chip into the flow path of the sample processing chip by applying pressure to the liquid holding portion;
- a second liquid sending mechanism configured to send a second liquid in a storage portion, into the flow path, through an injection hole in the sample processing chip by applying pressure to the storage portion that stores the second liquid, wherein the first liquid and the second liquid combine in the flow path to create a fluid therein;
- a setting portion in which the sample processing chip is set; and
- a lid corresponding to the setting portion, the lid including a connector that fluidly connects: (i) the first liquid sending mechanism and the liquid holding portion; and (ii) the second liquid sending mechanism and the injection hole, respectively.

16. The liquid sending device, for the sample processing chip, of claim 15, wherein
- the first liquid sending mechanism includes a first pressure source for applying pressure to the liquid holding portion, and
- the second liquid sending mechanism includes a second pressure source for applying pressure to the storage portion.

17. The liquid sending device, for the sample processing chip, of claim 16, wherein
- the first liquid sending mechanism includes a pressure path that connects between the first pressure source and the liquid holding portion, and
- the second liquid sending mechanism includes a liquid sending tube that connects between the storage portion and the injection hole.

18. The liquid sending device, for the sample processing chip, of claim 15, wherein
- the second liquid sending mechanism sends a plurality of kinds of the second liquids stored in a plurality of the storage portions, respectively, through the injection hole, into the flow path.

19. The liquid sending device, for the sample processing chip, of claim 15, wherein
- the lid is structured to be openable and closable relative to the setting portion, and
- the connector is connected to each of the liquid holding portion and the injection hole by the lid being closed relative to the setting portion.

* * * * *